United States Patent [19]

Takakura et al.

[11] Patent Number: 4,878,178
[45] Date of Patent: Oct. 31, 1989

[54] IMAGE PROCESSING DEVICE

[75] Inventors: Masaki Takakura, Higashiosaka; Hideto Hayasaki, Nara; Hideo Takemura, Gose; Masao Izumi, Tenri; Keisuke Iwasaki, Tenri; Yoji Noguchi, Ikoma; Yasukuni Yamane, Shiki; Noritoshi Kako, Nara, all of Japan

[73] Assignee: Sharp Kabushiki Kaisha, Osaka, Japan

[21] Appl. No.: 946,482

[22] Filed: Dec. 24, 1986

[30] Foreign Application Priority Data

| Dec. 25, 1985 | [JP] | Japan | 60-294490 |
| Jan. 27, 1986 | [JP] | Japan | 61-16386 |
| Jan. 31, 1986 | [JP] | Japan | 61-20692 |
| Mar. 24, 1986 | [JP] | Japan | 61-66819 |
| Mar. 24, 1986 | [JP] | Japan | 61-66820 |
| Mar. 24, 1986 | [JP] | Japan | 61-66821 |
| Mar. 24, 1986 | [JP] | Japan | 61-66822 |
| Apr. 9, 1986 | [JP] | Japan | 61-83065 |
| Apr. 11, 1986 | [JP] | Japan | 61-84464 |

[51] Int. Cl.$^4$ .................................... G06F 15/40
[52] U.S. Cl. ....................... 364/521; 340/703; 340/799
[58] Field of Search ............... 364/518, 521; 340/701-703, 798-800

[56] References Cited

U.S. PATENT DOCUMENTS

| 3,405,457 | 10/1968 | Bitzer | 213/114 |
| 3,453,384 | 7/1969 | Donner et al. | 364/900 |
| 3,906,197 | 9/1975 | Grover | 364/521 |
| 4,091,374 | 5/1978 | Muller et al. | 340/706 |
| 4,484,187 | 11/1984 | Brown et al. | 340/703 |
| 4,539,585 | 9/1985 | Spackova et al. | 358/93 |
| 4,631,690 | 12/1986 | Corthout et al. | 364/521 |
| 4,673,929 | 6/1987 | Nelson et al. | 340/703 |
| 4,695,966 | 9/1987 | Takakura et al. | 364/521 |
| 4,710,806 | 12/1987 | Iwai et al. | 340/703 X |

Primary Examiner—Gary V. Harkcom
Assistant Examiner—H. R. Herndon
Attorney, Agent, or Firm—Birch, Stewart, Kolasch & Birch

[57] ABSTRACT

An image processing device includes a multipurpose memory which stores intensity information as well as label information and a look-up memory. The output from the multipurpose memory is connected to an address of the look-up table memory and is converted by the look-up table memory. The image processing device operates to select an area in an image without erasing the data of an image to be processed and to change the color at a very high speed.

21 Claims, 40 Drawing Sheets

Fig. 14
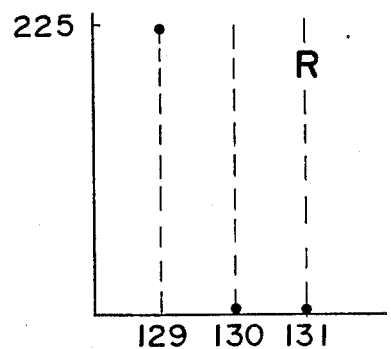
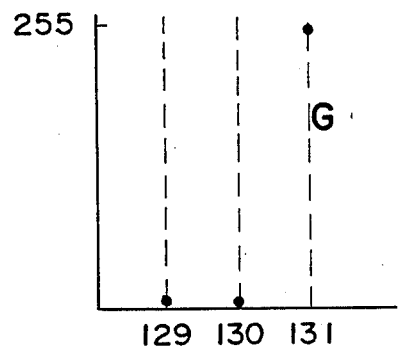
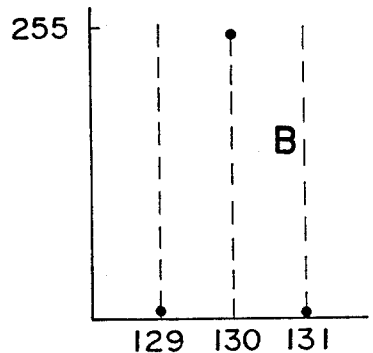

Fig. 17
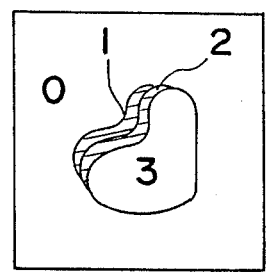
Fig. 18
(a)　　　　　(b)　　　　　(c)
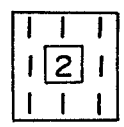 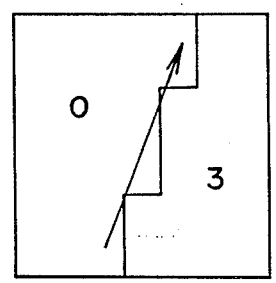 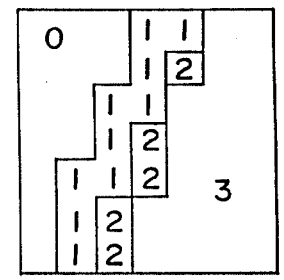
Fig. 19
(a)　　　　　(b)　　　　　(c)
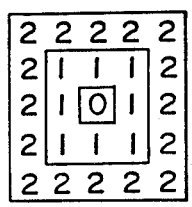 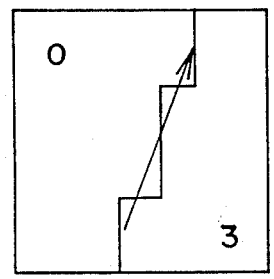 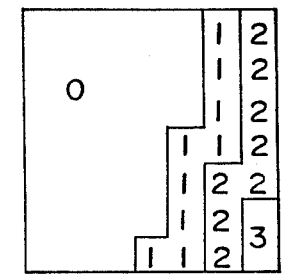

Fig. 26(a)
```
        1 1 2 1 1
      1 2 3 3 3 2 1
    1 2 3 4 5 4 3 2 1
    1 3 4 6 7 6 4 3 1
    2 3 5 7 8 7 5 3 2
    1 3 4 6 7 6 4 3 1
    1 2 3 4 5 4 3 2 1
      1 2 3 3 3 2 1
        1 1 2 1 1           0
```
Fig. 27(a)
```
          1 1 2 2 2 1 1
        1 1 2 3 3 3 3 3 2 1
      1 2 3 3 4 5 5 5 4 3 2 1
      1 2 3 4 5 6 7 7 7 6 4 3 1
      1 3 4 6 7 7 8 8 8 7 5 3 2
      2 3 5 7 8 8 7 7 7 6 4 3 1
      1 3 4 6 7 7 6 5 5 4 3 2 1
      1 2 3 4 5 5 4 3 3 3 2 1
        1 2 3 3 3 3 2 2 1 1
          1 1 2 2 1 1           0
```
Fig. 26(b)
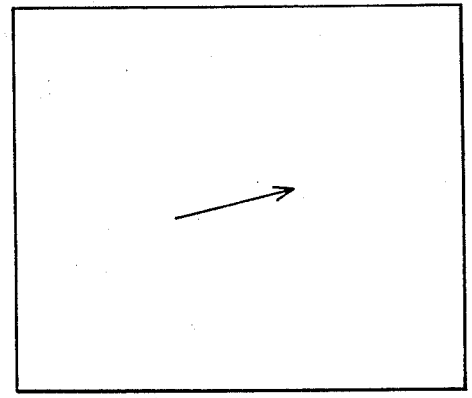
Fig. 27(b)
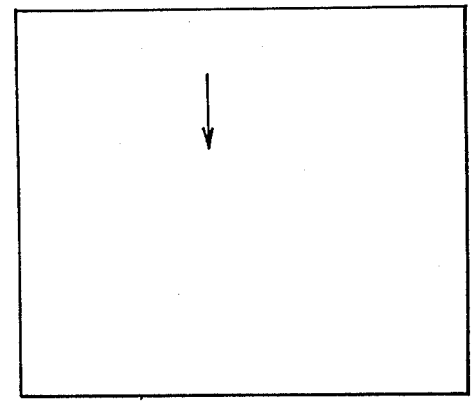
Fig. 26(c)
```
          1 1 2 2 2 1 1
        1 1 2 3 3 3 3 3 2 1
      1 2 3 3 4 5 5 5 4 3 2 1
      1 2 3 4 5 6 7 7 7 6 4 3 1
      1 3 4 6 7 7 8 8 8 7 5 3 2
      2 3 5 7 8 8 7 7 7 6 4 3 1
      1 3 4 6 7 7 6 5 5 4 3 2 1
      1 2 3 4 5 5 4 3 3 3 2 1
        1 2 3 3 3 3 2 2 1 1
          1 1 2 2 1 1           0
```
Fig. 27(c)
```
          1   1 2 2 1 1
        1 1 1   1 3 3 3 2 1
      1 2 3 1   1 3 5 4 3 2 1
      1 2 3 4 2 1 2 4 5 6 4 3 1
      1 3 4 5 4 3 4 5 6 7 5 3 2
      2 3 5 7 5 5 5 6 7 6 4 3 1
      1 3 4 6 7 6 6 5 5 4 3 2 1
      1 2 3 4 5 5 4 3 3 3 2 1
        1 2 3 3 3 3 2 2 1 1
          1 1 2 2 1 1           0
```

A = 0

A = 1

$A = \frac{1}{2}$

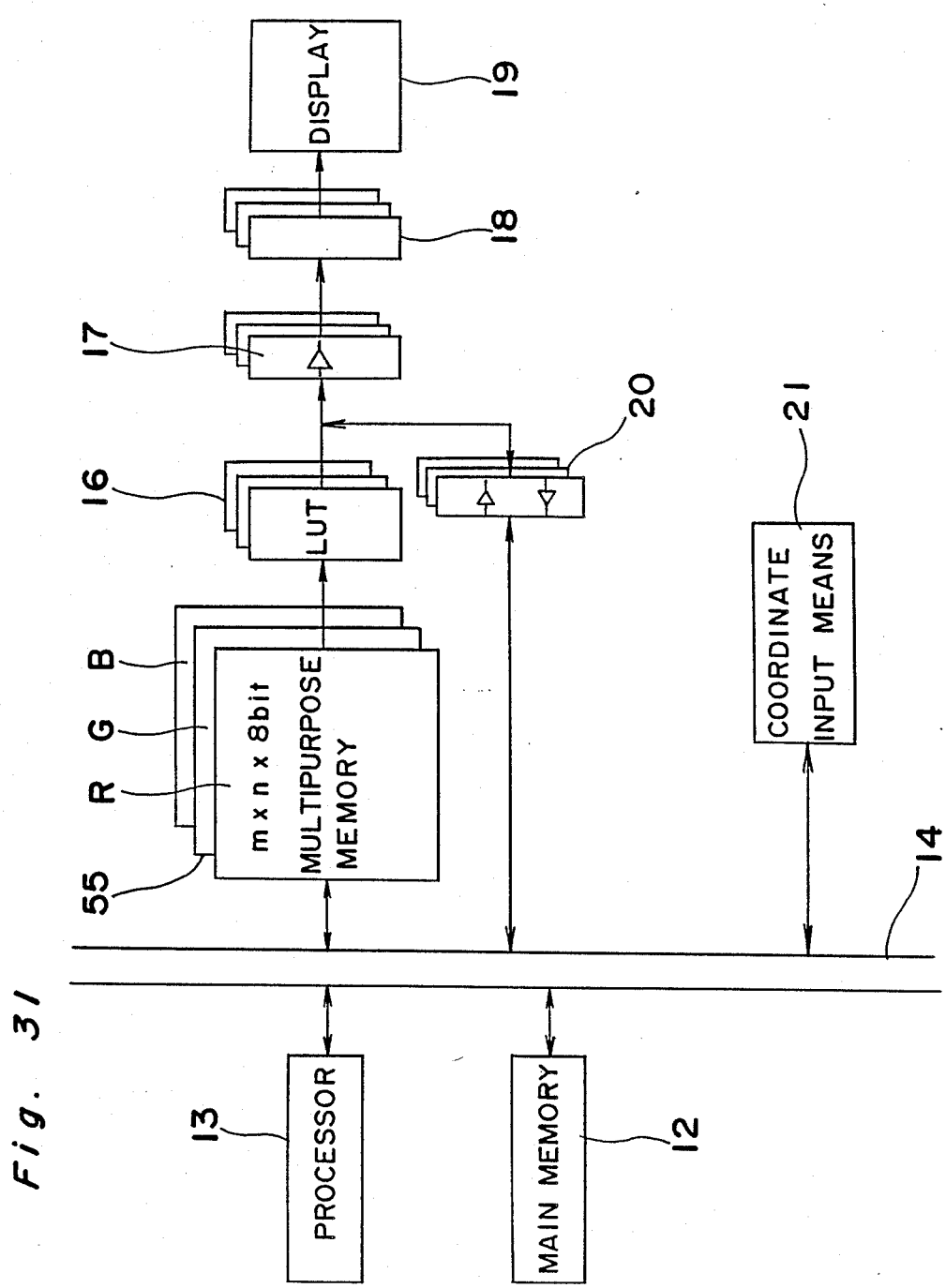

Fig. 34(a)
ADDRESS
| 0 | 0 |
| 1 | 0 |
| 2 | 0 |
| ⋮ | ⋮ |
| 100 | 0 |
| 101 | 255 |
| 102 | 255 |
| ⋮ | |
| 254 | 255 |
| 255 | 255 |
Fig. 34(b)
ADDRESS
| 0 | 0 |
| 1 | 1 |
| 2 | 2 |
| ⋮ | ⋮ |
| 253 | 253 |
| 254 | 254 |
| 255 | 255 |
Fig. 35(a)
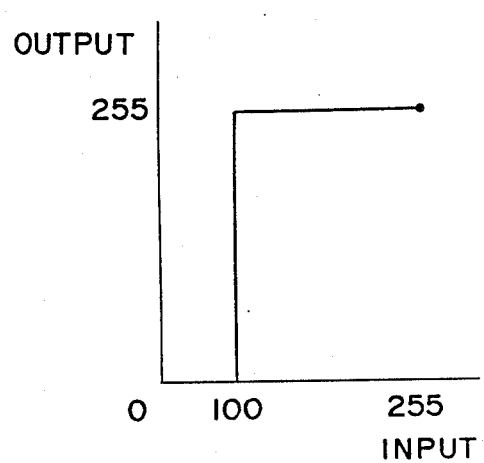
Fig. 35(b)
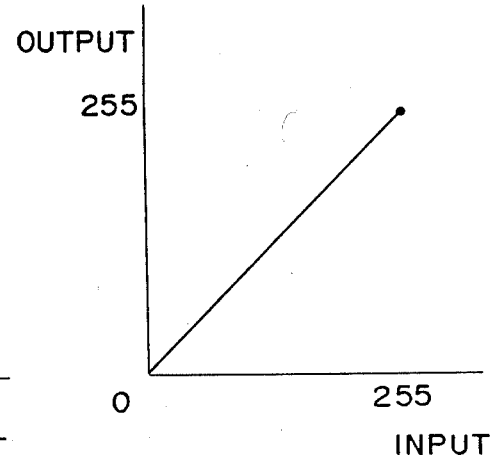

Fig. 40
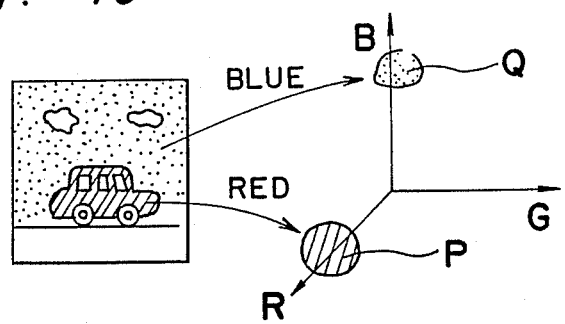
⟨RGB COLOR SPACE⟩
Fig. 41
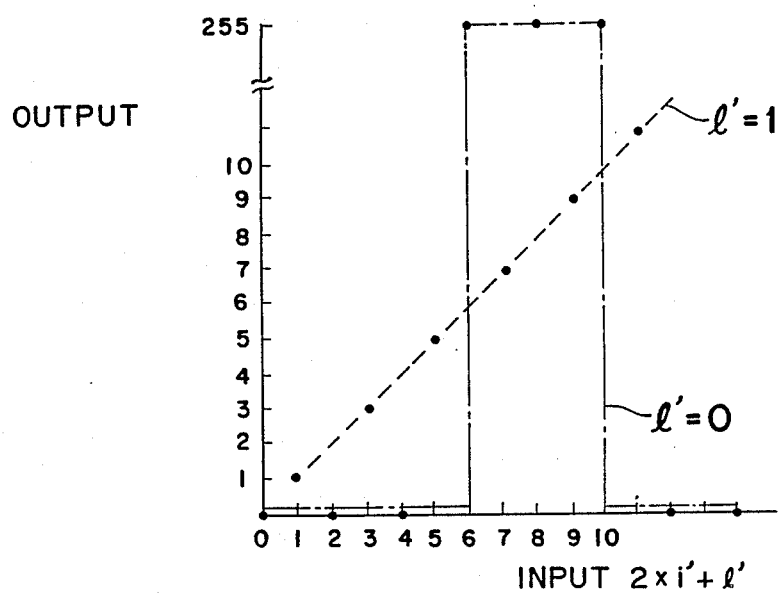
Fig. 42(a)  Fig. 42(b)  Fig. 42(c)
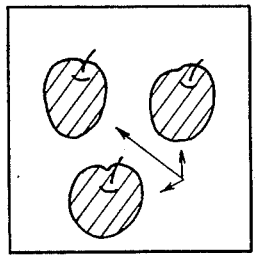 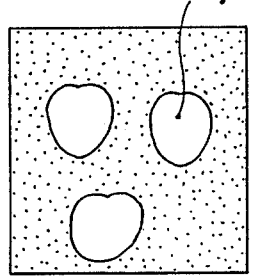 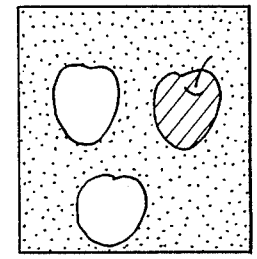

(Xo,Yo)

EXTRACTION AREA (Xo,Yo)

EXTRACTION AREA

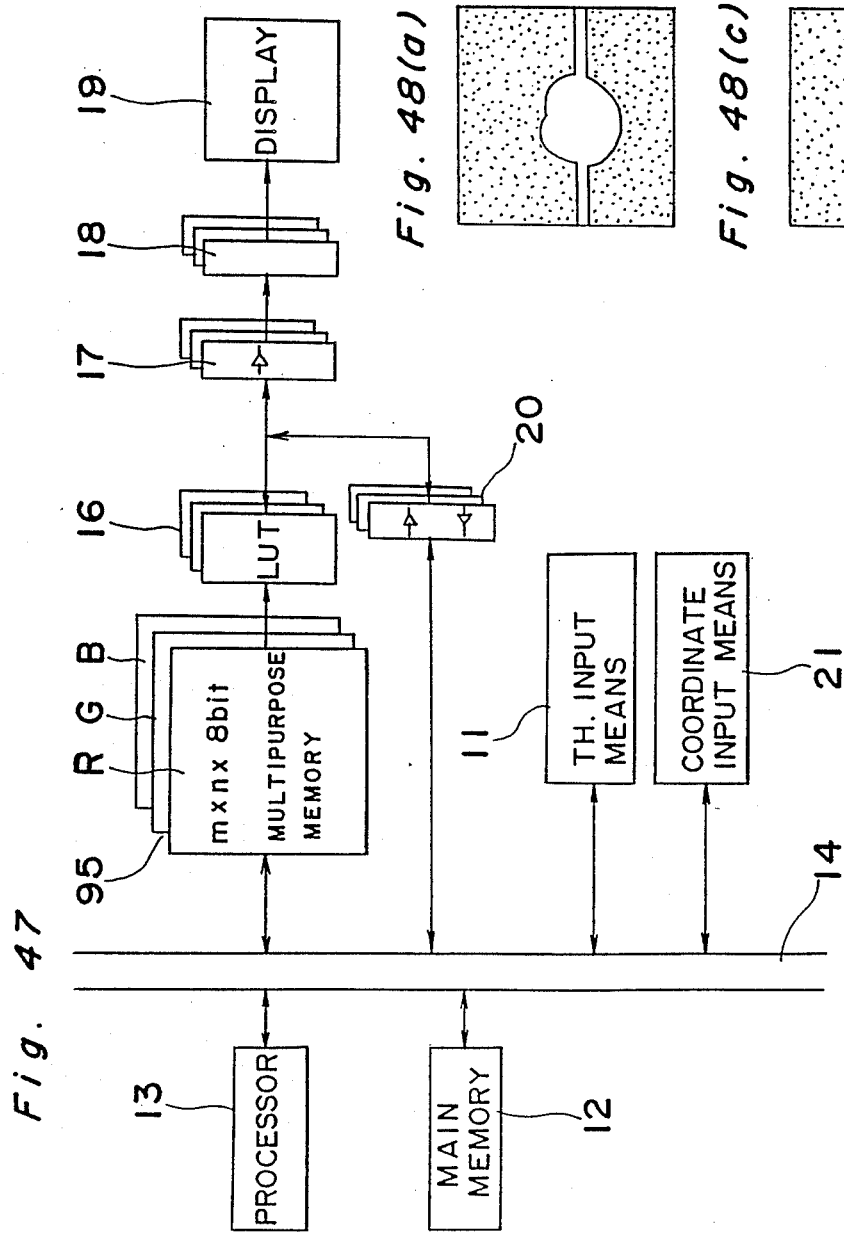

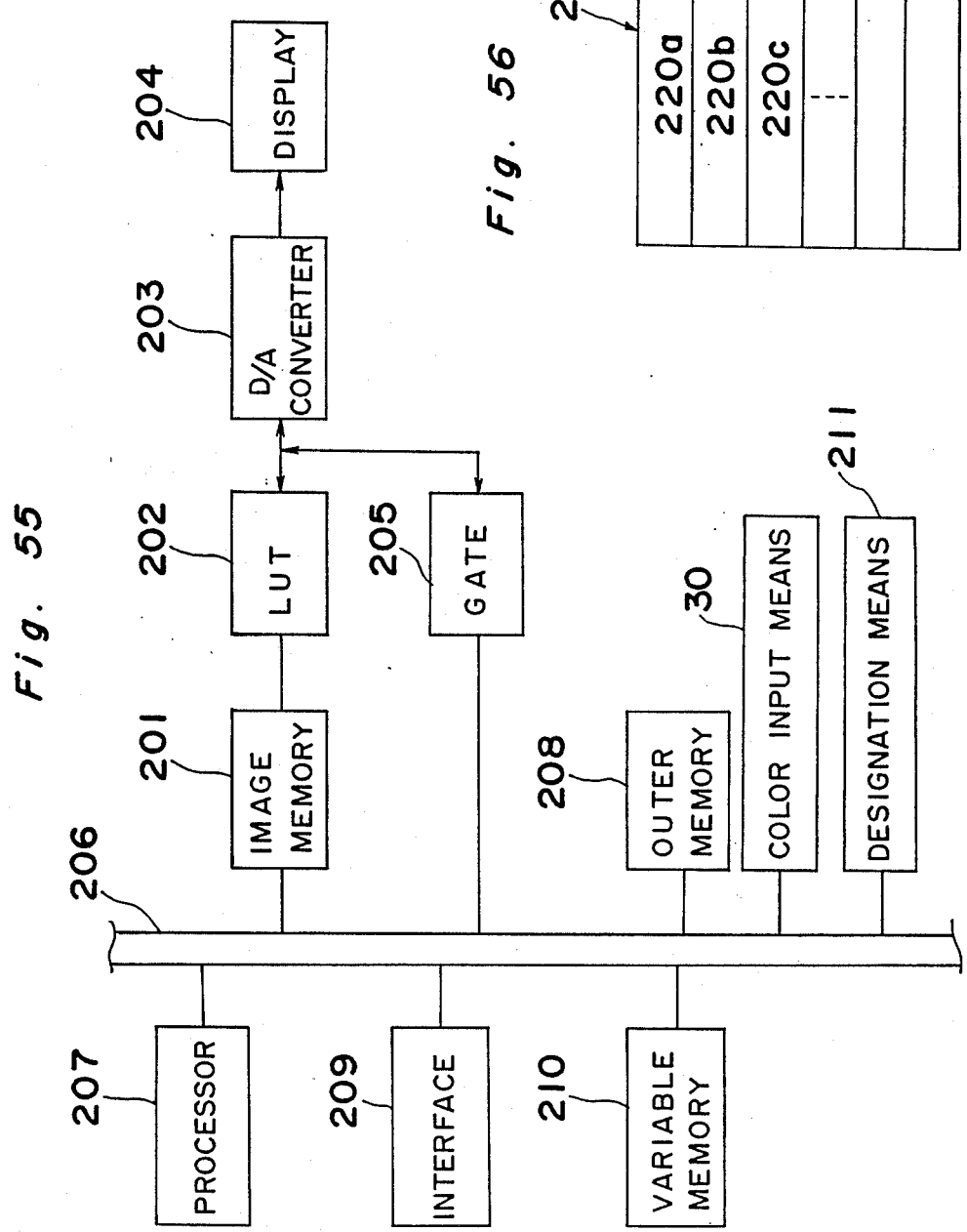

IMAGE PROCESSING DEVICE

BACKGROUND OF THE INVENTION

The present invention relates to an image processing device which changes the colors of an image to be displayed on a CRT screen.

A color change technique is one of the image processing techniques. The generation of an image which has an appearance that is different from an original image has been made by converting the color data of the area corresponding to the area whose color will be changed. For example, when the color of a green leaf is changed, only the area corresponding to the leaf is turned into yellow. This processing can be made by replacing the R(RED), G(GREEN), and B(BLUE) data of each of the pixels which compose an image with different data, respectively. Rewriting the data of each pixel in the image, however, increases the number of accesses by hardware, such as CPU, to an image memory. This leads to an increase of the image processing period of time. Accordingly, such a system is required to have a function for responding to transferred information at a high speed or have high resolution or very large storage capacity of an image memory and is unsuitable for frequent color change processings. Therefore, a hardware provision of a special construction is necessitated, such as a processor specialized for image processing. This causes hardware systems to be complicated and requires a special program to be created.

Further, such image processing for a color change results from replacing data stored in an image memory and causes the data to be erased after the replacement is completed. Therefore, an image processing method is unsuitable for systems such as those for the simulation of a color change in which an original color of an image is frequently compared with the color that has been changed from the original color.

SUMMARY OF THE INVENTION

It is the object of the present invention to provide an image processing device of a comparatively simple construction which can carry out a color change of an area in an image at a high speed without erasing the previously stored image data.

It is another object of the present invention to provide an image processing device of a comparatively simple construction which can carry out a color change of an area in an image at a high speed without erasing the previously stored image data and also maintain the natural shade of the image when the color of the area of the image is changed.

It is still another object of the present invention to provide an image processing device which enables a color change in a plurality of areas in an image at a high speed without erasing previously stored image data by the use of logic memories.

It is still another objection of the present invention to provide an image processing device which can decrease an unnatural color at the edge portion of an area extracted from an image, which is one of problems in a color change, without losing the original data of the edge portion.

It is a further object of the present invention to provide an image processing device which can obtain an effect of an airbrush in touch without erasing an original data of an image, and thereafter, change the color of the image and/or the strength of the airbrush as desired.

It is a still further object of the present invention to provide an image processing device which can erase or display a line that is input to an image, whose color is shaded, at a high speed without moving image information of an image memory to other areas.

It is another object of the present invention to provide an image processing device which is not required to provide the original data of an image to an image memory each time a threshold takes out an area which is changed. Accordingly, the access frequency to the image memory is reduced, so as to quicken image processing.

A further object of the present invention is to provide an image processing device which can surely take a target area out of a full color image, such as a photograph, having many neutral colors. Also, the target area to be taken out is displayed and distinguished from other areas even when the image has a plurality of areas with the same characteristic level as the target area to be taken out.

A still further object of the present invention is to provide an image processing device which enables a simple and efficient area extraction when a plurality of areas to be extracted are scattered in an image.

It is still another object of the present invention to provide an image processing device which permits a simple area extraction when a target area to be extracted has the same color as that of other areas which are next to the target area.

It is also an object of the present invention to provide an image processing device that is capable of changing the color of a pixel that is included in a specific area of an image automatically, simply and at a high speed. Therefore, the color of the pixel that is included in the specific area may have a certain relationship with inputted data of a reference color and a color to be changed in proportion to the shade of the color of the pixel.

It is still another object of the invention to provide an image processing device which is capable of inputting color information thereto using a color palette of an image.

In order to obtain these objects, the image processing device of the present invention is basically characterized in that it comprises an image memory which stores intensity information of each of the pixels composing an image and a logic image memory which stores label information, or instead, a multi-purpose memory which stores both the intensity and label information. Also, a look-up table memory which converts the intensity information of each of the pixels exists in an area that is determined on the basis of the label information and outputs information, thus converted. Whereby, changing of colors in the area of the image can be quickly carried out without erasing the original image data.

An image processing device of a preferred embodiment of the present invention comprises an image memory for storing intensity information of each of the pixels which compose an image; a logic image memory for storing label information that detects a pixel corresponding to an area whose intensity information is changed; a look-up table memory, to which output information of the image memory and the logic image memory is inputted, for resetting the intensity information; and a display means for displaying an image according to the output from the look-up table memory.

An image processing device of another preferred embodiment of the present invention comprises a multi-purpose memory for storing the intensity information of each of the pixels composing an image and the edge information which detects a pixel of the area that is taken out or extracted after a change of the intensity information therein and/or a pixel which corresponds to the edge of the area to be extracted; a look-up table memory, to which output information is transferred from the multi-purpose memory, for changing the intensity information of the pixel which corresponds to the area to be taken out having the intensity information that is changed and the pixel which corresponds to the edge of the area that is taken out so that the changed intensity information may be outputted; a display for displaying an image according to the output information from the look-up table memory; a providing device for providing the edge information to the multi-purpose memory; and a look-up table setting device for setting the contents of the look-up table memory so that the intensity information of the pixel on the edge may represent a color between the changed color of the area to be taken out and the color of an original image, whereby color changes of the area to be extracted are carried out so that the edge thereof may not be conspicuous.

One of the other preferred embodiments of the present invention comprises an image memory for storing a characteristic level of each of the pixels of an original image to be processed; an input device for inputting a desired threshold that is related to the characteristic level; a look-up table memory for converting the characteristic level of each of the pixels into a signal which determines whether or not the pixels should be displayed according to the threshold signal transmitted form the input means; and a display unit for displaying an image according to the output from the look-up table memory. Whereby, the original signal representing the characteristic level of each pixel of the original image is outputted from the image memory and provided in turn to the look-up table memory so that the characteristic level signal may be converted into a signal representing "display" or "non-display", and the latter signal is inputted in turn to the display unit which sequentially displays the converted pixels which will constitute the image.

The present invention can be embodied by another construction which comprises a multi-purpose memory for storing intensity information of each of pixels composing image and label information for determining whether or not an area is to be taken out; a threshold input device for inputting desired threshold on the intensity information; a coordinate input device for inputting predetermined coordinates of an image; a look-up table memory for setting a look-up table which converts the intensity information that is transferred from the multi-purpose memory according to a threshold inputted from the threshold input device and for converting the information inputted thereto from the multi-purpose memory according to the look-up table; a display for displaying an image according to the output from the look-up table memory; a discrimination device for discriminating whether or not coordinates designated by the coordinate input means are included in an area specified by a threshold inputted from the threshold input device and displayed in a specified color; a rewriting device for rewriting the label information of the specified area of the multi-purpose memory when the coordinates designated by the coordinate input device are included in the specified area and for rewriting the label information of the specified area that is included in a closed curve area designated by the coordinate input device when the coordinates designated by the coordinate input device are not included in the specified area. Whereby, the area to be taken out is displayed in advance of the specified color and a target area is selected from the specified area that is displayed in the specified color by using the coordinate input device and an extract method is changed depending on whether or not the inputted coordinates are included in the specified area that is displayed in the specified color when the area is taken out.

BRIEF DESCRIPTION OF THE DRAWINGS

The objects and features of the present invention will become apparent from the following description taken in conjunction with the preferred embodiments thereof with reference to the accompanying drawings, in which:

FIG. 14 illustrates characteristic graphs of a look-up table to be used in the embodiment as shown in FIG. 12;

FIG. 17 illustrates a figure in which edge information is provided;

FIGS. 18(a)–19(c) are illustrations which explain a brush device;

FIGS. 25(a) and 25(b) are writing patterns of the intensity information of an airbrush;

FIGS. 26(a), 26(b), and 26(c) and FIGS. 27(a), (b), and 27(c) illustrate the rewriting of the intensity information of the airbrush;

FIG. 31 is a block diagram of the image processing device of a seventh embodiment of the present invention;

FIGS. 34(a) and 34(b) illustrate the content of the look-up table memory of an eighth embodiment of the present invention;

FIGS. 35(a) and 35(b) are graphs showing the relationship between the input level to the look-up table memory and the output level therefrom, corresponding to FIGS. 34(a) and (b), respectively;

FIG. 40 is a drawing showing a display of an original image in the color space;

FIG. 41 is one example of the look-up table of the ninth embodiment;

FIG. 42(a), 42(b), and 42(c) illustrate the process of extraction of an area in the ninth embodiment;

FIG. 47 is a block diagram of an eleventh embodiment of the present invention;

FIGS. 48(a), 48(b), 48(c), and 48(d) illustrate the process of extracting an area in the eleventh embodiment;

FIG. 55 is a schematic diagram of the image processing device of a thirteenth embodiment of the present invention;

FIG. 56 is a front view of an image serving as a color palette;

Before the description of the embodiments of the present invention, it is to be noted that like parts are designated by like reference numerals throughout several views of the accompanying drawings.

DETAILED DESCRIPTION OF THE PREFERRED EMBODIMENTS (First Embodiment)

A first embodiment of the present invention is shown in FIG. 1 through FIG. 4.

Figure 1:
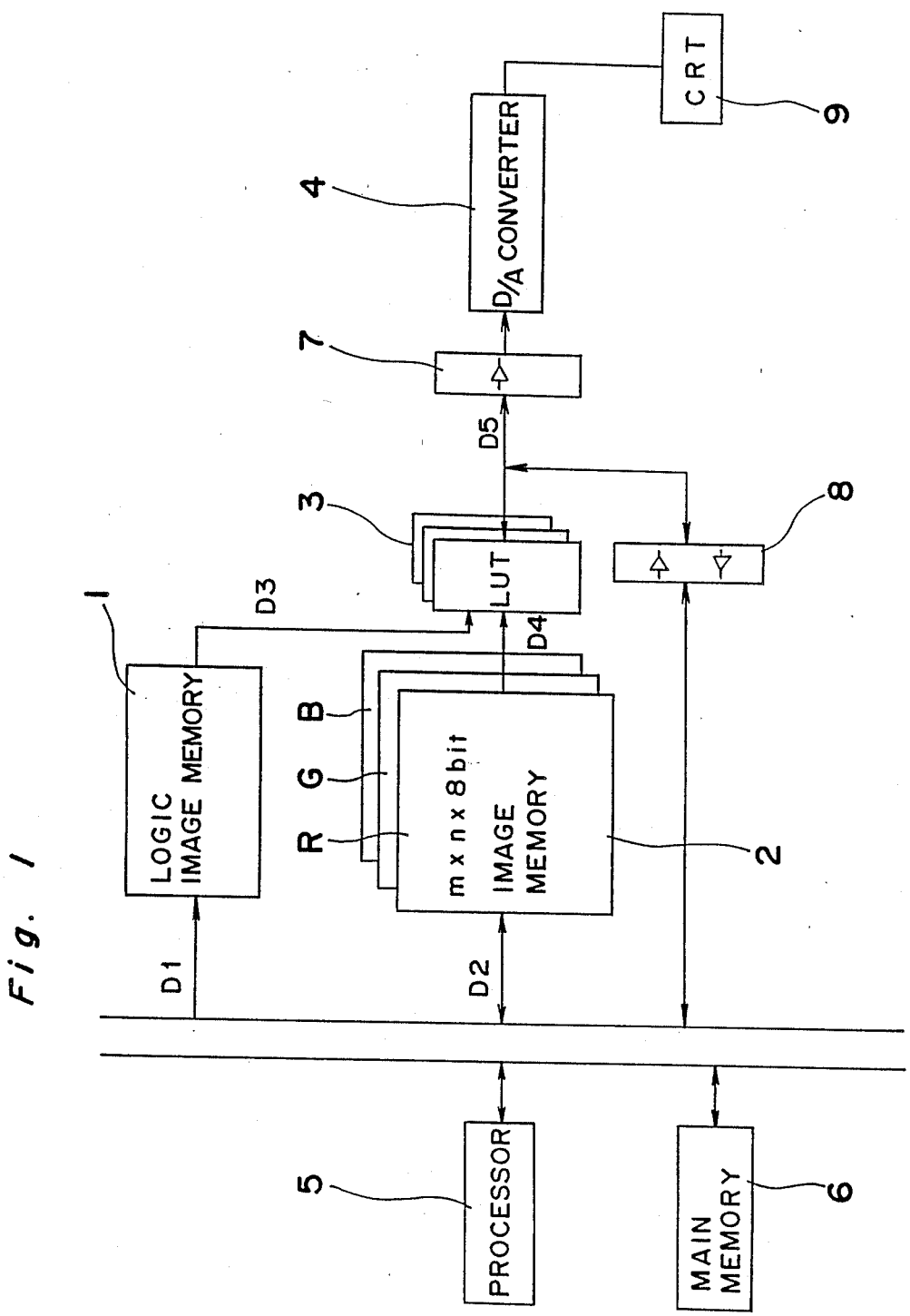
FIG. 1 is a block diagram of the image processing device of a first embodiment according to the present invention.

FIG. 1 is a partial block diagram of the first embodiment of the present invention. An image processing device according to the present embodiment is characterized in that it comprises an image memory (2) for storing intensity information of each of the pixels which compose an image; a logic image memory (1) for storing label information which detects a pixel corresponding to an area whose intensity information is changed; a look-up table memory (3), to which output information of the image memory and the logic image memory is inputted for resetting the intensity information of the pixel corresponding to the area whose intensity information is changed; and a display (9) for displaying an image according to the output from the look-up table memory (3).

In FIG. 1, a numeral 1 designates a logic image memory which will be described below. A numeral 2 designates image memories provided corresponding to R (red), G (green), and B (blue) in which intensity information is stored. A numeral 3 designates a look-up table memory for accommodating a look-up table. A numeral 4 indicates a D/A converter. A numeral 7 designates a latch. A numeral 8 designated a gate. The output (Video analog signal) from the D/A converter 4 is transferred to a CRT 9 which functions as a display so as to carry out an image display. The look-up table memory 3 is an arithmetic unit which comprises a static RAM capable of processing a signal at a high speed. The data outputted from the image memory 2 and the logic image memory 1 are synthesized so as to compose the address signal of the look-up table memory 3. The look-up table memory 3 has, for example, a capacity of 256 bytes which are converted into different eight-bit information. In this case, the table data of the look-up table memory 3 is set so that when the least significant bit of the address signal of the look-up table memory 3 is "1", the data may be converted, and when the least significant bit thereof is "0", the data may not be converted.

Figure 2:
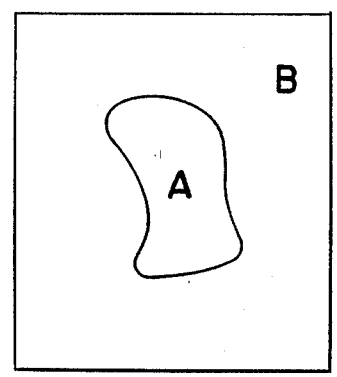
FIG. 2 illustrates an image used in the first embodiment.

As shown in FIG. 2, when only the color of an image A which exists in a background B is changed into a different color, the following operation is made.

Data D1 are processed by a processor 5, shown in FIG. 1, in order to transfer the data to the logic memory which stores the value of the pixel, corresponding to an area A whose color is changed, as "1" and the pixel, corresponding to the area B whose color is not changed, as "0". Data D2 is processed by the processor 5 in order to transfer the data to the image memory 2. In response to the transferred information, the image memory 2 (when an image consists of m×n pixel, the image memory 2 has the capacity of m×n×8 bits) stores a 7-bit shaded image data, namely, intensity information.

Figure 3:
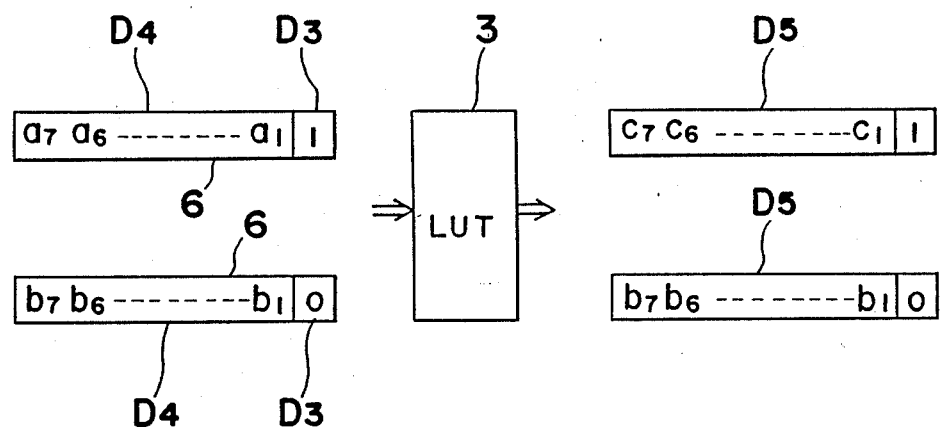
FIG. 3 illustrates the data flow of the first embodiment.

The data flow will be described with reference to FIGS. 1 and 3. When the value D3 of a pixel (in this case, the value is "1") corresponding to the area A whose colors are changed is transferred from the logic memory 1 to the look-up table memory 3 and data D4 consisting of seven bits of shaded image ($a_7a_6a_5a_4a_3a_2a_1$) corresponding to the area A is transferred from the image memory 2 to the look-up table memory 3 for displaying an image, the address data of the look-up table memory 3 to be designated by the data D4 consisting of the most significant seven bits and D3 consisting of the least significant bit is converted into data D5, that is $c_7c_6c_5c_4c_3c_2c_1$, which is transferred to a D/A converter 4 through the latch 7. On the other hand, when value D3 (in this case, "0") of a pixel corresponding to the area B whose colors are not changed is transferred from the logic image memory 1 to the look-up table memory 3 and the data D4 ($b_7b_6b_5b_4b_3b_2b_10$) consisting of the most significant seven bits of the shaded image corresponding to the area B is transferred from the image memory 2 to the look-up table memory 3, the address data of the look-up table memory 3 to be designated by the data D4 consisting of the most significant seven and the data D3 consisting of the least significant bit is converted into Data 5, that is $b_7b_6b_5b_4b_3b_2b_10$, which is transferred to the D/A converter 4.

By appropriately adjusting the content of the table data stored in the look-up table memory 3, as described above, the contents of the look-up table memory 3 may be varied so as to change colors or not to change colors depending on the value of the least significant bit ("0" or "1") of the address value of the inputted data. Thus, it is easy to control whether the data of a shaded image is changed or not by referring to the content of the table data.

Figure 4A:
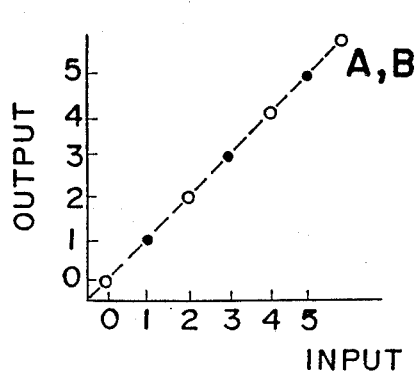
FIGS. 4(a) and 4(b) are characteristic diagrams of the look-up table of the first embodiment.
Figure 4B:
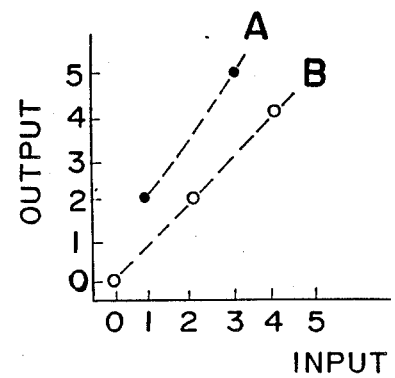

More specifically, a color of an image is not changed by creating the table data of the look-up table memory 3 so that identical data to the input address value is outputted irrespective of the value of the D3 ("0" or "1") as shown in FIG. 4(a). Whereas, a color of a specific area (the area A in this case) is changed by creating the table data of the look-up table memory 3 so that data is different from the input address value are outputted as shown in FIG. 4(b), i.e., the luminosity of the area A becomes high because the levels of data of the odd number addresses become high. The latter method is a process for emphasizing a specified area of an image. Besides this process, other processes are possible. For example, the conversion of the table data of the look-up table memory 3 permits the area A to be represented in only two shaded colors, in reversed colors, and so on.

Since a color of an image can be changed by rewriting the data of th look-up table memory 3 according to the image processing device having the above-described construction, the process that is required for changing the color of the image is much less than the conventional image processing device in that a color is changed by directly rewriting the contents of an image memory itself. Further, since the content of an image memory processing device of the invention can be retained, a color can be changed or restored at a very high speed.

(Second Embodiment)

Figure 5A:
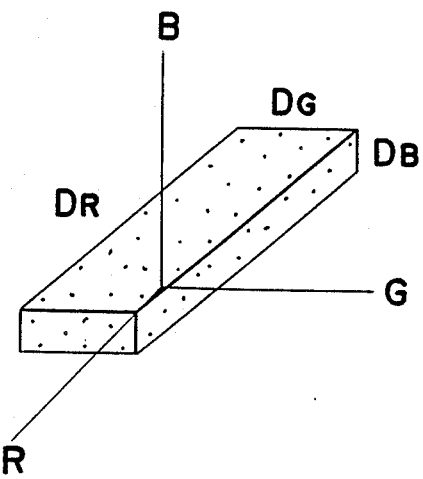
FIGS. 5(a) and 5(b) illustrate intensity data distribution of each color in a color space.
Figure 5B:
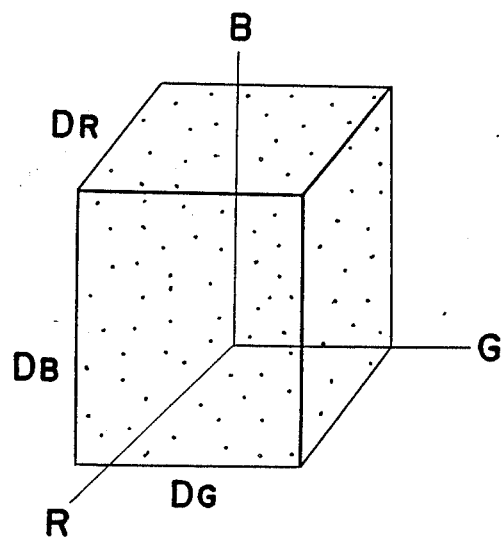
Figure 6:
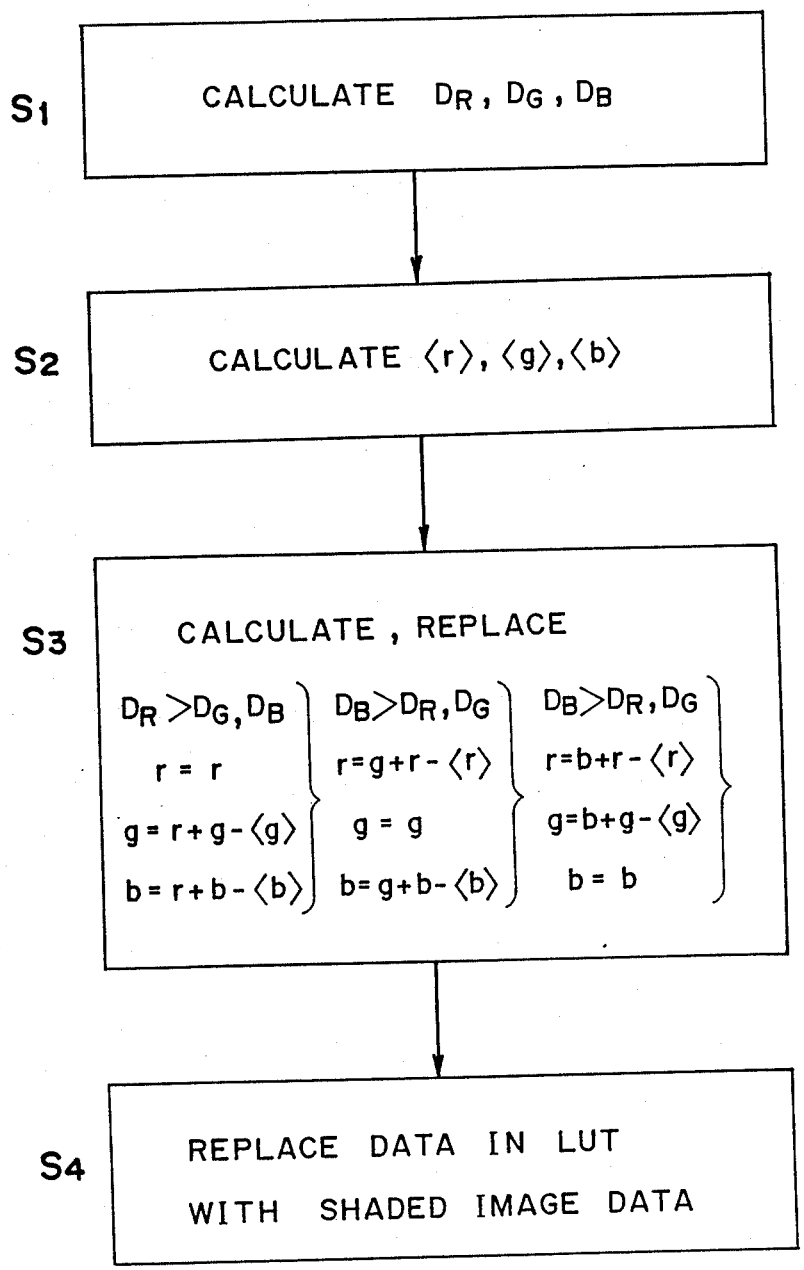
FIG. 6 is a flow chart of the rewriting device of a second embodiment.

FIGS. 5(a) and (b) illustrate the distribution of the intensity information of each color in a color space. FIG. 6 is a flow chart showing the rewriting device of the second embodiment.

An image processing device of the second embodiment has a construction similar to the construction described in the first embodiment. In a color change of an image as carried out in the first embodiment, when the color of an area to be changed inclines toward a primary color, for example, when the color is changed into a complementary color of the area color, the resulting color does not have the desired color. When the color of an image having shade is changed, the produced color of the shade is flat. This is because when a color inclines toward a primary color, for example red, and the color has shade, the range of the intensity change of red is very wide, i.e., the dynamic range of red is large. Therefore, a subtle change of shade can be obtained by changing the color. In this color change, however, the blue component of the image is similar to a full shade of primary red, so that the range of the intensity change of blue is small, and so, the dynamic range of blue is small. Though not primary, the blue component of the image can be changed into blue by reducing the output of red from a look-up table and enlarging the output of blue therefrom. However, the dynamic range of blue is small because the color of the image inclines toward a primary red. Therefore, a subtle intensity change cannot be obtained as far as blue is concerned. Such a problem can be obtained as far as blue is concerned. Such a problem can be solved by a device having the construction that is described in the second embodiment. The fundamental construction of the device of the second embodiment is the same as the construction shown in FIG. 1. The intensity information of the three primary colors R (red), G (green), and B (blue) is rewritten by the rewriting device of the processor 5 such that, with reference to the data of the color axis having the largest dynamic range, the dynamic range of the other color axis of the intensity information are widened. An arithmetic processing for this rewriting will be described with reference to FIG. 6.

(I) Step 1 (S1)

The dynamic ranges DR, DG, and DB of the red primary colors are calculated by the processor 5.

$$\left. \begin{array}{l} DR = \max r - \min r \\ DG = \max g - \min g \\ DB = \max b - \min b \end{array} \right\} \quad (1)$$

where r, g, and b represent the shaded image data of the three primary colors in each pixel. The above calculations are made by extracting image data in the whole range of the image (II) Step 2 (S2)

The intensity averages of the three primary colors are calculated by the processor 5.

$$\left.\begin{array}{l} <r> = \frac{1}{n}\Sigma r \\ <g> = \frac{1}{n}\Sigma g \\ <b> = \frac{1}{n}\Sigma b \end{array}\right\} \quad (2)$$

where $<r>$, $<g>$, and $<b>$ indicates the intensity averages of each color and n indicates the number of pixels.

(III) Step 3 (S3)

Assuming that the color with the largest dynamic range is red in this case on the basis of the dynamic ranges determined in equation (1), the processor 5 carries out the calculations of the intensity image data as follows.

$$\left.\begin{array}{l} r = r \\ g = r + g - <g> \\ b = r + b - <b> \end{array}\right\} \quad (3)$$

where the data of the shaded image of red of a pixel is not changed and the data of the shaded image of green is replaced with the data of the shaded image of green in the pixel resulting from the addition of the difference between the data of the shaded image of green in the pixel and the average of the data of the shaded image of green to the data of the shaded image of red in the pixel, and the data of the shaded image of blue is replaced with the data of the shaded image of blue in the pixel resulting from the addition of the difference between the data of the shaded image of blue of the pixel and the average of the data of the shaded image of blue to the data of the shaded image of red in the pixel. In this case, when the data $r + g - <g>$ obtained is negative after an operation is carried out, it is impossible to display the data, and so, g is assumed to be 0. When the data $r + b - <b>$ is negative, it is impossible to display the data, and so, b is assumed to be 0. The above operations are carried out when DR>DG, DB.

When DG DR, DB, the data of the shaded image is converted using the following equations:

$$\left.\begin{array}{l} r = g + r - r \\ g = g \\ b = g + b - b \end{array}\right\} \quad (4)$$

When DB DR, DG, the data of the shaded image is converted using the following equations:

$$\left.\begin{array}{l} r = b + r - <r> \\ g = b + g - <g> \\ b = b \end{array}\right\} \quad (5)$$

(IV) Step 4 (S4)

A color change is carried out by rewriting the table data of the look-up table memory 3 according to a color to be changed, with the shaded image data of the image memory converted at Step 3 (S3).

According to the image processing device having the above-described construction, since sufficient dynamic ranges can be obtained in all directions of the color axes of the three primary colors, an original shade is fully produced. Accordingly, a color change by means of the look-up table memory can be efficiently carried out by simple operations.

(Third Embodiment)

The third embodiment of the present invention will be shown in FIGS. 7 through 14.

Figure 7:
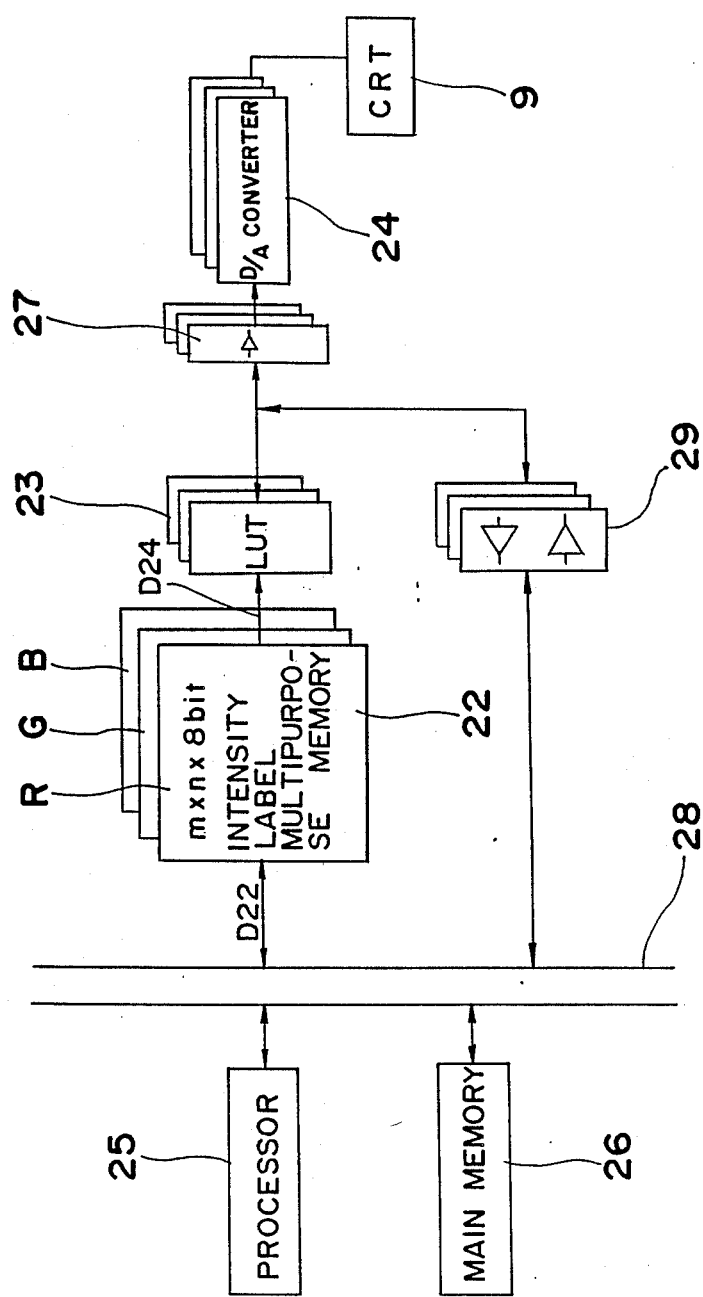
FIG. 7 is a block diagram of the image processing device of a third embodiment of the present invention.

FIG. 7 is a schematic diagram showing the construction of the present invention. An image processing device according to the present invention comprises a multi-purpose memory 22 for storing intensity information of each of the pixels composing image and label information that detects a pixel corresponding to an area whose intensity information is changed, as data having respective data lengths that are predetermined corresponding to the intensity information amount which of the image; a look-up table memory 23, to which output information is transferred from the multi-purpose memory 22, for changing and outputting the intensity information of the pixel which corresponds to the area in which the intensity information is changed; a display 9 for displaying an image according to the output from the look-up table memory; and a providing device 25 for providing the label information to the multi-purpose memory 22. Whereby, color changes and coloring of the image area corresponding to the predetermined label can be carried out.

The multi-purpose memory 22 can store both image information and label information. If the multi-purpose memory has the capacity of m×n×8k bits (m and n represent the resolution of the vertical line and the horizontal line of an image, respectively, and k indicates integers), then label information is stored in a redundant portion of the multi-purpose memory, namely in (8k−i) bits thereof, assuming that image information is i bits. Consequently, when a small quantity of information per one dot of an image is acceptable, the amount of label information can be increased, and so, the optimal combination of image information and label information quantity can be selected. Thus, the multi-purpose memory 22 can be efficiently utilized.

The image processing device of this embodiment will be described hereinafter. In the multi-purpose memory 22 as shown in FIG. 7, 8 bits are assigned to each data of red (R), green (G), and blue (B) per one dot. The output D24 from the multi-purpose memory 22 is connected to the address of the look-up table memory 23. The output from the look-up table memory 23 is inputted to the D/A converter 24 through a latch 27. In this embodiment, the outputs from the look-up table memory 23 of R, G, and B is eight bits each.

The output (video analog signal) from the D/A converter 24 is transferred to the CRT 9 for an image display. The multi-purpose memory 22 and a main memory 26 are accessed by a microprocessor 25 through a bus 28. The look-up table memory 23 is accessed by the microprocessor 25 through a gate 29 and the bus 28.

Figure 8:
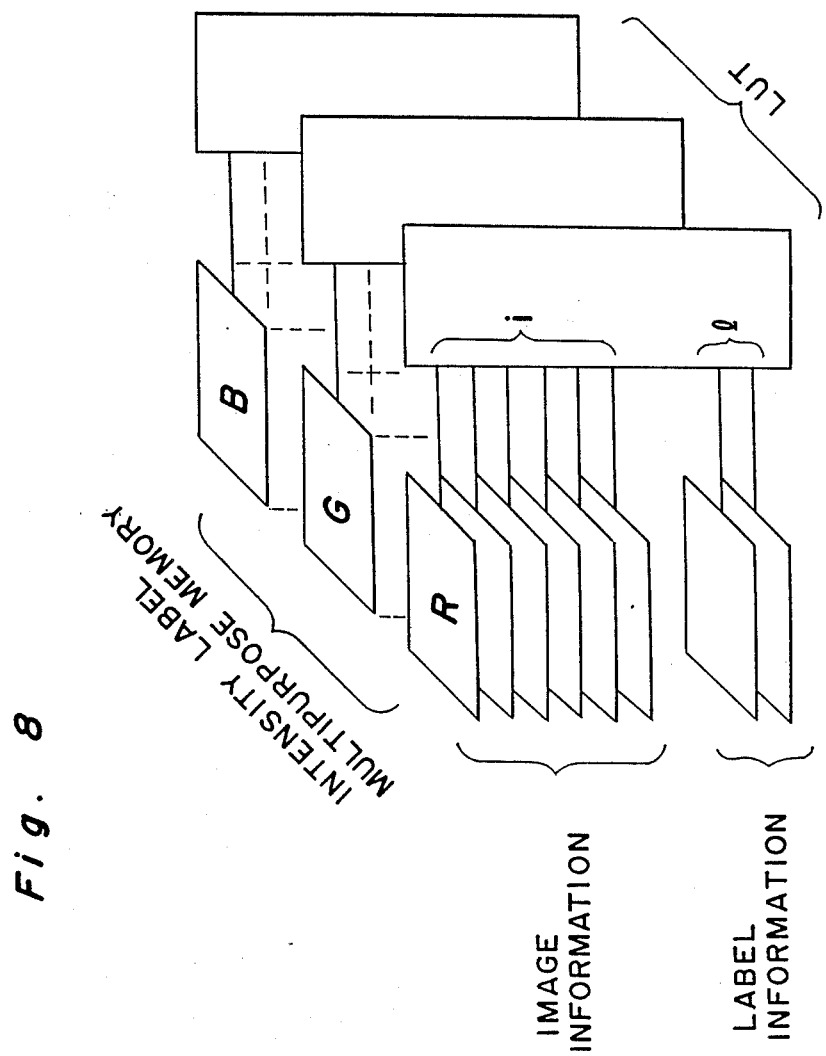
FIG. 8 illustrates a multi-purpose memory for intensity and label information which is used in one example of the image processing device as shown in FIG. 7.
Figure 9:
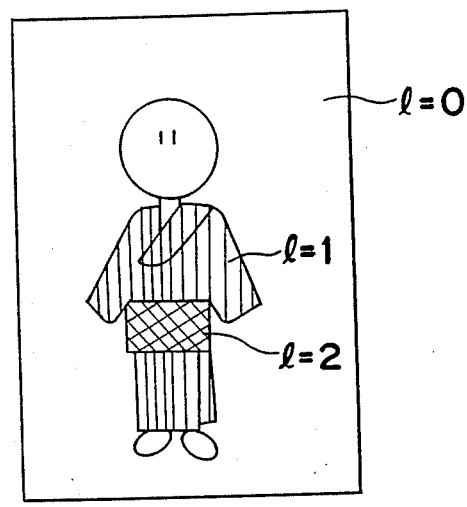
FIG. 9 illustrates label information of an image to be processed for intensity and label information in the multi-purpose memory of the third embodiment.

The function of the image processing device will be described An image is inputted to the multi-purpose memory 22 through the microprocessor 25, using a scanner or a TV camera. In this stage, eight bits are assigned to each data of R, G, and B per one dot in the intensity label multi-purpose memory 22. It is to be noted, however, that as described above, the necessary information quantity to be assigned to one dot is less than eight bits and varies according an image. For example, the assignment of six bits to each data of R, G and B is enough for the image information for a color change of the ground of a kimono and an obi. Therefore, in this case, the most significant six bits are assigned to image information storage and the least significant two bits are assigned to label information storage. FIG. 8 illustrates multi-purpose memory in which six bits are assigned for an image information and two bits are assigned for label information. In this case, the image information quantity range per one color i is $0 \leq i < 2^6$. The label information range l is $0 \leq l < 2^2$. The output from the multi-purpose memory 22 is $2^2 \times i + l$. In FIG. 9, an example of label information whose numerical value is different depending on the area is shown. In this case, data are provided by a microprocessor. In the area where the kimono is drawn, 1 is provided as l and in the area where the obi is drawn, 2 is provided as l, and 0 is provided as l in the area where neither the kimono nor the obi is drawn. In this case, R, G, and B have the same numerical value in each corresponding area. The method of writing the data is as follows:

The numerical values are written with a cursor that is displayed on CFR 9, i.e., numerical values are written in each area by moving the cursor, for example, from the kimono area to the obi area and then to the other area so as to provide the numerical values of each data in the label information memory area.

The method of changing colors will be described below. As described above, the output from the multi-purpose memory 22 is $2^2 \times i + l$, wherein l=0 means the area is of the background, and l=1 means the area of the ground is of the kimono, and l=2 means the area is of the obi. Therefore, when the address of the look-up table memory 23 for R, G, and B is assumed to be $2^2 \times i' + l'$ ($0 \leq i' < 2^6$, $0 \leq l' < 2^2$), only ground color of the kimono can be changed by the data of the area of the look-up area of th look-up table memory 23 which has the address of l'=1. Likewise, the color of the obi can be changed by altering the data of the area of the look-up table memory 23 which has the address of l'=2.

Figure 10:
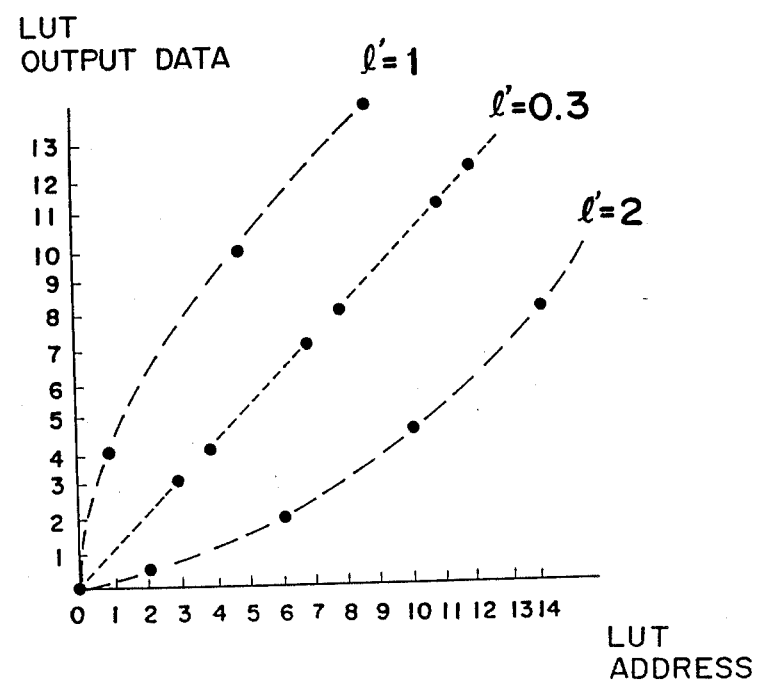
FIG. 10 is a characteristic graph of a look-up table that is used in the example of the image processing device as shown in FIG. 7.

The characteristic graph in FIG. 10 shows that the ground color (l'=1) of the kimono is made to be brighter than the original color and the color of an obi is made to be darker than the original color by the look-up table memory 23.

Figure 12:
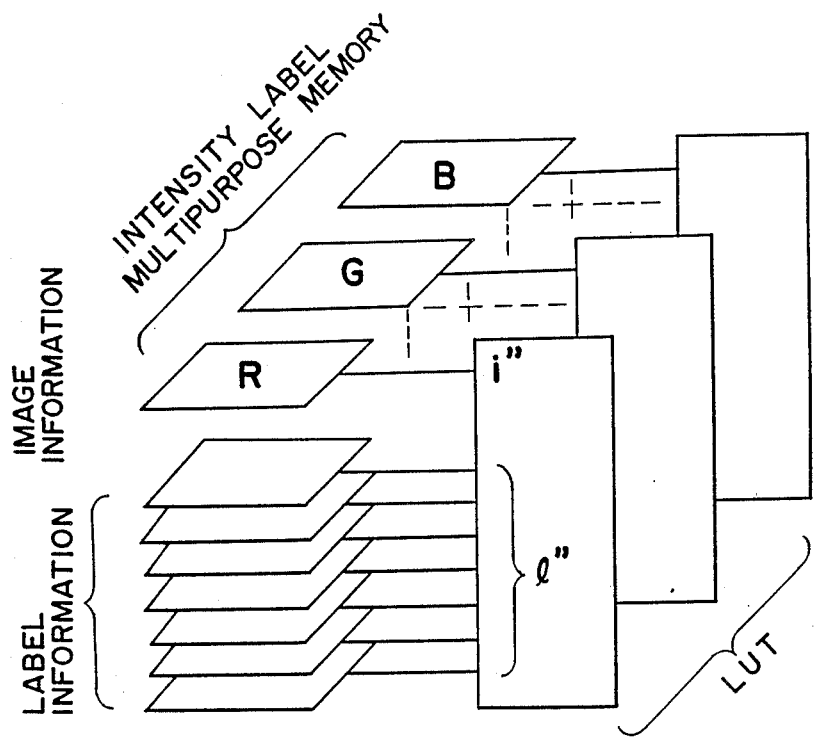
FIG. 12 illustrates a multi-purpose memory to be used in another example of the image processing device as shown in FIG. 7.
Figure 11:
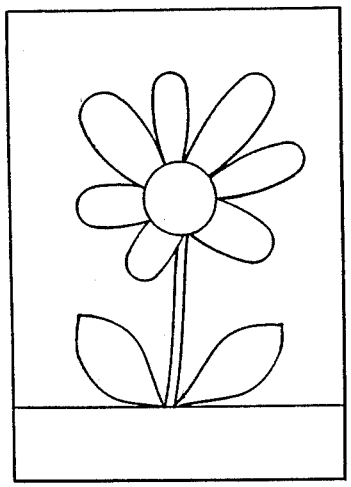
FIG. 11 illustrates an image to be processed in the third embodiment.
Figure 13:
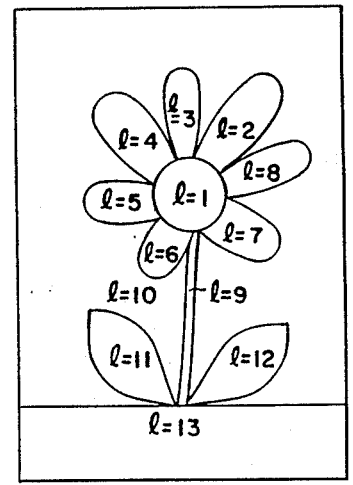
FIG. 13 illustrates label information of the image to be processed, that is shown in FIG. 11 in the multi-purpose memory.

One example of coloring a cell picture of an animation will be described below. The object to be colored is drawn in lines as shown in FIG. 10. Like the case of the kimono, the image is inputted to the intensity label multi-purpose memory 22 with a scanner or a TV camera. In this stage, the multi-purpose memory 22 can store eight bits for each R, G, and B per one dot. It is to be noted, however, that one bit per one dot will suffice when a line drawing is colored. Therefore, the most significant bit of the multi-purpose memory 22 is assigned for image information storage and the least significant bits are assigned for label information storage. The creation of the one-bit intensity information of R, G, and B can be made by setting a suitable threshold and carrying out a binary coding because the picture to be colored is monochrome. The illustration in FIG. 12 shows the multi-purpose memory 22 in which the most significant bit is assigned for image information storage and the least significant seven bits are assigned for label information storage. In this case, the image information data i for each R, G, and B is assumed to be 0 or 1 so that when l=0, the area corresponds to black lines and when l=1, the area corresponds to the white background area. The range of label information l is in the range $0 \leq l < 2^7$. Therefore, the output from the multi-purpose memory 22 is $2^7 \times i + l$. The microprocessor 25 is used to input data, i.e., the same numerical values for each R, G, and B are provided to the label information memory. The label information providing is performed by painting an area according to a drawn line stored in the image information memory. As shown in FIG. 13, different numerical values are assigned in 13 areas of an object to be colored.

The coloring method, after carrying out the processing described above, will be shown. The output of the multi-purpose memory 22 is $2^7 \times i + l$ and since the area where i=1 corresponds to the white background, the label number of an area to be colored is assumed to be l'' ($0 \leq l'' < 127$) and the contents of R, G, and B that are stored in the look-up table 23 are set to output a color whereby the area of label l'' is colored. Since the data of R, G, and B are outputted in eight bits, respectively from the look-up table 23, $2^{24}$ colors can be displayed. Further, the data to be provided to the look-up table 23 is only a numerical value, one byte per each R, G, and B, respectively, and so, image processing is performed at a very high speed. According to this method, coloring changes can be made as desired and at a very high speed only by providing 3-byte color data to the look-up tables 23 for each R, G, and B. In FIG. 14, a graph shows an example in which areas of the label number 1, 2, and 3 are colored in red, green, and blue that are produced by the look-up table 23. The address data of the look-up table 23 is from 0 to $2^7 - 1$ that correspond to the line area, so that, for example, the line areas can be black by making all the numerical values equal to 0.

Since the image processing device having the above-described construction uses a multi-purpose memory which can be employed for both image memory and label information storing memory, intensity information of an image and the number of labels can be increased depending on inputted images, that is, the memories can be used efficiently and as desired. Therefore, preferable image processing can be made on a small and inexpensive system. The use of a look-up table memory which is capable of rewriting data at a very high speed permits the color change of a plurality of areas corresponding to the number of labels.

In this embodiment, a device is shown which resolves color information into the three primary colors, R, G and B, and stores data of R, G and B. The invention may also be applicable to devices which resolve colors using luminosity, hue difference or the like.

(Fourth Embodiment)

A fourth embodiment of the present invention will be described with reference to FIGS. 15 through 21.

Figure 15:
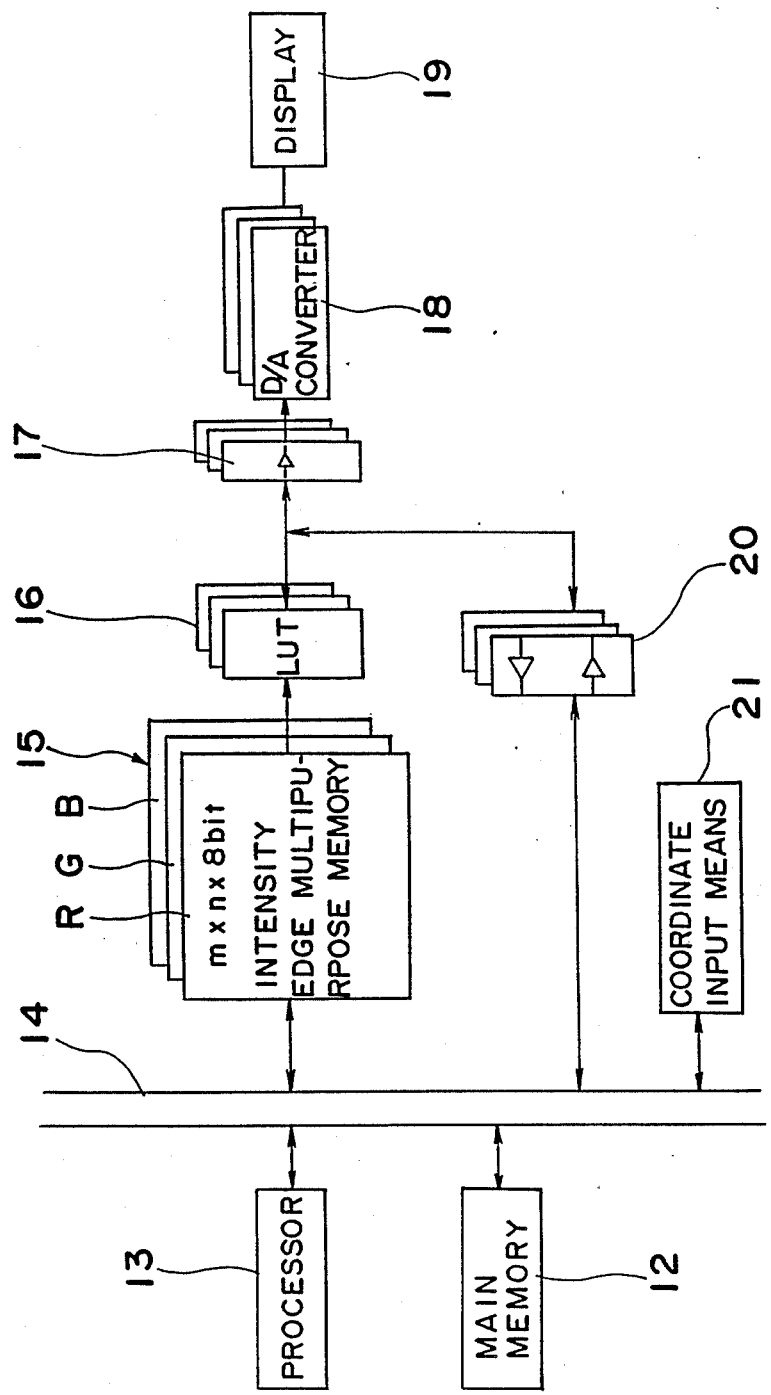
FIG. 15 is a block diagram of the image processing device of fourth embodiment according to the present invention.

FIG. 15 is a schematic diagram of an image processing device of the fourth embodiment. The image processing device comprises a multi-purpose memory 15 for storing intensity information of each of the pixels composing image and edge information which detect a pixel of the area that is taken out or extracted after a change of the intensity information therein and/or a pixel which corresponds to the edge of the area to be extracted; a look-up table memory 16, to which output information is transferred from the multi-purpose memory 15, for changing the intensity information of the pixel which corresponds to the area to be taken out having changed intensity information and that of the pixel which corresponds to the edge of the area to be taken out so that the changed intensity information may be outputted; a display 19 for displaying an image according to the output information from the look-up table memory 16; a providing device 13 for providing the edge information to the multi-purpose memory 15; and a look-up table setting device 13 for setting the contents of the look-up table memory 16 so that the intensity information of the pixel on the edge may represent a changed color of the area to be taken out and the color of an original image, whereby color changes of the area to be extracted are carried out so that the edge thereof may not be conspicuous.

The image processing device is provided with a multi-purpose memory 15 to which eight bits are assigned for R, G, and B, respectively. The multi-purpose memory 15 stores intensity information composing an image and edge information which detects an extracted area or the edge thereof depending on the situation. The output from the multi-purpose memory 15 is connected to the address of the look-up table memory 16. The output from the look-up table memory 16 is inputted to a D/A converter 18 through a gate circuit 17.

The look-up table memory 16 is accessed by a microprocessor 13 through a bus 14 and a gate 20. The microprocessor 13 includes a look-up table setting device for rewriting the intensity information in the look-up table memory 16 by calculating the intensity information, which will be described below.

The output (video analog signal) from the D/A converter 18 is transferred to a display 19 from an image display. The multi-purpose memory 15 and the main memory 12 are accessed by the microprocessor 13 through the bus 14. The coordinate input device 21 is accessed by the microprocessor 13 through the bus 14. The coordinate input device 21 can input a specific coordinate which is on an image.

Figure 16:
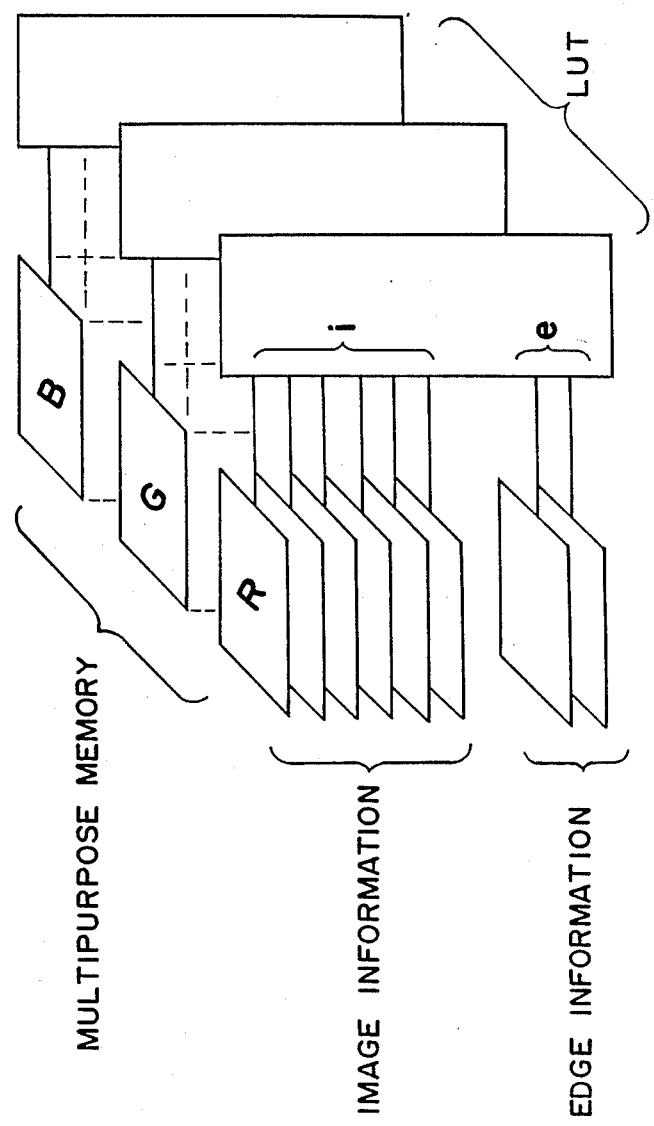
FIG. 16 illustrates the contents of the multi-purpose memory and the look-up table memory of the fourth embodiment.
Figure 20:
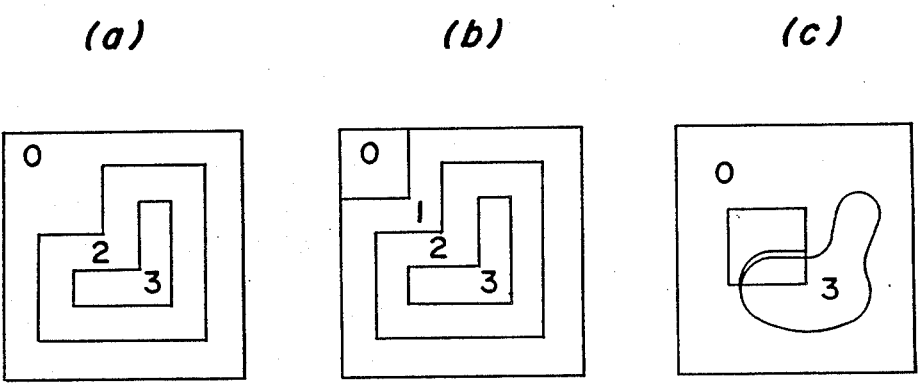
FIGS. 20(a)–(c) illustrate diagrams in which edge information is provided.
Figure 21:
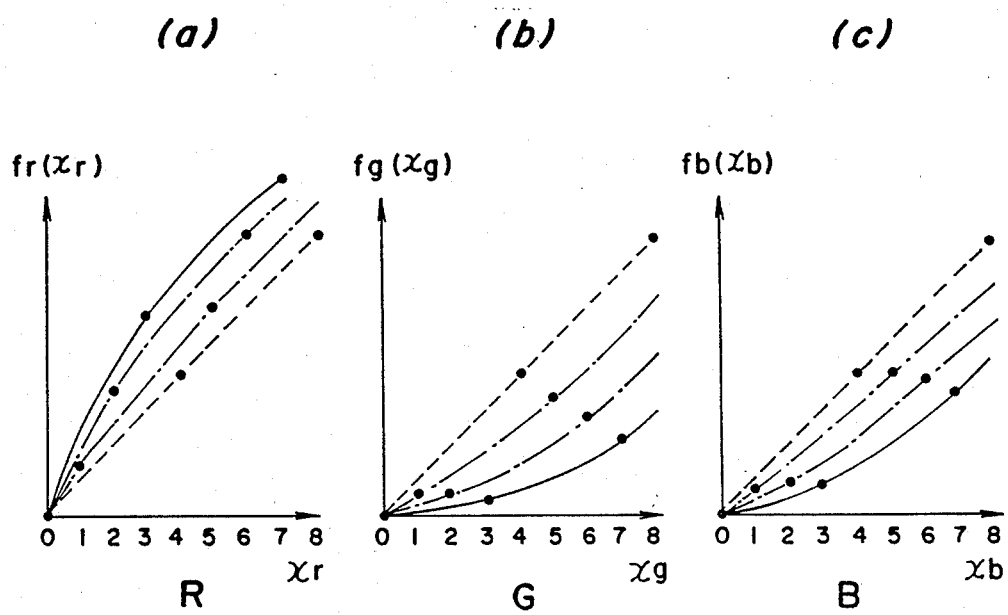
FIGS. 21(a)–(c) illustrate diagrams showing R, G, and B components in a look-up table.

The method of processing an image according to the device of this embodiment will be described. First, image information is inputted to the multi-purpose memory 15 with a scanner or a TV camera, etc. In this stage, the multi-purpose memory 15 stores eight-bit information for R, G, and B, respectively per one dot. Thereafter, the most significant six bits of the multi-purpose memory 15 are assigned for an image, namely, intensity information and the least significant 2 bits are assigned for edge information. FIG. 16 shows a multi-purpose memory thus set. The number of bits assigned for image information and for edge information, respectively, can be appropriately changed depending on the contents of the inputted image information. According to the above mentioned information providing, the information to be stored in the K (K=r, g, and b) component of the multi-purpose memory 15 to which the data of R, G, and B are inputted consists of the intensity information $ik$ ($0 \leq ik < 2^6$) and the edge information $e$ ($0 \leq e < 2^2$). The output $Xk$ from the multi-purpose memory 15 is indicated as the following equation: $Xk = 2^2 \times ik + e$.

Next, the method of carrying out the edge processing by using the edge information will be described. The edge information is set using the providing device included in the microprocessor 13. That is, the background area is assumed to be 0 and an area to be extracted is assumed to be 3 of the area whose edge processing is required, the area near the area to be extracted is assumed to be 2, and the area far from the area to be extracted is assumed to be 1. FIG. 17 illustrates a drawing in which edge information is written. The diagonal lines show the portion where the edge process is carried out. An extraction may be carried out using a threshold on intensity information. As a method of providing edge information which is 0 to the background area, 0 is written for all edge information before writing edge information.

The method of providing edge information 1 and 2 to the edge processing areas is as follows:

(1) First, a diagram, which moves in accordance with a coordinate value inputted by a coordinate device 21 is displayed on a screen, and then, edge information 1 or 2 is written in the position of this diagram. In this case, various diagram sizes are prepared in advance for a selection.

As shown in FIG. 18(a), a method of setting edge information 1 and 2 can be performed by setting a brush device, whereby edge information 2 is written to the center of the diagram and edge information 1 is written to the periphery of the diagram. When the brush device is used to write edge information, the edge information to be written to a position is compared with the edge information which has been previously written to the position. In this case, if the former is larger than the latter, edge information is written to the position. For example, when edge information has been written as shown in FIG. 18(b) and the brush device of FIG. 18(a) is moved as shown by an arrow in FIG. 18(b), edge information is written to the background area as shown in FIG. 19(c). Besides the brush device which has a function for writing edge information to the background area, the following method is efficient for writing edge information, namely writing edge information while an extracted area is being erased. More specifically, as shown in FIG. 19(a), a brush device is set, i.e. edge information 0 is written in the center and edge information 1 in the periphery thereof, and edge information 2 is written in the periphery of the area where the edge information 1 is written. In this case, if the information to be written to the position is smaller than that which has previously been written, edge information is written to the position. When edge information is set as shown in FIG. 19(b) and the brush device of FIG. 19(a) is moved as shown by an arrow in FIG. 19(b), edge information is written in an extracted area as shown in FIG. 19(c).

(2) In the example described above, besides the method of providing edge information interactively in the neighborhood of a coordinate to which edge information is inputted by the coordinate input device 21 is shown, there is a method for providing information without using a brush device.

In FIG. 20(a), there is shown a method of tracing the edge of the extracted area, and then, writing edge information 2 in the periphery. Using the same method as above and providing edge information 1 changes the diagram as shown in FIG. 20(b). Methods for tracing an edge include a method which is used to analyze binary-coded images by using a mask of 3×3. The amount of edge information to be added to the periphery previously provided can be selected depending on the situation. Further, a method of adding edge information to only a portion of the extracted periphery is available, that is, information in a rectangular area is inputted as shown in FIG. 20(c), and then, the above-described processing is carried out only in the rectangular area. This method has an advantage that edge information can be provided only in the edge which is desired to be shaded without adding any edge information to portions which should not be erased. In the above-described method, edge information is provided from the periphery of an extracted area toward the outside thereof, however, it is possible to provide edge information from the periphery toward the inner portion.

The important point in providing edge information in all of the above-described methods of providing edge information is that the values of edge information is different from those of the extracted areas and the background that are provided in portions whose edges are processed.

A color change without making edges clear by using edge information set by the above-described methods can be made by calculating the data of the look-up table memory 16 by means of the look-up table setting device as follows. In the equation below, iK indicates the output from intensity information of K component of a color. The equation is expressed as $xK = 2^2 \times iK + e$. The equation expresses a relationship among the output xK from the multi-purpose memory, intensity information iK from the multi-purpose memory, intensity information iK and edge information e. fK(xK) in the equation below is the output from the look-up table memory 16 and [ ] is Gauss symbol.

$$fK(xK) = \left[ \frac{e \times FK(iK) + (3 - e) \times IK(iK)}{3} \right]$$

$$(e = 0, 1, 2, 3)$$

This equation means that the output from the look-up table memory 16 is the addition of the function FK (ik) and IK (ik) according to the value of the edge information e. For example, when the edge information e is 0, fK(xK)=IK(iK). When e is 3, fK(iK)=FK(iK). When e is 1 or 2, the value of fK(xK) takes the average value of FK(iK) and (iK). From the above equations, by setting FK(iK) as the function for changing and outputting the intensity information of an image and IK(iK) as the function for outputting intensity information of the image as it is, an image whose original color has been changed is displayed in an extracting area (e=3) caused by the output of FK (ik) and the original image is displayed in a background area (e=0) caused by the output of IK(ik). When the edge processing area (e=1 or 2) exists between the above-identified areas, a color is displayed between the color of a color-changed image and the color of an original image due to the output from the area, with the result that the edge of an image is not clear.

The graphs shown in FIGS. 21(a), (b), and (c) indicate the components of R, G, and B outputted from the look-up table according to the above-described setting. In the graphs, a solid line indicates the function FK which changes colors, i.e., emphasizing red and de-emphasizing green and blue. The dashed line shows the function IK which displays an original image. Dot-dash-lines indicate the functions whose values are intermediate between that of FK and IK. Solid dots are the values to be set in the look-up table memory. The abscissa indicates xK and the ordinate indicates fK(xK).

In this embodiment, the information quantity of edge information is set to two bits, however, it may be increased.

A color change to be carried out in this embodiment is limited to one color in one operation, however, a plurality of colors can be changed in one operation without making the edge color clear by setting label information to a specific bit besides setting shade information and edge information to specific bits at the same time.

The image processing device is provided with a multi-purpose memory which stores intensity information and edge information, a look-up table memory, a providing device for providing edge information, and a look-up table memory setting device for setting the content of the look-up table memory according to the intensity information and the edge information. Therefore, the image processing device has a function for changing the color of an extracting area and of processing an edge in such a manner that does not make the color of the edge clear without rewriting the intensity information of an image. This operation can be repeatedly made at a very high speed.

(Fifth Embodiment)

Figure 22:
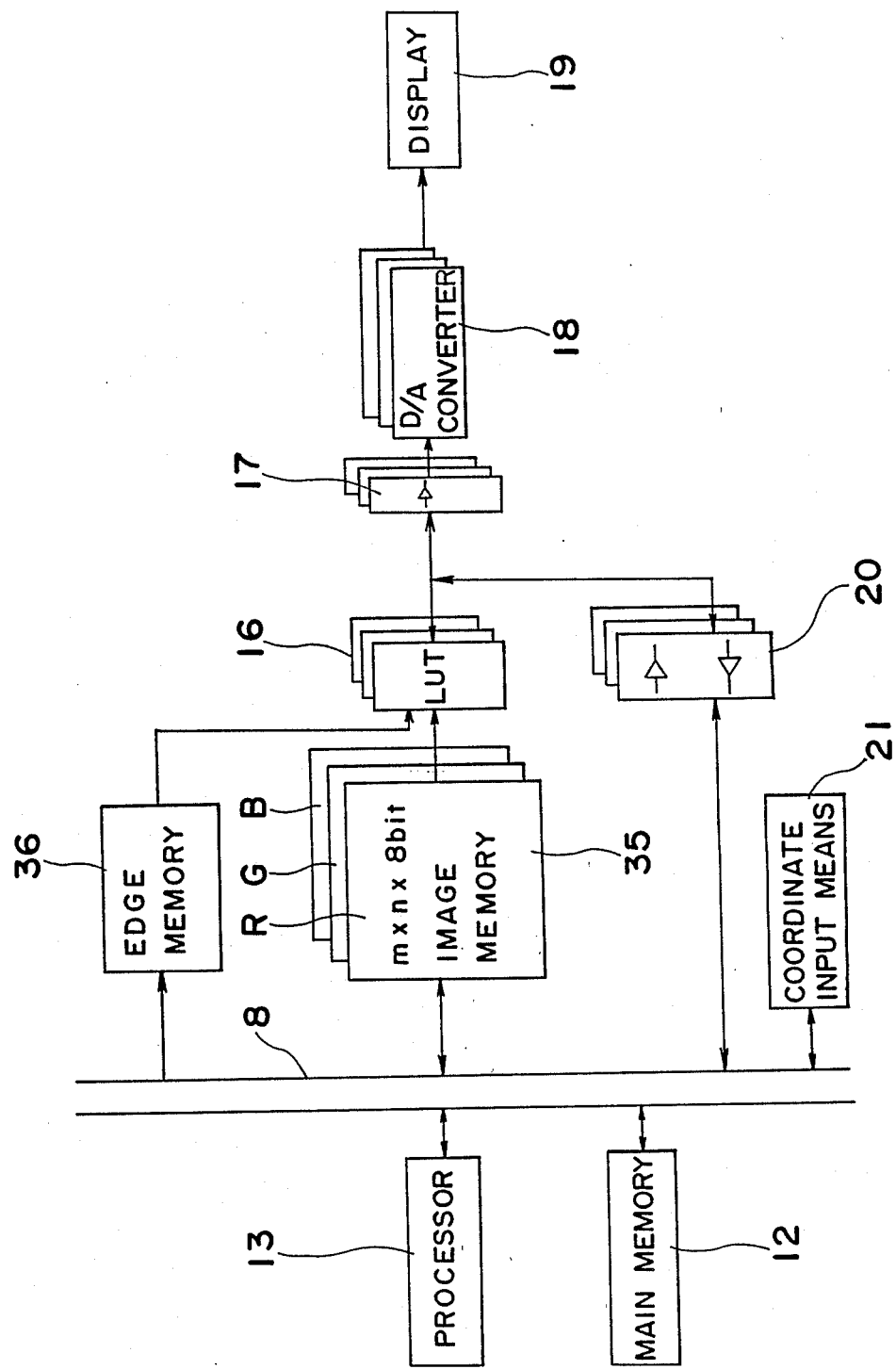
FIG. 22 is a block diagram of the image processing device of fifth embodiment of the invention.

FIG. 22 is a schematic diagram of a fifth embodiment of the present invention. An image processing device of the fifth embodiment is characterized in that it comprises an image memory 35 for storing intensity information of each of the pixels composing an image; an edge memory 36 for storing edge information which detects a pixel in the area which is to be changed in the intensity information thereof and/or taken out of a pixel corresponding to the edge of the area; a look-up table memory 16, to which output information of both the image memory and the edge memory 36 is transferred, for changing the intensity information of the pixel corresponding to the area to be taken out whose intensity information is changed and the intensity information of the pixel which corresponds to the edge of the area to be taken out so as to output the changed intensity information; a display for displaying an image according to the output information from the look-up table memory; a providing device 13 for providing edge information to the edge memory; and a look-up table setting device for setting contents of the look-up table memory 16 according to the intensity information and edge information so that the intensity information of the pixel on the edge may represent a color resulting from the changed color of the area to be taken out and the color of an original image, whereby color changes of the area to be extracted are carried out so that the edge thereof may not be conspicuous.

The image processing device shown in FIG. 22 has the edge memory 36 which is specialized for edge information. Since a single kind of edge information is used to each color of R, G, and B, only one screen is required for the edge information. The output from the edge memory 36 is connected to the input of the look-up table memory 16 for each color of R, G, and B. The construction of the image processing device shown in FIG. 22 is the same as that of the image processing device shown in FIG. 15 except that the image memory 35 is provided separately from the edge memory 36. Therefore, the description of the device of this embodiment is omitted.

In the image processing device with the above-described construction, the look-up table setting device sets the contents of the look-up table memory so that the intensity information of the pixel on the edge may represent a color resulting from a changed color of the area to be taken out and the color of an original image with the intensity information and the edge information pre-service in the image memory and the edge memory, respectively. Accordingly, the edge of an image can be displayed with the edge being inconspicuous and without changing the data thereof previously stored.

(Sixth Embodiment)

Figure 23:
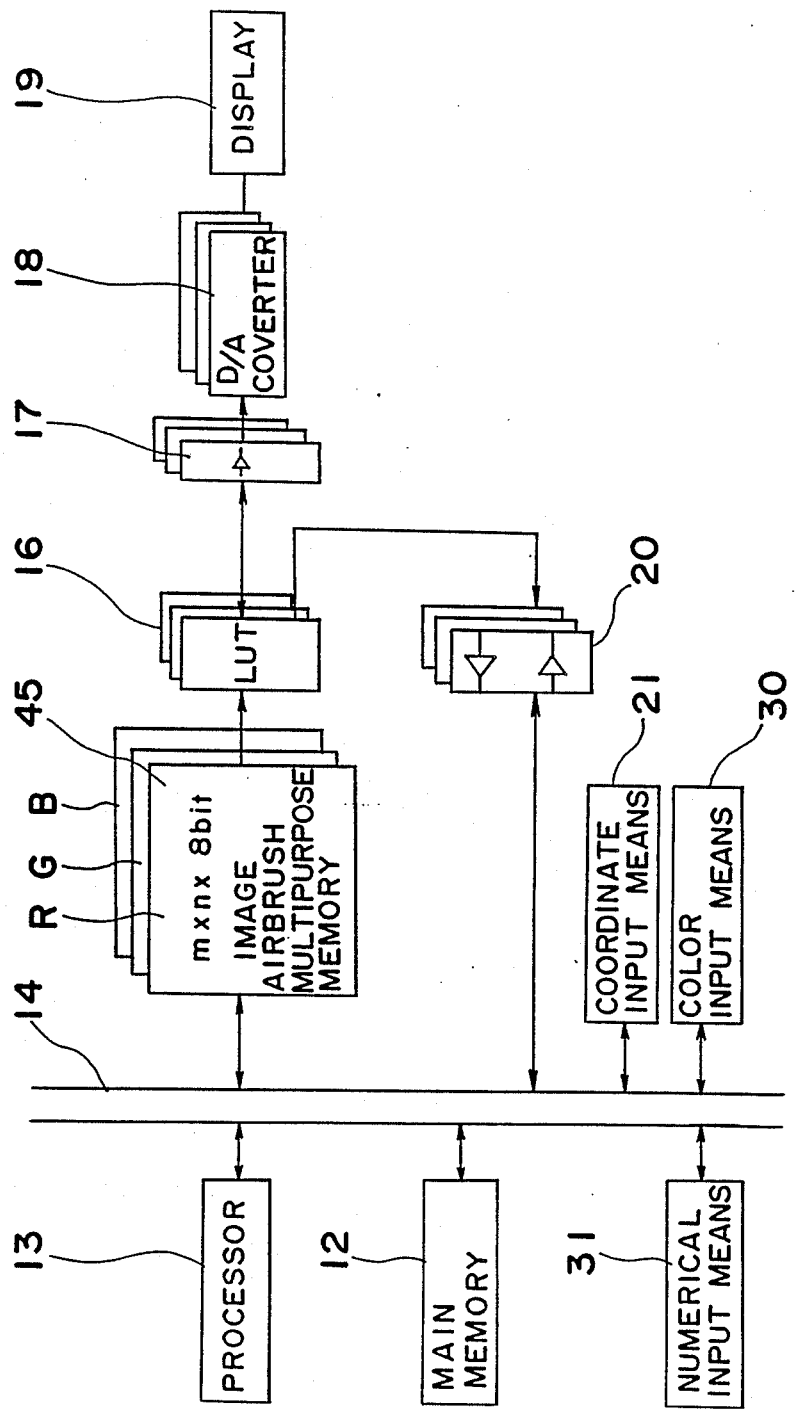
FIG. 23 is a block diagram of the image processing device of a sixth embodiment of the present invention.

A sixth embodiment of the present invention will be described with reference to FIGS. 23 through 30. FIG. 23 is a block diagram of an image processing device described below. The image processing device is provided with a multi-purpose memory 45 which stores the intensity information of an original image and the intensity information of an airbrush using 8 binary digits for each color of R, G and B. The output of the multi-purpose memory 45 is connected to an address of the look-up table memory 16. The output from the look-up table memory 16 is connected to the D/A converter 18 through the gate circuit 17. In this embodiment, the output from the look-up table memory 16 has a bit capacity ranging from 0 to 255 for each R, G, and B.

The look-up table memory 16 is accessed by the microprocessor 13 through the bus 14 and the gate 20. The microprocessor 13 includes a providing device for providing the intensity information of the airbrush in conformity with a predetermined pattern. The output (video analog signal) from the D/A converter 18 is transferred to the display unit 19 for an image display. The multi-purpose memory 45 and the main memory 12 are accessed by the microprocessor 13 through the bus 14. The coordinate input device 21 is accessed by the microprocessor 13 through the bus 14 and specific coordinates on an image can be inputted by the coordinate input device 21. The color of the airbrush can be inputted by the color input device 30 and the strength of the airbrush can be inputted in a numerical value relating to the numerical input means 31 which is an airbrush strength input device.

Figure 24:
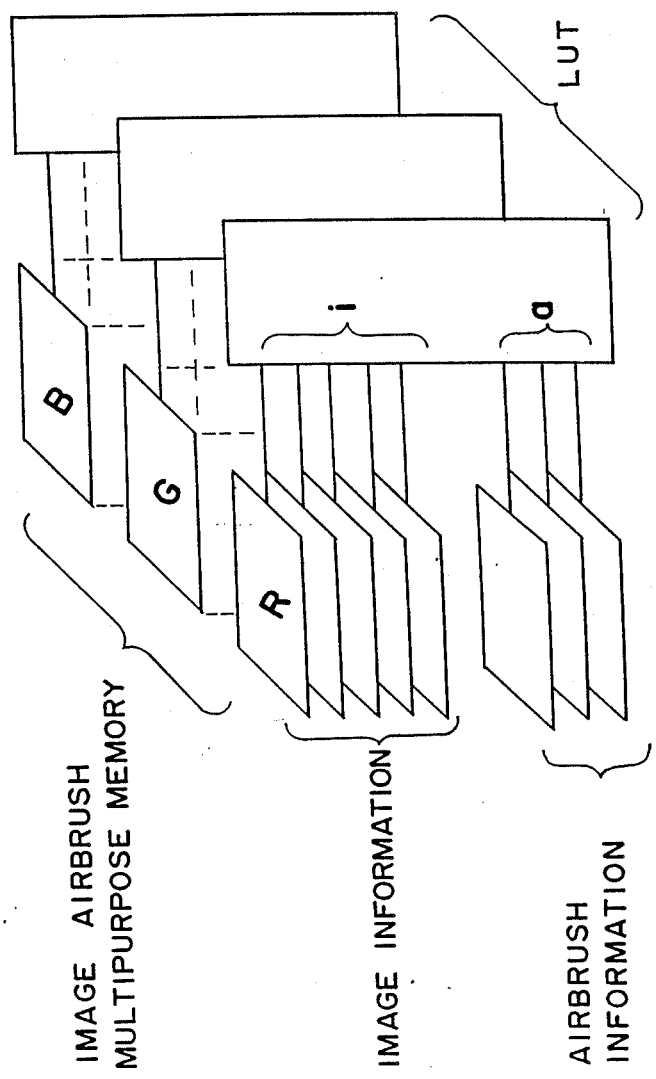
FIG. 24 illustrates the contents of the multi-purpose memory for image and airbrush information and the look-up table memory of the sixth embodiment.

The operation of the image processing device of this embodiment will be described. First, an image is inputted to the multi-purpose memory 45 through means such as a scanner, or a television camera. In this stage, the multi-purpose memory 45 can store eight binary digits or bits for each color of R, G, and B per one dot, or 24 bits in all. Next, the most significant five bits of the multi-purpose memory 45 are assigned to image information and the least significant three bits are assigned to airbrush intensity information. The multi-purpose memory thus set is shown in FIG. 24. The bit lengths to be assigned to image information and airbrush intensity information may be changed in accordance with the contents of inputted image information. By setting the bit length as above, the information to be stored in k component (k=r, g, b) of the multi-purpose memory 45 consists of the intensity information ik ($0 \leq ik < 2^5$) of the image and the intensity information ($0 \leq a < 2^3$) of the airbrush. Accordingly, the output xk from the multi-purpose memory 45 is shown as follows: $xk = 2^3 \times ik + a$.

The method of airbrush processing using the intensity of the airbrush will be described below. Provision of the intensity information of the airbrush is performed as follows:

A providing pattern shown in FIG. 25(a) is defined in which the intensity value decreases from the center toward the periphery thereof. The providing pattern is moved on a screen according to coordinates inputted from the coordinate input device 21. At this time, the intensity value of each of the pixels constituting the writing pattern is compared with the intensity information of the airbrush at a given point corresponding to the pixel of an original image. If the latter is smaller than the former, the latter is replaced with the former. For example, when the intensity information of the airbrush is all 0, one time providing of the intensity values of a providing pattern shown in FIG. 25(a) thereto changes the providing pattern as shown in FIG. 26(a). Next, when the providing pattern is moved as shown by the arrow in FIG. 26(b), the intensity information of the airbrush is written as shown in FIG. 26(c). It is to be noted that since the intensity information of the airbrush is provided in a space for the airbrush intensity information in the multi-purpose memory 45, the intensity information of the original image is never lost. If the airbrush intensity information is erroneously inputted, a correction pattern which increases the intensity value from the center toward the periphery is defined so as to make a correction without reducing the airbrush effect. More specifically, similar to the above method, the correction pattern is moved according to coordinates inputted form the coordinate input device 21 and the intensity value of each of the pixels constituting the correction pattern is compared with the intensity information of the airbrush of the original image. If the latter is larger than the former, the latter is replaced with the former. For example, with respect to the airbrush intensity information of FIG. 27(a), the airbrush intensity information of FIG. 27(c) can be obtained by moving the modification pattern of FIG. 25(b) as shown by the arrow in FIG. 27(b).

The airbrush effect using the airbrush intensity information provided in the above way can be obtained by setting the look-up table memory 16 as follows. In the following equation (1), ik indicates the shade or the intensity information of the k component of an original image color. Symbol (a) indicates the intensity information of the airbrush. The relationship between the symbol (a) and the output xk from the multi-purpose 15 is $xk = 2^3 \times i + a$. *IK(ik) is a function which indicates the original image as it is. fk(xk) is the output from the look-up table memory 16 outputted according to the intensity information of the original image, the intensity information, color information, and the strength information of the airbrush. Each of (Cr), (Cg) and (Cb) is color information which is inputted by the color input means 30 and represents the color of the airbrush.* [ ] *is the Gaussian symbol.*

$$fk(xk) = \left[ \frac{A \times a \times ck + (7 - A \times a) \times Ik(ik)}{7} \right] \quad (1)$$

Where (a)=0, 1, 2, 3, 4, 5, 6, 7, and $0 \leq A \leq 1$. A is a parameter for the strength of the airbrush inputted by the numerical input device 31. Assuming that A=0, the value of the equation (1) is fk(xk)=Ik(ik) irrespective of the intensity information (a) of the airbrush, in which case, the airbrush effect is lost. When A=1, the value of fk(xk) varies according to the intensity information (a) of the airbrush. For example, when a=7, fk(xk) Ck, in which case, the color of the airbrush is displayed. When a=0, fk(xk) Ik(ik), in which case, the information of the original image is displayed. When 0<(a)<7, a color between the color of the airbrush and the color of the original image is displayed. Thus, such an airbrush effect can be obtained by the color becoming thinner from the area where the intensity information of the airbrush (a)=7 towards the periphery. It is determined by the provided intensity information of the airbrush where and how the color becomes thinner. When the value of A is between 0 and 1, the output value is between the values obtained above. Thus, the strength of the airbrush is varied on the whole.

In the above equation (1), numerical value 7 corresponds to the maximum value of the intensity information of the airbrush, which means that the numerical value may be varied according to the information capacity of the airbrush.

Figure 28A:
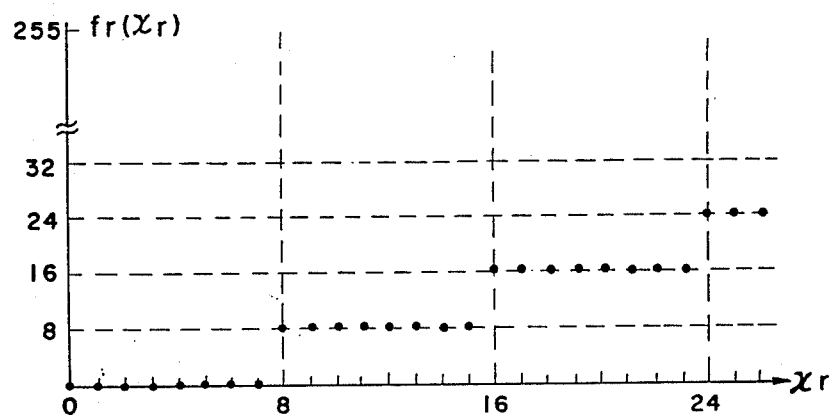
FIGS. 28(a), 28(b), 28(c), FIGS. 29(a), 29(b), (c)
Figure 28B:
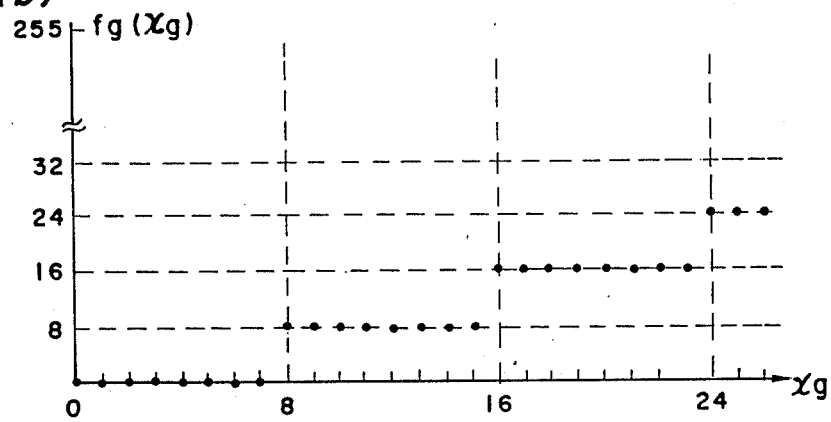
Figure 28C:
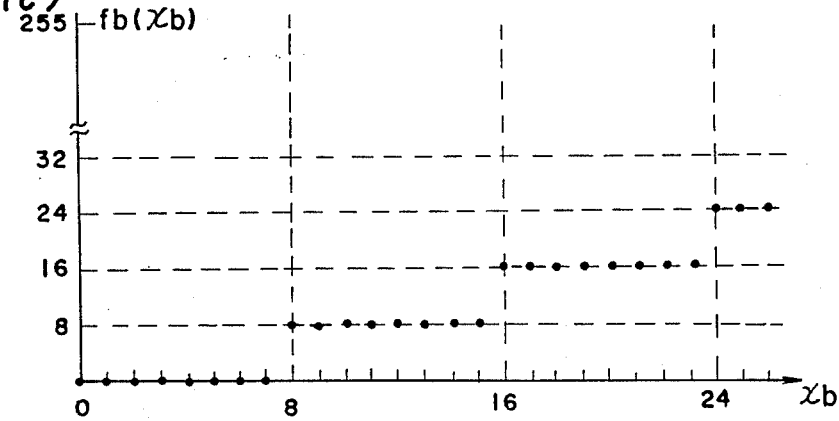
Figure 29A:
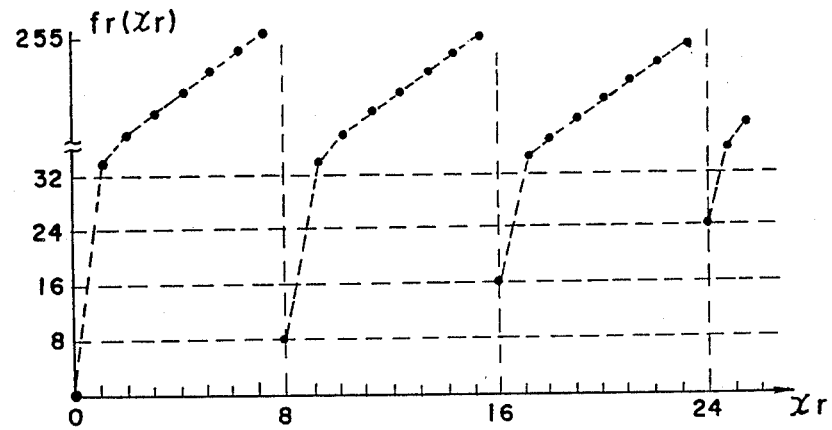
Figure 29B:
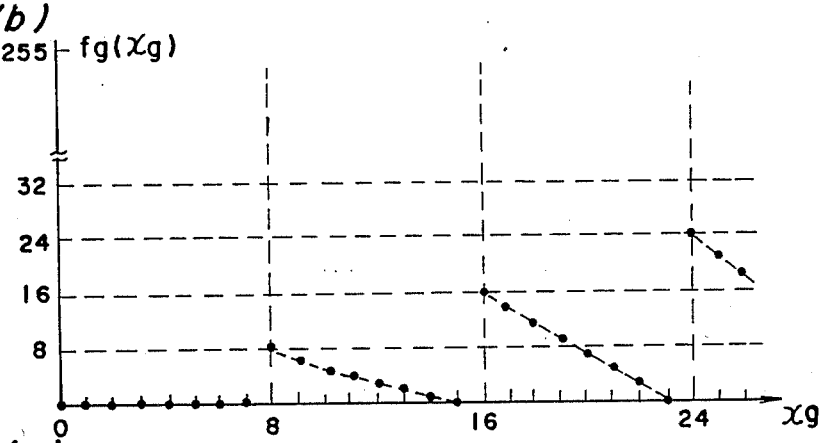
Figure 29C:
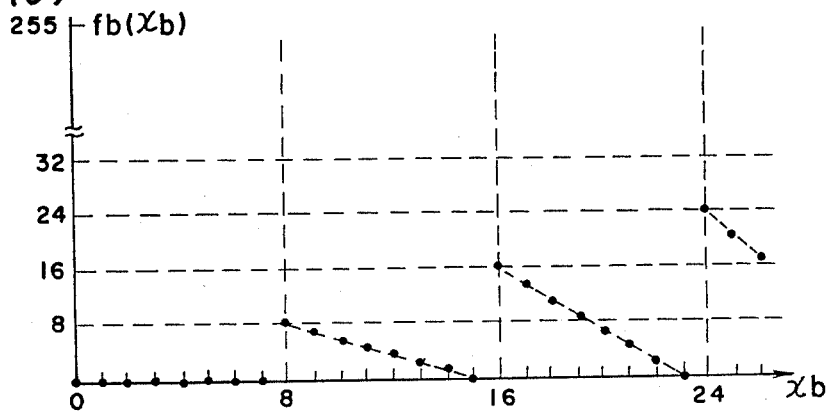
Figure 30A:
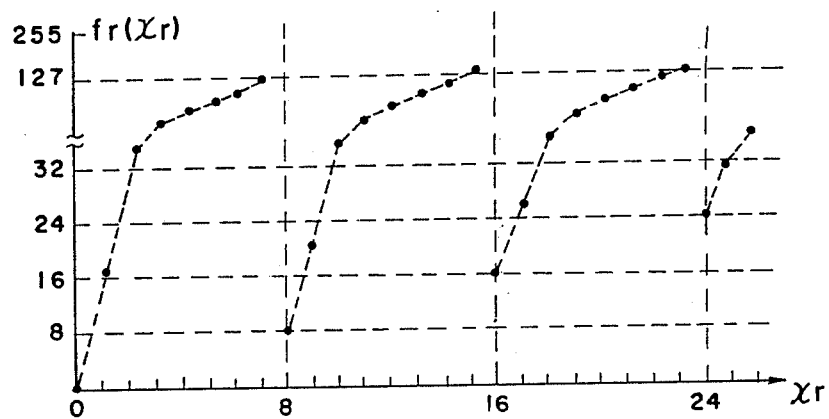
FIGS. 30(a), 30(b), and 30(c) illustrate the outputs from the look-up table memory according to the intensity information of the airbrush, respectively.
Figure 30B:
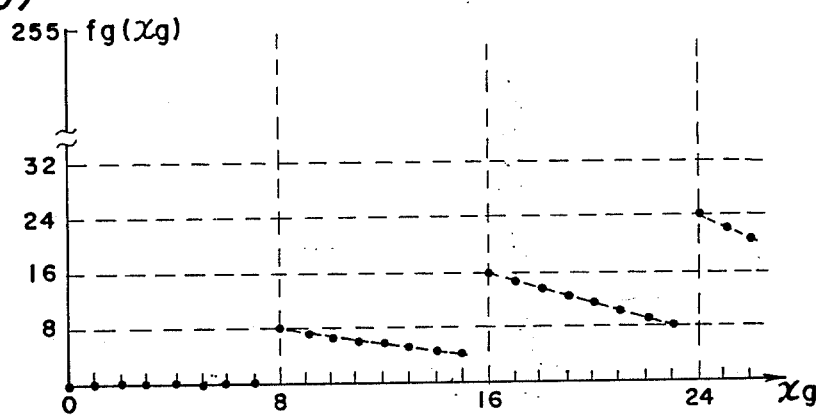
Figure 30C:
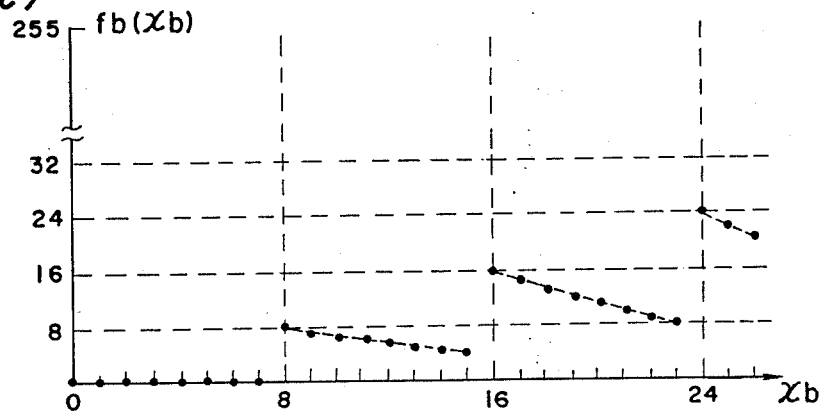

Shown in FIGS. 28(a), (b), and (c), FIGS. 29(a), (b), and (c), and FIGS. 30(a), (b), and (c) are examples of setting the look-up table memory 16. In more detail, FIGS. 28(a), (b) and (c) show a relationship between the input and output thereof when A=0. FIGS. 29(a), (b) and (c) show a similar relationship thereof when A=½. In the figures, the ordinates indicate the outputs fr(xr), fg(xg), and fb(xb), respectively. The abscissas indicates the inputs xr, xg, and xb. The color (Cr, Cg, and Cb) of the airbrush is red (255, 0, 0).

It is understood that the airbrush effect is lost because the strength information of the airbrush is 0 in FIGS. 28(a), (b), and (c), so the outputs fr(xr), fg(xg), and fb(xb) vary according to the strength information (a) of the airbrush because the strength information A of the airbrush is 1 in FIGS. 29(a), (b), and (c), and that the intensity information of the airbrush is added to the original image because the strength information A is ½ in FIGS. 30(a), (b), and (c).

In the above embodiment, the intensity information of the airbrush is set to 3 bits or binary digits, however, the information quantity may be changed according to the contents of images.

In the above embodiment according to the present invention, the intensity information of the airbrush is stored in the multi-purpose memory. However, an image memory for use in only the intensity information of the airbrush may be separately provided. In this case, the image memory only for intensity information of the image and a separate memory only for intensity information of the airbrush acts together on the same way as the above-described multi-purpose memory.

Because the image processing device having the above-described construction is provided with a look-up table memory, an effect of an airbrush for displaying off-shade colors such as puffed rouge and specular surface can be obtained without losing the contents of an image. Further, the device is provided with a color input device, an airbrush strength input device, and a providing device for providing intensity information of the airbrush so that a color can be changed and the intensity of the airbrush can be also changed after obtaining the airbrush effect. Furthermore, the device has an advantage that the operation can be carried out at a very high speed because a change of the contents of the image memory is unnecessary and only the change of the look-up table is necessary.

(Seventh Embodiment)

An embodiment of the present invention will be described with reference to FIGS. 31 through 33. FIG. 31 is a schematic diagram of an image processing device of the present invention. As shown in FIG. 31, the outputs from a m×n×8-bit multi-purpose memory to which 8 bits are assigned per one dot for each of R, G, and B are connected to the address of a look-up table memory 16. The output from the look-up table memory 16 is connected to a D/A converter 18 through a gate 17. In this embodiment, the outputs from the look-up table memory 16 are eight bits (0–255) for R, G, and B, respectively. The look-up table memory 16 is accessed by a microprocessor 13 through a bus 14 and a gate 20. The output (video analog signal) from the D/A converter 18 is transferred to the display 19 so as to make an image display. The multi-purpose memory 55 is accessed by the microprocessor 13 through the data bus 14. Numeral 21 designates a coordinate input device to be used for inputting line information.

An operation of the image processing device will be described hereinbelow. An image is inputted to the multi-purpose memory 55 by using means such as a scanner or TV camera or the like. In this stage, the multi-purpose memory 55 stores eight bit-information per one dot for each of R, G, and B. However, the necessary number of bits per one dot for each R, G, and B is less than eight and differs depending on the images. For example, it is unnecessary to store more than six bits in the multi-purpose memory 55 for each R, G, and B when a TV image is processed. Therefore, the most significant six bits are assigned to the multi-purpose memory 55 for image information and one specific bit of the least significant 2 bits are assigned for line information storage.

Figure 32:
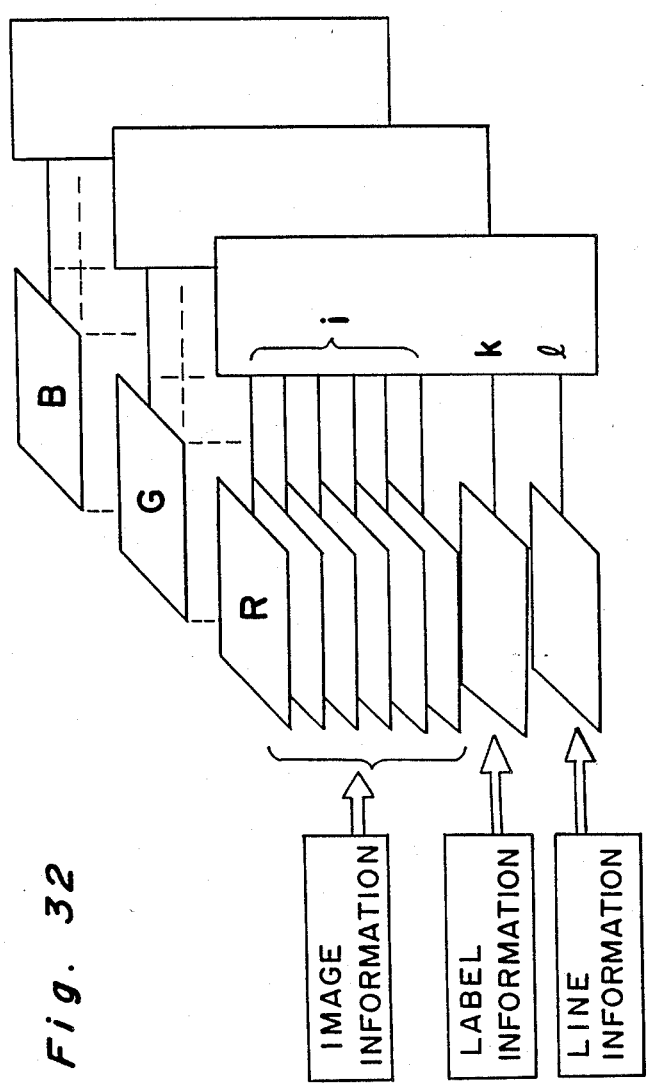
FIG. 32 illustrates the construction of the multi-purpose memory of the seventh embodiment.

Shown in FIG. 32 is a multi-purpose memory 55 in which the most significant six bits are assigned for image information and the least significant bit is assigned for line information storage. The second least significant bit may be assigned for label information, etc. Each data of R, G, and B stored in the multi-purpose memory 55 is expressed as $2^2 \times i + 2 \times k + 1$ using integers i, k, and l where i is intensity information which takes the value as follows: $0 \leq i \leq 2^2$ and k is 0 or 1, which represents information such as label information, and l is 0 or 1 which is the information showing whether or not line drawings are carried out.

Since the least significant two bits that are stored in the multi-purpose memory 55 is used for information retention other than a shaded image, 0 is written into the least significant two bits, respectively using the microprocessor. In drawing a direct line between two coordinates that are inputted by the coordinate input device 21, the bit, to be stored in the multi-purpose memory 55, for storing line information corresponding to the pixel where the line passes through is set to one. In this case, the bit to be set to one is the least significant bit. The present invention can be applied to line drawings such as a circle and a parabola as well as a direct line provided that the bit, to be stored in the multi-purpose memory, for storing line information corresponding to the pixel where a line passes through is set to one. The shade image information stored in the most significant six bits does not change because as described above, only the bit for storing line information is set to one when the line information is provided to the multi-purpose memory, i.e., both the shading image information and the line information are present in the multi-purpose memory 55.

Next, the method of displaying or erasing a line, with this condition maintained, will be described below.

(1) The method of erasing line and displaying only a shaded image.

When the output from the multi-purpose memory 55 is defined as $2^2 \times i + 2 \times k + 1$, and the input to the look-up table memory 16 is defined as $2^2 \times i' + m'$, the output fr(x), fg(x), fb(x) from the look-up table memory 16, are set to have the following values.

$$\begin{aligned} fr(x) &= 2^2 \times i' \\ fg(x) &= 2^2 \times i' \\ fb(x) &= 2^2 \times i' \end{aligned} \right\} \quad (A)$$

Where $0 \leq i' < 2^2$, $0 \leq m' < 2^2$.

By setting the look-up table memory 16 as above, intensity information is outputted from the look-up table memory 16 irrespective of the content of the outputs k and l of the multi-purpose memory 55.

Figures 33A, 33B, 33C:
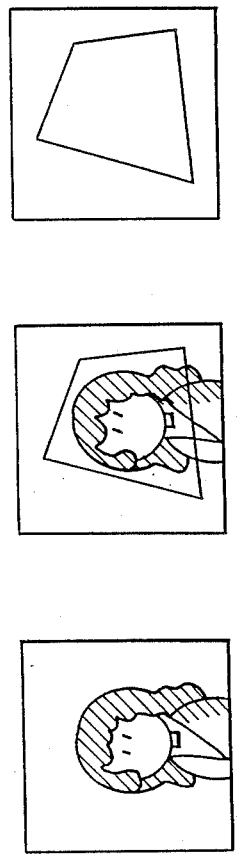
FIGS. 33(a), 33(b), and 33(c) illustrate one example of displayed images of the seventh embodiment.

One example is shown in FIG. 33(a).

(2) The method of displaying line and shaded image that are synthesized.

When the output from the multi-purpose memory 55 is defined as $2^2 \times i + 2 \times k + l$, and the input x to the look-up table memory 16 is defined as $x = 2^2 \times i' + 2 \times k + l'$, the outputs fr(x), fg(x), and fb(x) therefrom are set to have the following values.

$$\begin{aligned} fr(x) &= (2^2 \times i') \times (1 - l') + Cr \times l' \\ fg(x) &= (2^2 \times i') \times (1 - l') + Cg \times l' \\ fb(x) &= (2^2 \times i') \times (1 - l') + Cb \times l' \end{aligned} \right\} \quad (B)$$

$$0 \leq i' < 2^6, k', l' = 0, 1$$

Where (Cr, Cg, Cb) represents the color of a line. By setting the output from the look-up table memory 16 as above, the shaded information is displayed when the bit, which has stored line information in the multi-purpose memory 55 is 0 (l=0), and the line are displayed when the bit which has stored line information is 1 (l'=1).

One example of this display is shown in FIG. 33(b).

(3) Display of only lines.

The output from the multi-purpose memory 55 is defined as $2^2 \times i + 2 \times k + l$, the outputs fr(x), fg(x), and fb(x) are set as follows when the input thereto is defined as the following equation:

$$x = 2^2 \times i' + 2 \times k' + l' \ (0 \leq i' < 2^6; k', l' = 0, 1)$$

$$\begin{aligned} fr(x) &= Br \times (1 - l') + Cr \\ fg(x) &= Bg \times (1 - l') + Cg \\ fb(x) &= Bb \times (1 - l') + Cb \end{aligned} \right\} \quad (C)$$

Where Cr, Cg, and Cb represent R, G, and B components of the lines. Br, Bg, and Bb represent R, G, and B components of the background color. By setting the look-up table memory 16 as above, when the bit which has stored line information is 0 (l'=0), the background is displayed being painted all over, the bit is 1 (l'=1), and the line is displayed without reference to shade information outputted from the multi-purpose memory 55. The color of the line and the background color are represented by (Cr, Cg, Cb) and (Br, Bg, Bb), respectively. One example of image display is shown in FIG. 33(c). Erasing of the lines, displays of the lines with the shaded image synthesized, and displays of only the lines can be carried out by writing line information to a specific bit in the multi-purpose memory 55 and setting the look-up table memory 16 to the above-described equations (A), (B), and (C). In this case, it is unnecessary to save image information. A modification of a part of a line can be made by modifying the bit which has stored the line information of the multi-purpose memory. Therefore, it is unnecessary to restore the image information which has been saved.

Besides the method of storing line information as described above, i.e., line information is stored in a specific bit in the multi-purpose memories of R, G, and B, and the line information can be stored in one specific bit of any one of R, G, and B of the multi-purpose memory 55. For example, when line information is stored in the least significant bit of R, the look-up table memory 16 is set as follows. In this case, the most significant 6 bits are used as shaded image information for each of R, G, and B.

(1) Display of only the shaded image by erasing the line.

Assuming that the input x to the look-up table memory 16 is defined as the following equation:

$$x = 2^2 \times i' + m' \ (0 \leq i' \leq 2^6, 0 \leq m' < 2).$$

The output fr(x), and fb(x) therefrom is set as follows:

$$fr(x) = 2^2 \times i'$$

$$fg(x) = 2^2 \times i'$$

$$fb(x) = 2^2 \times i'$$

(2) Display by synthesizing lines and the shaded image.

Assuming that the input x to the look-up table memory 16 is defined as $x = 2^2 \times i' + 2 \times k' + l' \ (0 \leq i' < 2^6; k', l' = 0, 1)$, outputs fr(x), fg(x), and fb(x) are set as follows:

$$fr(x) = (2^2 \times i') \times (1 - l') + Cr \times l'$$

$$fg(x) = 2^2 \times i'$$

$$fb(x) = 2^2 \times i'$$

In this case, the information of a shaded image of green and blue is seen. However, the red component is displayed by Cr, in which case, the lines can be detected.

(3) Display of only the line.

Assuming that the input x to the look-up table memory 16 is defined as $x = 2^2 \times i' + 2 \times k' + l' \ (0 \leq i' < 2^6; k', l' = 0, 1)$, outputs fr(x), fg(x), and fb(x) are set as follows:

$$fr(x) = Br \times (1 - l') + Cr$$

$$fg(x) = Bg$$

$$fb(x) = Bb$$

By the above setting the lines and the background are represented by (Cr, Bg, Bb) and (Br, Bg, Bb), respectively.

When a line is displayed simultaneously with a shaded image in storing line information in each bit of R, G and B of the multi-purpose memory 55, green can be set to be displayed in any tone. For example, when the output from the look-up table memory 16 is 8 bits for each of R, G and B, $2^{24}$ colors can be displayed. When line information is stored in a specific 1 bit of only one of R, G and B of multi-purpose memory 55, the tone of the line is influenced by shade information. In this case, however, the quantity of providing data is as small as ⅓, so that the multi-purpose memory 15 results savings and the memory can be outputted at a very high speed.

The image processing device described above, comprises multi-purpose memory which can store information of a shaded image and/or line information. The line information is provided to an area separate from the area for the information of the shaded image store in the multi-purpose memory, and the content of the look-up table memory is appropriately set. Thus, a line can be written or erased without saving the information of the shaded image in a separate area and image processing can be simply performed using lines at a very high speed.

(Eighth embodiment)

Figure 36:
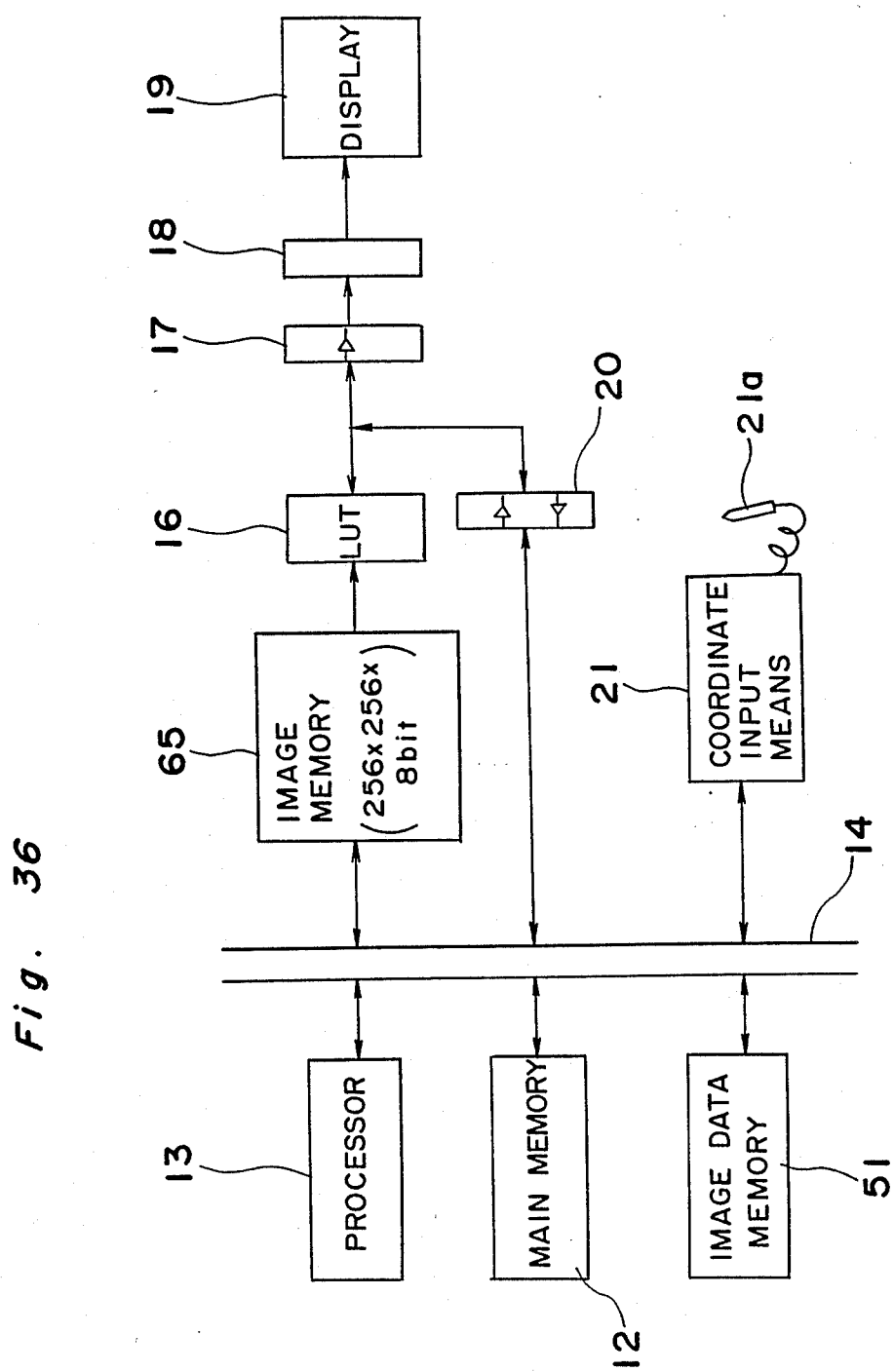
FIG. 36 is a block diagram of the image processing device of the eighth embodiment of the present invention.

The embodiment of the present invention in FIG. 34 through FIG. 36 shows a schematic diagram of an image processing device of the present embodiment.

As shown in FIG. 36, an image processing device according to this embodiment comprises an image data memory 51 for storing data of an image, a main memory 12 for storing a system program, and a processor 13, wherein the above-described units 51, 12, and 13 are connected to each other through a data bus 14. Numeral 65 indicates an image memory which stores the image data of an original image to be processed, i.e., gray levels. This image memory 65 comprises, for example, a static random access memory. The size of an image to be stored in this image memory 65 so as to be processed in an image processing device of this embodiment is, for example, a 256×256 pixel. The gray level of each pixel is displayed by 8 bits, namely, at 256 stages. Image data is transferred from the image data memory 51 to the image memory 65 in case of need.

The image memory is connected to a look-up table memory 16 which has a data conversion function based on the look-up table of which a description will be made below. The look-up table memory 16 comprises, for example, a SRAM and is connected to a display 19 through a gate circuit 17 which allows a signal to pass in one direction, namely, to the right in FIG. 36 and to a D/A converter 18. The look-up table memory 16 is connected to the data bus 14 through a gate circuit 20 which allows a signal to be transmitted in both directions, namely, to both the left and right directions. A color display can be carried out by providing the image memory 65, the look-up table memory 16, the gate circuits 17, 20, and the D/A converter 18 for each of the three primary colors.

Numeral 21 designates a coordinate input device, for example, comprising a mouse, digitizer, and a trackball known in the art, which is connected to the data bus 14 and is used for a threshold input.

Figure 37A:
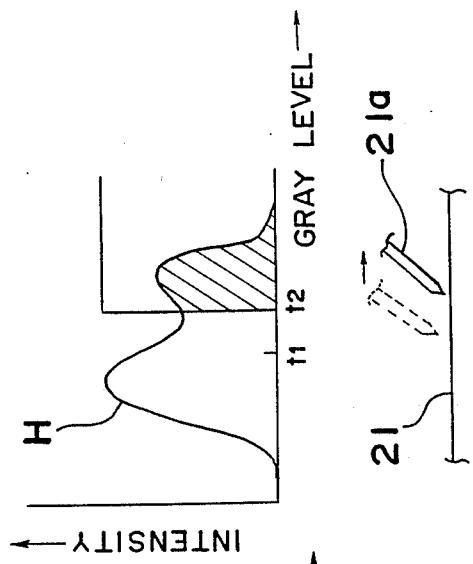
FIGS. 37(a), 37(b), and 37(c) illustrates the display contents of the coordinate input device in the image processing device of FIG. 36.
Figure 37B:
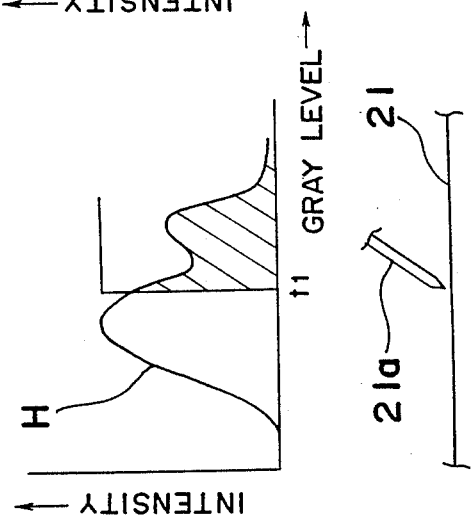

An operation for extracting an area of an image according to the above-described image processing device will be described below. According to the image processing device, an area is extracted by binary-coded processing, that is, in extracting an area of an image, the histogram H of an original image to be processed is first displayed in the display portion of the coordinate input device 21 as shown in FIG. 37(a). A desired threshold t1 is set with an input device, such as a light pen 21a, attached to the coordinate input device 21 for binary coding that refers to the histogram H of FIG. 37(b). In addition, an area consisting of a group of pixels having a gray level larger than the threshold t1 is instructed to be extracted. By carrying out the above operation, the range of the gray level to be extracted is specified by a reverse indication for example. According to this embodiment, users can set a threshold as desired, not according to statistical information. In this operation, users can set the threshold appropriately by utilizing the histogram H.

As described above, when the gray level to be extracted is designated, the information which indicates a display or non-display with respect to each a gray level is stored according to the designated gray level. More specifically, the look-up table comprises an array of information, which indicates whether or not pixels having each gray level n (n=0, 1, ... 255) are displayed, namely, a display signal or a non-display signal. In other words, the display signal or the non-display signal of each gray level n is stored in the address corresponding to each gray level n. In this case, the "255" level is used, which is the maximum display level, as a display signal, thereby the brightness of each pixel of an area to be extracted is made constant. As a non-display signal, a "0" level is a non-display level.

In FIG. 34(a), the content of the look-up table 16 is exemplified, in which case, a threshold t1 is set to "100". In this case which has gray levels of an original image, a "0" level is assigned for all gray levels whose thresholds are under "100". A "255" level is assigned for level is shown in FIG. 35(a) and the output level is binary-coded, namely, to a "0" level and "255" depending on whether the input level is outside the threshold "100" or not.

Figure 37C:
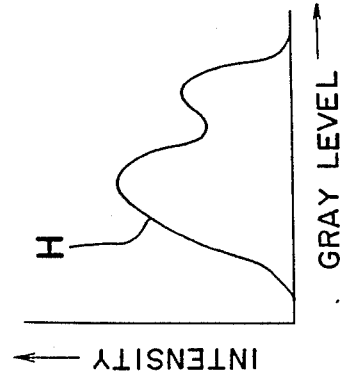

When an extraction process starts, the gray level n of each pixel of an original image is sequentially provided from the image memory 65 to the look-up table memory 16, with the result that a non-display signal "0" or a display signal "255" corresponding to the gray level n is read out. For example, when the gray level of a pixel of an original image is "50", a non-display signal "0" is read out from the look-up table. When the gray level of a pixel of the original image is "200", a display signal is sequentially transferred to the D/A converter 18 through the gate circuit 17. Then, the transferred signal is converted into an analog value, and inputted to the display 19. Then, extracted images are displayed from processed pixels. From such a sequential display, users can observe how an image processing is progressing. If an extracted area is judged to be inappropriate, a binary-coded threshold is changed, for example, t1 to t2 as shown in FIG. 37(c). Then, the content of the look-up table memory 16 is changed so as to repeat carrying out the extraction processes. The content of the look-up table memory 16 is changed through the gate 20.

When an original image is displayed in its original color, data is transferred from the image memory 65 to the display 19 through the look-up table memory 16. In this case, as shown in FIGS. 36(b) and 35(b), such information coincides the input level with the output level and is accommodated in the look-up table memory 16.

In this embodiment, an area extraction is carried out by the binary-coded process so as to make the gray level of each pixel constant. However, an area extraction may be carried out by varying the gray level in the extraction area. In this embodiment, an area extraction is performed according to a gray level, it may be made according to characteristic information such as chromatic value or position information.

In the above-described image processing device, image processing can be carried out by changing the content of the look-up table memory from a threshold and the data of an original image is preserved as it is.

Therefore, frequency of an access to a memory can be reduced and an image processing speed can be improved. Further, in an image processing device according to the invention, extracted images are sequentially displayed by the look-up table memory from converted pixels, so that the progress of an extraction processing can be observed. Accordingly if it is detected that a desired area is not extracted, the extraction can be stopped halfway and a threshold can be altered. Accordingly, extraction processing can be carried out efficiently.

(Ninth Embodiment)

Figure 38:
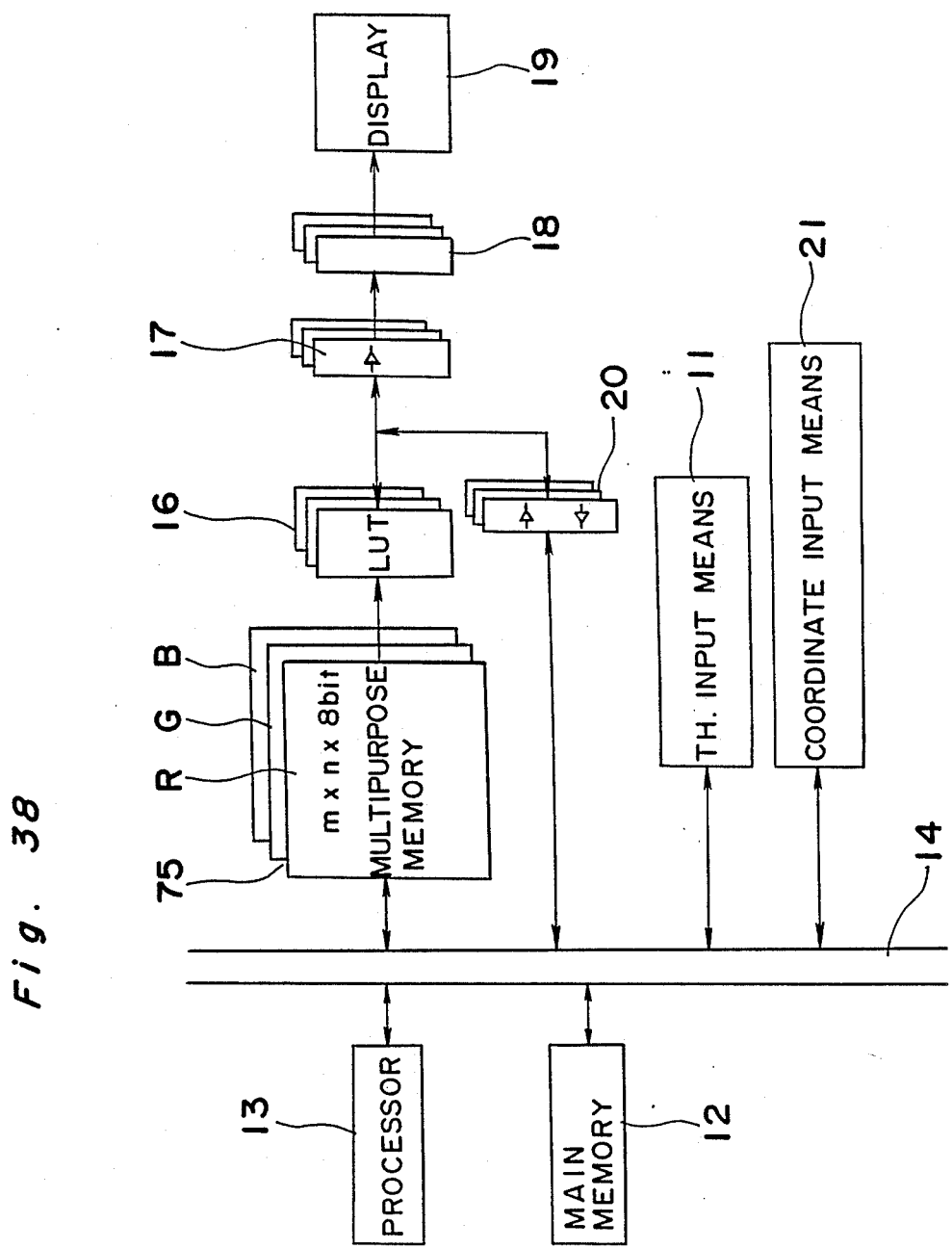
FIG. 38 is a block diagram of the image processing device of a ninth embodiment of the present invention.

The ninth embodiment of the invention is described FIGS. 38 through 43. FIG. 38 is a schematic diagram of an image processing device of the present invention. An image processing device according to the invention comprises a multi-purpose memory 75 for storing intensity information of each of the pixels which compose image and label information which indicates whether or not a desired area is extracted; a threshold input device 11 for inputting a desired threshold relative to the intensity information; a coordinate input device 21 for inputting predetermined coordinates lying in an image; a look-up table memory 16 for setting a look-up table with which the intensity information transferred from a multi-purpose memory 75 is converted according to the threshold inputted from the threshold input device 11, and converting an input information transmitted from the multi-purpose memory 75 according to the look-up table; a display 19 for displaying an image according to the output from the look-up table memory 16; an operation processing unit 13 for rewriting the label information of each of the pixels in the area which is to be extracted according to the threshold and also designated by the coordinate input device 21, whereby the information, which displays the characteristic level of each pixel of an original image, is converted by the look-up table memory and the extraction area determined by the threshold that is inputted from the threshold input device 11 is displayed in advice by the display 19 in a specified color and a target area is selected by the coordinate input device 21 from the area displayed in the specified color so that the extraction may be carried out.

In FIG. 38, the multi-purpose memory 75 has eight bits for each of R, G, and B per one dot stores intensity information composing image and label information which indicates whether an area has been extracted or not. The multi-purpose memory 75 is accessed by the microprocessor 13 which functions as an arithmetic processing unit through a bus 14. The output from the multi-purpose memory 75 is connected to the address of the look-up table memory 16. The output from the look-up table memory 16 is connected to the D/A converter 18 through the gate circuit 17. In this embodiment, the output from the look-up table memory 16 is eight bits for each of R, G, and B.

Figure 39:
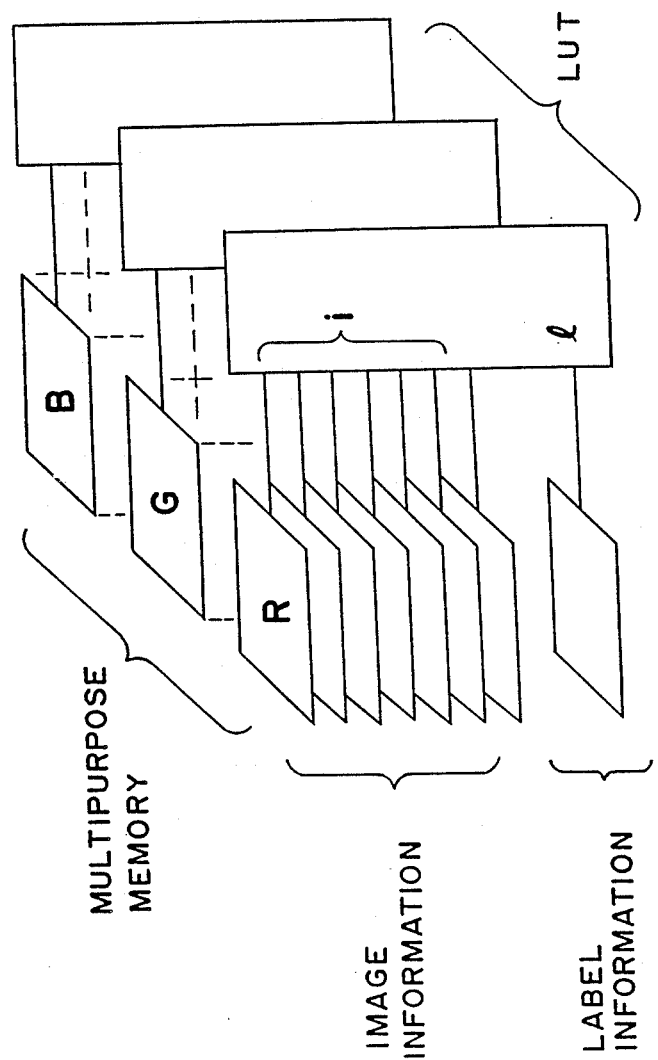
FIG. 39 illustrates the contents of the multi-purpose memory and the look-up table memory of the ninth embodiment.
Figure 43:
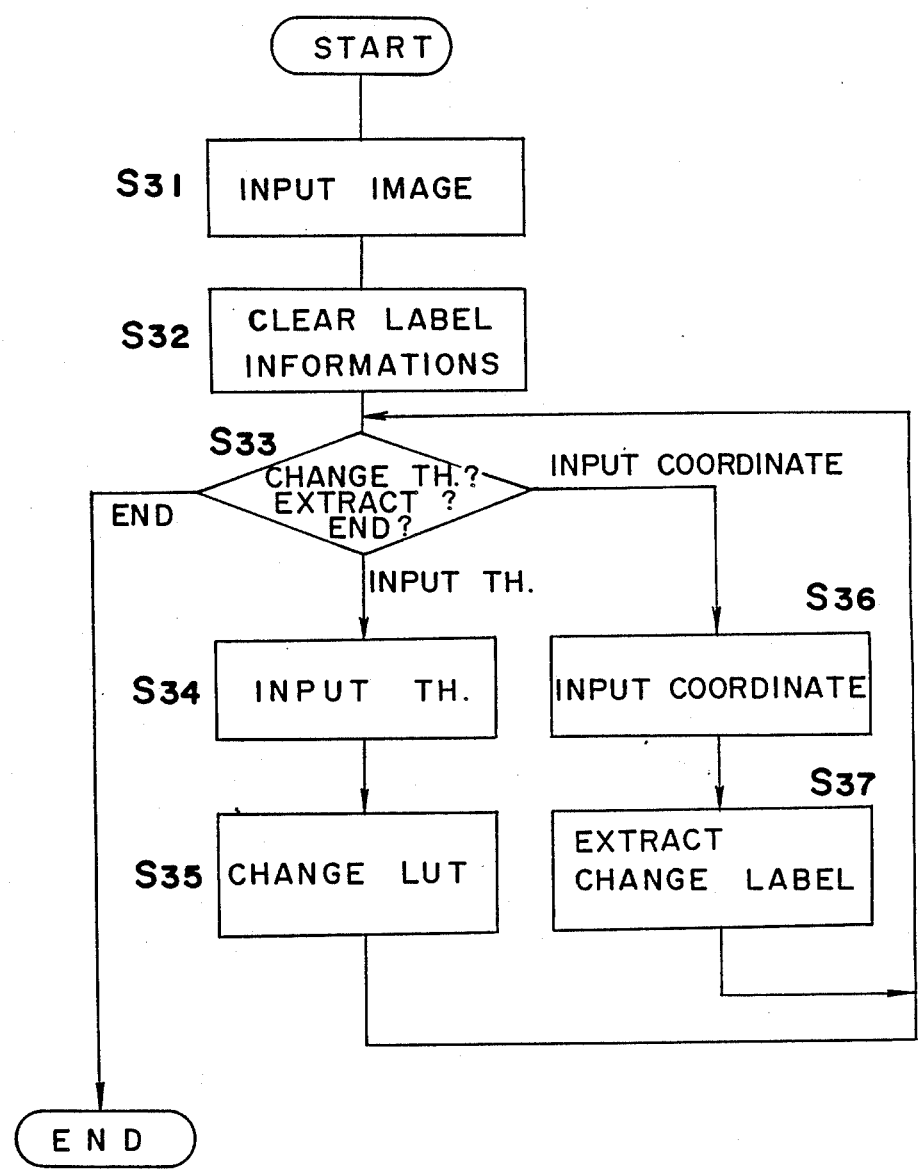
FIG. 43 is a flow chart illustrating the extraction procedure of the ninth embodiment.

The output (video analog signal) from the D/A converter 18 is transferred to the display 19 for an image display. The operation of an image processing device will be described below. Image information is inputted to the multi-purpose memory 75 by such means as a scanner or a TV camera. In this stage, the multi-purpose memory 75 stores eight bits per one dot for each of R, G, and B. The most significant seven bits of the multi-purpose memory 75 is assigned for image information storage and the least significant bit is assigned for label information storage. Normally, the most significant six bits are enough for the intensity information of an image. Therefore, the least significant bit is assigned for label information storage. FIG. 39 shows a look-up table memory 16 and a multi-purpose memory 75 in which the most significant seven bits are assigned for intensity information and the least significant bit is assigned for label information.

In this case, the intensity information i is in the range of $0 \leq i < 2^7$ and the label information l is 0 and 1 and the output from the multi-purpose memory 75 is $2 \times i + l$.

The same data is inputted to each of R, G and B, and l=0 means that the state is before extraction and l=1 means that the state is after extraction. Using these values of l, a plurality of areas can be distinguished from each other.

The method of extracting an area of a full color image will be described. Normally, the color of an area to be extracted from a color image belongs to the same family. These is a case in which users want to change an area from red to blue. In this case, even if the configuration of an area is complicated, there are many cases in which points of the area to be extracted gather on the specific positions of color in a space of R, G and B. FIG. 40 shows that the red of a car and the blue of the sky in an original image are concentrated to a red point P and a blue point Q, respectively, in a space of R, G and B. In this case, each of the two planes are perpendicular to each of the axes R, G, and B and the space of R, G and B is set respectively so as to extract the area surrounded by six planes, whereby an area having a complicated configuration can be easily extracted. In this case, the points of the six planes which cross with each of the axes R, G, and B are assumed to be r1, r2; g1; and b1, b2 which are referred to as thresholds.

It is necessary to extract pixels having color data surrounded by six thresholds in extracting an area, however, there is a possibility that there are a plurality of areas having the same color and a setting of a threshold is inappropriate. Accordingly, it is desirable to check a display which indicates that a portion is to be extracted by the threshold. This is carried out by the following method utilizing the look-up table memory 16.

First, using the microprocessor 13, the value l=0 (before extraction) is written to the multi-purpose memory 75 as label information for each of R, G, and B. Next, the outputs fr(x), fg(x), and fb(x) from the look-up table memory 16 are set as follows when the input is defined as $X = 2 \times i' + l'$.

When i'<k1 and l'=0

$$fk(x) = 0 \qquad (1)$$

When k1≤i'<k2 and l'=0

$$fk(x) = 255 \qquad (2)$$

When k2<i' and l=0

$$fk(x) = 0 \qquad (3)$$

When l'=1

$$fk(x) = x \qquad (4)$$

Where k is the replacement of r, g and b, and k1 and k2 are thresholds. (0≤k1≤127, 0≤k2≤127)

In FIG. 41, one example of a look-up table is shown when k1=3 and k2=5. This look-up table outputs the most brilliant data, namely 255, when label information is 0 and the intensity information i of the multi-purpose memory 15 is within the threshold. Before label information is inputted, label information is set to 0. Accordingly, an image in eight colors is displayed in the display 19 according to the value of the intensity information (ir, ig, ib). That is:

(1) black . . . ir, ig, and ib are out of the threshold range;

(2) blue . . . ib is within the threshold range, and ir and ig are out of the threshold;

(3) red . . . ir is within the threshold range, and ig and ib are out of the threshold;

(4) green . . . ig is within the threshold range, and if and ib are out of the threshold;

(5) purple . . . ir and ib are within the threshold range and ig is out of the threshold;

(6) sky blue . . . ig and ib are within the range of the threshold, and ir is out of the threshold;

(7) yellow . . . ir and ig are within the threshold range and ib is out of the threshold;

(8) white . . . ir, ig, and ib are all within the threshold range.

From above, it is concluded that an area surrounded by six threshold planes in the color space of R, G and B is displayed in white. The range of white area displayed in the display 19 is instantly changed by the threshold values, r1, r2; g1, g2; b1, b2 with the threshold input device and the content of the look-up table memory 16 is altered in response to the changed values of the threshold. It is possible to set a threshold to an appropriate value interactively by looking at the range displayed.

The method of carrying out an extraction and of displaying an extracted area that is distinguished from an area before it is extracted will be described below. For example, as shown in FIG. 42, the method of extracting one out of three apples will be described. As described above, it is possible to display the red area of the apple by making the red area clear in white. In the case of three white areas, one point is included in the area which is to be extracted and is inputted by the coordinate input device 21. This is accomplished by displaying a cursor which is moved according to the coordinate input device 21 on a screen, and then the cursor is moved to an area to be extracted, and thereafter an extraction button is pressed. In this case, the coordinate to which data has been inputted is assumed to be (Xo, Yo) as shown in FIG. 42(b).

Next, using the microprocessor 13 and setting the point (Xo, Yo) as the starting point, a point included in the threshold r1, r2; g1, g2; b1, b2 is searched. Then, label information l is changed to all 1 in R, G and B. The method of carrying out a painting while changing the label information from 0 to 1 has been devised. Therefore, any desired method of painting a closed area may be used.

Thus, only a specified area is extracted from areas having the same color as that of the specified area so as to change the label information of the specified area to 1. When the label information l is 1, the specified area can be identified from non-extracted areas having the same color, namely a white color, because as shown in the above equation (4), the look-up table which is referred to is set to display an original image as it is. This can be fully understood with reference to FIG. 42(c).

The extraction procedure described above will be shown in FIG. 43 which is a flow chart.

At step S31, an image is inputted to the multi-purpose memory 75.

At set S32, the lease significant bits of the multi-purpose memory 75 is set for storing label information, and the portion thus set is rewritten to 0.

At step S33, it is discriminated whether thresholds are altered, an extraction is carried out, or an extraction ends.

At step S34, thresholds are inputted by the threshold input device 11.

At step S35, the data stored in the look-up table memory 16 is changed according to inputted threshold. Thereafter, operation of S34 and S35 are repeated to set the threshold so that a target area is colored in white.

At step S36, a coordinate is inputted by the coordinate input device 21.

At step S37, an inputted coordinate is set as a starting point so as to carry out an extraction.

In this embodiment, the threshold input device is provided separately from the coordinate input device. However, the threshold input graph is displayed so as to input the threshold by using a coordinate input device, which also functions as a threshold input device. In the equation (4), an extraction area is set to display it by an original image, however, the area may be displayed in another color if the area is distinguished from an area which has not been extracted. In this embodiment, a case is shown in which label information is set to one bit, however, it is possible to increase the number of bits so as to set a plurality of labels to extracted areas.

In an image processing device having the above-described construction, the color of an image is separated into R, G, and B and two thresholds for each of R, G, and B, namely, r1, r2; g1, g2; b1, b2; are set with respect to a multi-purpose memory for storing intensity information and label information. A look-up table is set so that only the space between two of the thresholds for R, G, and B are displayed brightly, whereby an image area with the color information of R, G, and B are all included in the thresholds is displayed, for example in white. A target area within the area displayed in white is designated by a coordinate input device and label information is rewritten by an arithmetic processing unit so as to carry out an extraction of the area. Therefore, an area to be extracted can be confirmed to see the white before extracting the area and the threshold can be interactively set to the optimal value and a target area can be designated by the coordinate input device even if there are a plurality of areas having the same characteristic level as that of the area to be extracted, and the target area can be reliably extracted. Further, since an extraction can be carried out using the threshold of a color, an area whose configuration is complicated can be easily extracted.

(Tenth Embodiment)

Figure 44:
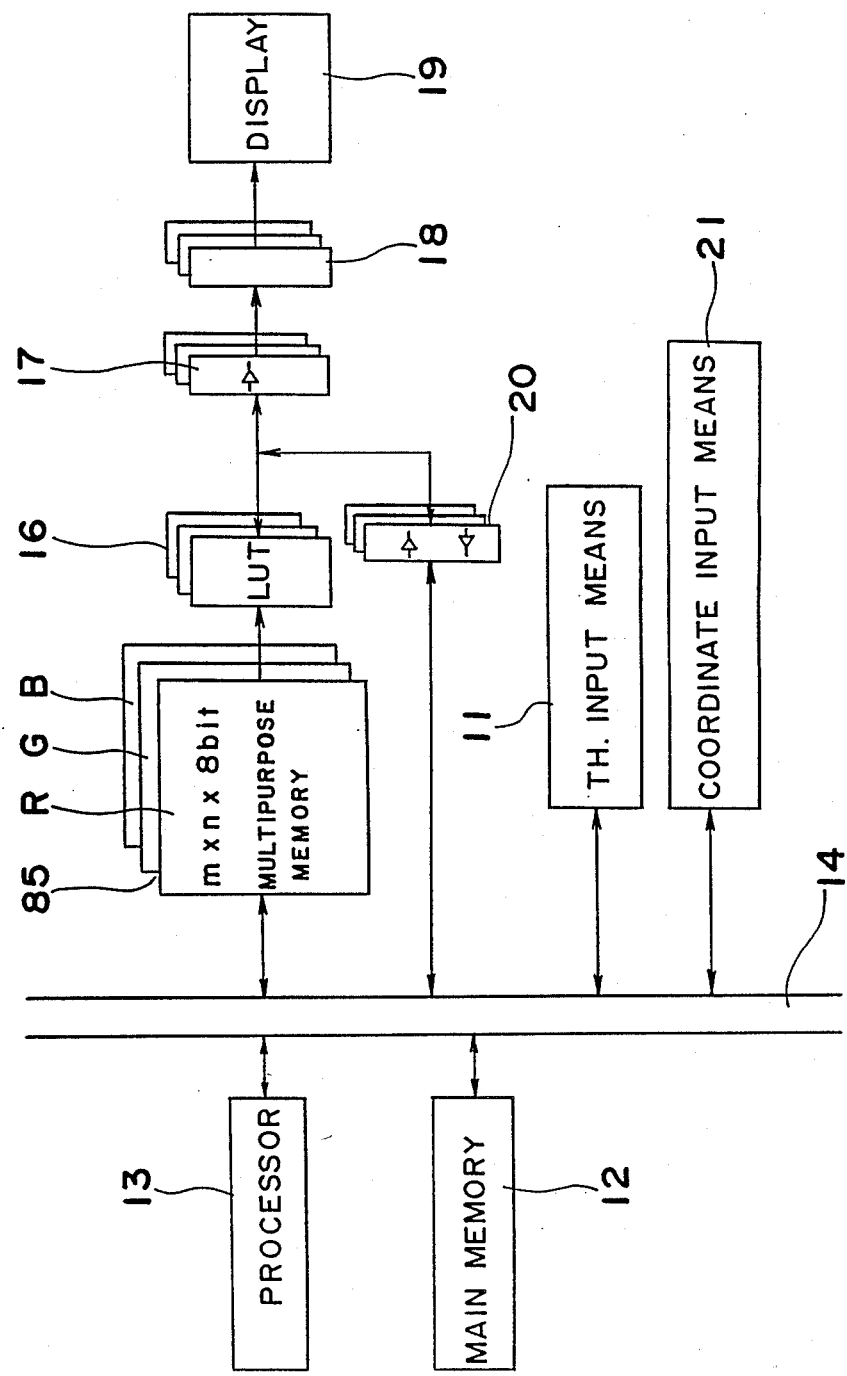
FIG. 44 is a block diagram of the image processing device of a tenth embodiment of the present invention.

The tenth embodiment of the present invention will be described in FIGS. 44 through 46. FIG. 44 is a schematic diagram of an image processing device of the present invention. An image processing device of the present invention comprises a multi-purpose memory B5 for storing intensity information of each of the pixels composing image and label information for determining whether or not an area is taken out; a threshold input device 11 for inputting a desired threshold on the intensity information; a coordinate input device 21 for inputting predetermined coordinates of an image; a look-up table memory 16 for setting a look-up table which converts the intensity information transferred from the multi-purpose memory 85 according to a threshold inputted from the threshold input device 11 and for converting the information inputted thereto from the multi-purpose memory 16 according to the look-up table; a display 19 for displaying an image according to the output from the look-up table memory 16; a discrimination device 13 for discriminating whether or not coordinates designated by the coordinate input device 21 are included in an area specified by a threshold inputted from the threshold input device 11 and displayed in a specified color; a rewriting device 13 for rewriting the label information of the specified area of the multi-purpose memory 85 when the coordinates designated by the coordinate input device 21 are included in the specified area and for rewriting the label information of the specified area included in a closed curve area designated by the coordinate input device 21 are not included in the specified area. Whereby, the area to be taken out is displayed in advance in the specified color and a target area is selected from the specified area that is displayed in the specified color using the coordinate input device 21 and an extract method is changed depending on whether or not inputted coordinates are included in the specified area that is displayed by the specified color when the area is taken out.

A multi-purpose memory 85 assigning eight bits for each R, G, and B per one dot is shown in FIG. 44 and stores the intensity information composing an image and label information in response to whether or not an area is extracted. The multi-purpose memory 85 is accessed by a microprocessor 13 that includes a discrimination means and a rewriting device through a bus 14. The output from the multi-purpose memory 85 is connected to the address of the look-up table memory 16. The output from the look-up table memory 16 is connected to a D/A converter 18 through a gate circuit 17. In this embodiment, the output from the look-up table memory 16 is eight bits (0–255) for each of R, G, and B.

The output (video analog signal) from the D/A converter 18 is transferred to a display 19 that displays an image.

The operation of an image processing device of this embodiment is described below. First, image information is inputted to the multi-purpose memory 85 with a scanner or a TV camera. In this stage, the multi-purpose memory 85 stores eight bit-information per one dot for each of the colors R, G, and B. Next, in this embodiment, the most significant seven bits of the multi-purpose memory 85 is assigned for image information and the least significant bit is assigned for label information which relates to an area extraction. Normally, the most significant six bits are sufficient for the intensity information of an image, so that the least significant bit is assigned for label information. The intensity information i for each of the colors R, G, and B is in the range of $0 \leq i < 2^7$ and the value of label information l is either 0 or 1, wherein l=0 means that an image has not been extracted and l=1 means that the image has been extracted. Before an extraction is carried out, 0 is provided to each of the data of R, G, and B with the microprocessor 13. When the input to the look-up table memory 16 is assumed to be $x = 2 \times i' + l'$, the output from the look-up table memory 16, namely, fr(x), f(x) and fb(x) are set as follows:

When $i' < Ki$ and $l' = 0$, $$fx(x) = 0 \qquad (1)$$

When $k1 \leq i' \leq k2$ and $l' = 0$ $$fk(x) = 255 \qquad (2)$$

When $k2 < i'$ and $l' = 0$ $$fk(x) = 0 \qquad (3)$$

When $k2 < i'$ and $l' = 1$ $$fx(x) = \qquad (4)$$

Where k represent r, g, and b. k1 and k2 (r1, r2; g1, g2; b1, b2) designate six thresholds inputted by the threshold input device 11. Thus, an area in which the color information of each of R, G, and B is included in a threshold range is set before an extraction is displayed in white by the display 19.

The method of designating an area to be extracted while watching the display is carried out by inputting the coordinates (Xo, Yo) and discriminating whether or not the color information of the inputted coordinates (Xo, Yo) are all within the threshold, when the discriminating device changes to the extracting device.

If the color information is within the threshold, i.e., when the coordinate within an area that is displayed in white inputted, points in which color information is within the thresholds r1, r2; g1, g2; b1, b2 are searching by the inputted coordinate point which acts as the starting point as conventionally performed. Then, label information l of R, G, and B is changed from 0 to 1 by means of a rewriting device.

When any one of the color information of R, G, and B is outside the threshold, the program enters the closed curve diagram input mode, and then, a closed curve line information is inputted using a coordinate inputted thereafter. The following methods of inputting the closed curve line information are available.

(1) A rectangle in which coordinate points (X1, Y1), and (Xo, Yo) from a diagonal line of the rectangle is inputted.

(2) A polygon where coordinate points (X1, Y1), case, it is acceptable to determine n as 3 or 4. Besides, the data of the terminated closed curve input mode is inputted, for example, the method of increasing n by providing an input device such as a button may be employed.

As soon as the input of a closed curve terminates, display areas that are displayed in white are included in a closed curve. Namely, label information of a specified area where the color information of R, G, and B is within the respective threshold is rewritten from 0 to 1 by a rewriting device so as to carry out an extraction of the specified area.

The above-described process will be described with reference to FIG. 45.

Figure 45:
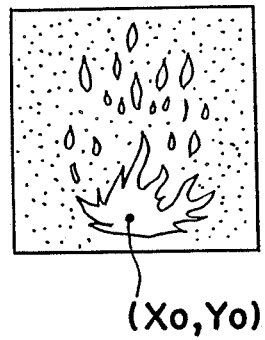
FIGS. 45(1a), 45(ab), 45(2a), 45(2b), and 45(2c) illustrate the process of extracting areas in the tenth embodiment of the present invention.
Figure 45:
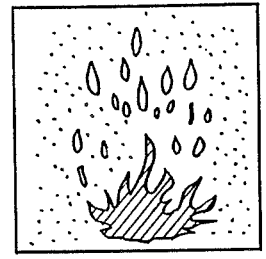
Figure 45:
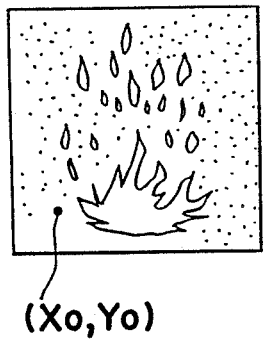
Figure 45:
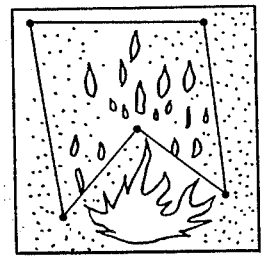
Figure 45:
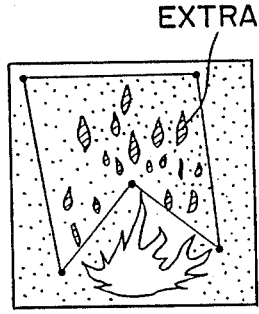

FIG. 45(1a) shows the case in which the input coordinate point (Xo, Yo) is within a white display area, in which case, the area including the point is extracted as shown in FIG. 45 (1b). On the contrary, FIG. 45 (2a) shows that the input coordinate (Xo, Yo) is Outside the white display area, in which case, color information is under a closed curve input mode. When the information of a closed curve has been inputted, the white display area in the closed curve is extracted as shown FIG. 45(2c).

Figure 46:
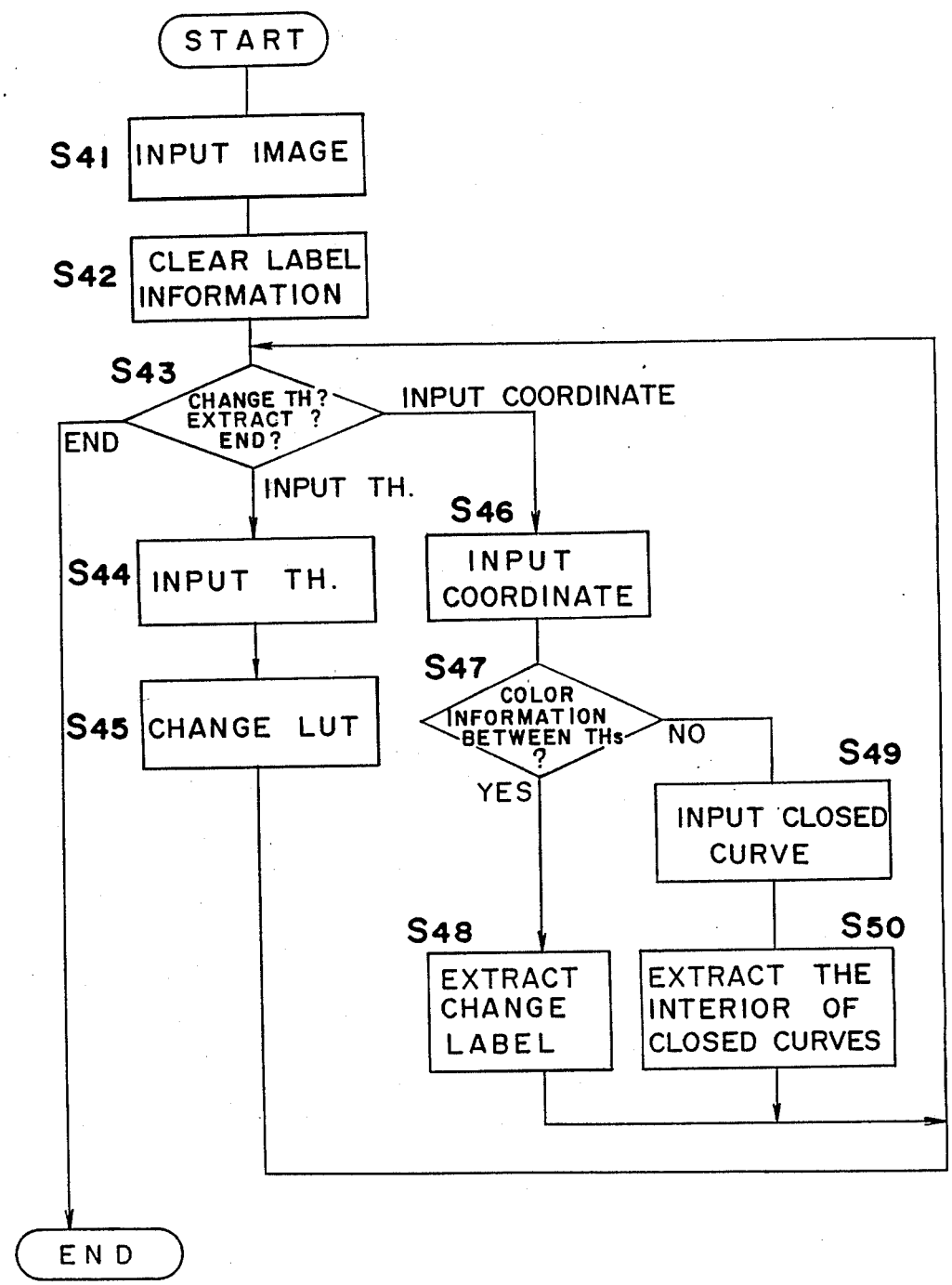
FIG. 46 is a flow chart of the tenth embodiment.

The above extraction procedure will be shown by a flow chart of FIG. 46.

At step S41, an image is inputted to the multi-purpose memory 15.

At step S42, the least significant bits that are stored in the multi-purpose memory 15 are set for label information and the bits are rewritten to 0.

At step S43, it is discriminated that a threshold is altered, an extraction is carried out or an operation ends.

At step S44, a threshold is inputted by the threshold input device 11.

At step S45, the data inputted to the look-up table is changed according to an inputted threshold. The operations to be performed at step S44 and S45 are repeated, and then, a threshold is set to make a target area clear in white.

At step S46, a coordinate value information is inputted by the coordinate input device 21.

At step S47, it is discriminated whether or not the color information of an inputted coordinate point is within the threshold.

At step S48, an inputted coordinate is set to be the starting point, thereby an extraction is carried out.

At step S49, a closed curve is inputted.

At step S50, an area where color information is included within the threshold is extracted in the area surrounded by the closed curve whose information is inputted at step S49.

In this embodiment, a threshold input device is provided separately from a coordinate input device. However, a threshold input graph may be indicated in a display so as to input the threshold with a coordinate input device (functioning as a threshold input means as well). In the equation (4), an extracted area is set so that an original image is displayed. However, if the extracted area is identified from an area which has not been extracted, the extracted area may be displayed in other colors. In this embodiment, label information is set to one bit, but is possible to increase the number of bits and assign a plurality of label information to an extracted area.

In this embodiment, the method of carrying out a first area extraction has been described, however, if any area has been already extracted, two methods can be used. That is, no operation is made or an operation is made to return the program to the state before the extraction has been carried out.

In an image processing device having the above-described construction, in response to the information outputted from the multi-purpose memory which stores intensity information in which the color of an image has been separated into R, G, and B and label information, two thresholds for each of R, G, and B, namely r1, r2; g1, g2; b1, b2; are selected to set the look-up table to display only an area which is surrounded by each two of the thresholds. According to this, an image area where the color information of R, G, and B is included between the thresholds is displayed in a specific color, for example white, and then, a specific area to be extracted is verified in advance. Thereafter, when an inputted coordinate point is discriminated that it is within the specific area displayed in white, the label information which corresponds to the area displayed in white, which includes the coordinate point, is rewritten by a rewriting device to carry out an extraction. Accordingly, an area whose configuration is complicated can be easily extracted. When an inputted coordinate point is discriminated that is outside the area displayed in white, the label information which corresponds to the specified area that is displayed in white is included in an inputted closed curve area, and data is rewritten by the rewriting device to carry out an extraction. Therefore, distributed areas can be extracted at the same time. Thus, in an image processing device according to the present invention, one of the two difference methods of extracting an area can be selected by one coordinate input device depending on whether or not a coordinate point is within a specific area displayed in white. Accordingly, a drawing which has a complicated configuration can be very easily and efficiently extracted.

(Eleventh Embodiment)

The embodiment of the present invention will be described with reference to FIGS. 47 and 48.

FIG. 47 is a schematic diagram of an image processing device according to the invention, which comprises a multi-purpose memory 95 that stores the intensity information of each of the pixels composing image and label information which detects an area, and line information depending on the situation; a look-up table memory 16 which converts the information inputted from the multi-purpose memory 95 and outputs the converted information; a display 19 for displaying an image according to the output information from the look-up table memory 16; a threshold input device 11 for inputting a predetermined threshold of intensity information; a coordinate input device 21 for inputting predetermined coordinates of an image; a memory setting device for setting specific bits of the multi-purpose memory 95 of intensity information, label information, and line information that are accommodated so as to write or erase the label information and line information; and a look-up table setting device 13 for setting the contents of the look-up table memory according to the threshold information inputted from the threshold input device, the intensity information, the label information, and the line information. Whereby, the output information, which represents the characteristic level of each of the pixels of an original image, are transferred from the multi-purpose memory 95 and are converted by the look-up table memory 16 so as to display in advance the area set by the threshold information inputted from the threshold input device 11 in a specific color. When the area displayed in the specific color and areas other than a target area to be extracted are laid end to end, information of the line which separates the target area from the other areas is inputted by the coordinate input device 21 to separate the target area from the other areas and the target areas thus separated are selected by the coordinate input device 21 so as to rewrite the label information and extract the target area.

The multi-purpose memory 95 shown in FIG. 47 stores intensity information of each of the pixels composing image and label information which detects area, and line information. The multi-purpose memory 95 is accessed by the microprocessor 13 through the bus 14. The output from the multi-purpose memory 95 is connected to an address of the look-up table memory 16. The output from the look-up table memory 16 is connected to the D/A converter 18 through the gate circuit 17. In this embodiment, the output of the look-up table memory 16 is eight bits (0~255) for each of R, G and B in bit length. The look-up table memory 16 is accessed by the microprocessor 13 through the bus 14 and the gate 20. The threshold input device 11 is accessed by the microprocessor 13 through the bus 14 and inputs the thresholds on intensity information. The coordinate input device 21 is accessed by the microprocessor 13, inputs predetermined coordinates existing in the image and line information, and designates a target area to be extracted.

The microprocessor 13 includes the memory setting device and the look-up table setting device both composed of software. The memory setting device sets the multi-purpose memory 95 intensity information, label information, and line information to specific bits that are assigned so as to provide or erase the label information and the line information. The look-up table setting device carries out an operation described below according to the threshold data that is transferred from the threshold input device 11, the intensity information, the label information, and the line information so as to set the contents of the look-up table memory 16.

The output (video analog signal) from the D/A converter 18 is transmitted to the display unit 19 for an image display.

The operation of the image processing device of this embodiment will be described. First, an image is inputted to the multi-purpose memory 95 by a scanner, a TV camera or the like. At this stage, the multi-purpose memory 95 stores eight bit information for each R, G, and B per one dot, or 24 bits in all. Next, the most significant six bits of the multi-purpose memory 95 are assigned to the image information and the least significant bit is assigned to the label information that is used to extract an area. Separation line information is stored in the second lowest bit of the multi-purpose memory 95 for red. The present inventors have already provided a method of displaying or erasing lines by storing the line information in a specific bit of the multi-purpose memory 95 and altering the setting of the look-up table memory 16. The second lowest bit of the multi-purpose memory 95 for blue and green is not used (for example, 0 is assigned thereto.) The information thus stored in the multi-purpose memory 95 with the memory setting means is used as image information i ($0 \leq i < 2^6$), an area extraction label information l, and line information k (k=0, 1). The output from the multi-purpose memory 95 for red which stores the line information is $2 \times i + 2 \times k + l$. The output from the multi-purpose memory for green and blue is $2^2 \times i + l$.

When an area extraction starts, outputs fr(x), fg(x), and fb(x) are set by the look-up table setting device that are defined in the following equations, assuming that the input x to the look-up table memory 16 for each of R, G, and B, is expressed as $x = 2^2 i' + 2^2 \times k' + l$.

When i' < r1 or r2 < i', $fr(x) = (l-k') \times l' \times 2^2 \times i + k' \times C.$ When r1 < i' ≤ r2, $fr(x) = (l-k') \times \{l' \times 2^2 \times i + (l-l') \times Dr\} + k' \times C.$ When i' < g1 or g2 < i', $fg(x) = l' \times 2^2 \times i.$ When g1 ≤ i ≤ g2, $fg(x) = l'2^2 \times i + (l-l') \times Dg.$ When i' < b1 or b2 < i', $fb(x) = l' \times 2^2 \times i.$ When b1 ≤ i' ≤ b2, $fb(x) = l' \times 2^2 \times i + (l-l') \times Db.$ Where r1, r2; g1, g2; b1, b2: threshold to be inputted by the threshold input device 11; C: intensity information of lines, Dr, Dg, Db: intensity information representing a specific color which temporarily displays an area to be extracted. This setting of the outputs fr(x), fg(x), and fb(x) permits th following displays to be made according to the contents that are stored in the multi-purpose memory 15.

(1) When line information is stored in the memory 15, which stores the line information of red (k'=1), the output from the look-up table memory 16 for red is C.

(2) When line information is not stored in the memory which stores the line information of red and 15, which stores the line information of red 1 is stored in intensity information ($2^2 \times 1$) is outputted irrespective of a threshold.

(3) When line information is not stored in the memory which stores the line information of red and 0 is stored in the memory which stores label information (k'=0, l'=0), and if the intensity information of each color is outside a threshold, then the output is 0 but if the intensity information is within the threshold, then the output is Dr, Dg, and Db.

After setting the contents of the look-up table memory 16 as above, an extraction is carried out by the following procedure.

(i) 0 is assigned to the least significant two bits of the multi-purpose memory 15 for each of R, G, and B with the microprocessor 13.

(ii) Thresholds r1, r2; g1, g2; b1, b2 are inputted with the threshold input device 11. By these inputs, an area where all of R, G, and B are included in the thresholds are displayed in specific colors (Dr, Dg, Db).

(iii) When the color of an area to be extracted is laid end to end with that of the background, the target area to be taken out is displayed in specific colors (Dr, Dg, Db), in which case, the background is laid end to end with the target area to be taken out so as to be displayed in the same colors (Dr, Dg, Db). Assuming that a drawing shown in FIG. 48(d) is an original image, the drawing is displayed as shown in FIG. 48(a). In this case, lines or curves to separate an area to be extracted from the background are inputted by the coordinate input device 21. The information of these lines or curves is inputted by setting the second lowest bit of multi-purpose memory 95 to 1 for red through the memory setting device with the microprocessor 13. As a result, data R (k=1) of the position to which lines have been written, that is stored in the multi-purpose memory 95 is defined in the following equation in which ir, R component, is shade information of the position:

$R (k=1) = 2^2 \times ir + 2.$

As a result, the output fr(R(k=1)) from the look-up table memory 16 for the red is expressed as follows:

fr(R (k=1))=C in this case, R component is displayed as the color C in the display unit 19. Data R (k=0), in the multi-purpose memory 15 where lines are not written, is expressed as follows using ir:

$R(k=0) = 2^2 \times ir.$

As a result, the output fr(R (k=0)) from the look-up table memory 16 becomes Dr or 0 as follows from the relation between ir and r1 or r2:

$fr(R(k=0)) = 0 \; (ir < r1 \text{ or } r2 < ir)$
$= Dr \; (r1 \leq ir \leq r2).$ From the foregoing, lines can be displayed in the display unit 19, separately from areas other than the lines, by setting the value of C to be different from both Dr and 0. This is shown in FIG. 48(b) in which L designates a separation line.

(iv) After the area to be extracted has been separated from the background by the operations as described in the item (iii), label information is set. The label information setting is carried out, for example, by inputting coordinates (Xo, Yo) of a point lying within the target area to be extracted by the coordinate input device 21. After inputting the coordinates, areas which lie connected to the target area and satisfy simultaneously the following two conditions that are searched for with the microprocessor 13, starting from the inputted coordinate point. Then, the label information of each of R, G, and B is changed from 0 to 1.

(Condition 1)

When the R, G, and B components of color information are assumed to be ir, ig, and ib, with $r1 \leq ir \leq r2$, $g1 \leq ig \leq g2$, and $b1 \leq ib \leq b2$.

(Condition 2)

Line information is not provided.

In consideration with the conditions, the point on the separation line inputted at the step (iii) does not satisfy the (Condition 2), so that the label information is provided only to the target area to be extracted and displayed in a specific color.

Since the separation line information is inputted to separate the area to be displayed in a specific color from an area which is not to be labeled, it is unnecessary to input the information of all of the boundary line of the target area. Therefore, an input of line information can be carried out easily.

According to an image processing device having the above-described construction, a pair of thresholds for each color of R, G, and B, namely, r1, r2; g1, g2; b1, b2; are determined and the look-up table is set so that the range between the two thresholds for each color is clearly displayed. Whereby an image area with the color information of each of R, G, and B that is included in the threshold, is temporarily displayed in the display unit in the specific color. If the target area to be extracted and the backgrounds (other areas) are to be laid end to end because both areas have the same color, the information of a line or a curve for separating the area to be extracted from the other areas is inputted with the coordinate input device.

Thereafter, the area displayed in the specific color is designated with the coordinate input device so as to carry out the extraction of the target area. Accordingly, even if the target area and the other areas are laid end to end partially in the same color, extraction can be easily carried out utilizing the thresholds of the colors. Further, the input of simple lines or curves can carry out the separation of the target area from other areas which are connected thereto by the extraction method using threshold of colors. As apparent from the foregoing description, an area which has complicated configuration can be easily extracted because, the present invention adopts the method of extracting an area using the information of color thresholds and lines.

(Twelfth Embodiment)

Figure 49:
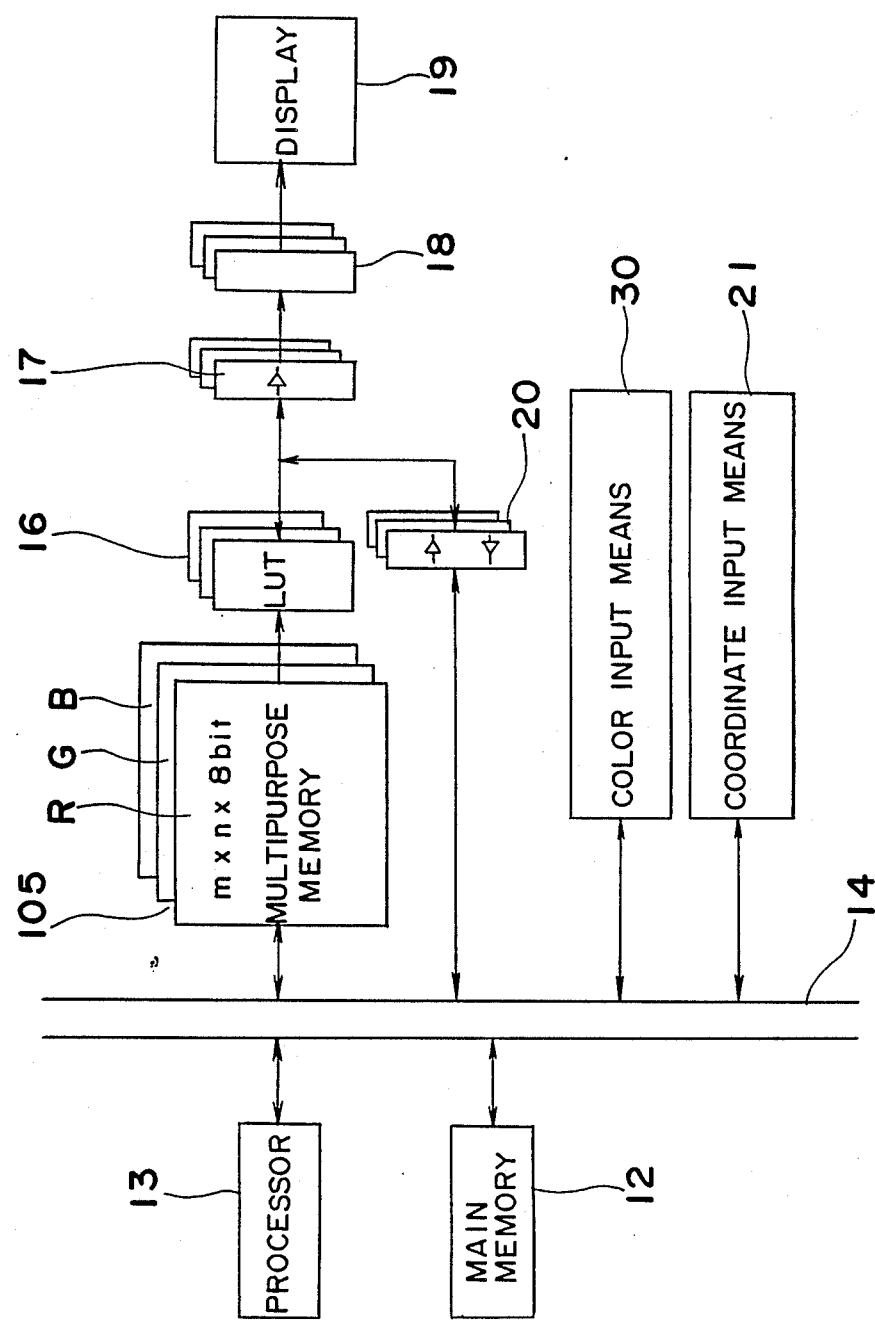
FIG. 49 is a block diagram of the image processing device of a twelfth embodiment of the present invention.

An image processing device of the 12th embodiment according to the present invention will be described with reference to FIGS. 49 through 54. FIG. 49 is a block diagram of the present embodiment. The image processing device according to this embodiment comprises a multi-purpose memory 105 of eight binary digits or bits for each of R, G, and B. The multi-purpose memory 105 stores intensity information composing an image and label information which detects an area depending on the situation. The output from the multi-purpose memory 105 is connected to an address of a look-up table memory 16. The output from the look-up table memory 16 is connected to a D/A converter 18 through a gate circuit 17. The look-up table memory 16 is accessed by a microprocessor 13 through a bus 14 and a gate 20. The microprocessor 13 includes a look-up table color setting device, which is comprised of programs, for calculating and rewriting the intensity information of the look-up table memory 16. The method of calculation to be made by the look-up table color setting device will be described below.

The output (video analog signal) from the D/A converter 18 is transmitted to a display unit 19 for an image display. The multi-purpose memory 105 and a main memory 12 are accessed by the microprocessor 13 through the bus 14. The coordinate input device 21 that is accessed by the microprocessor 13 through the bus 14 inputs the specific coordinates existing in an image so as to input a reference color for color changing. A color input device 30 is accessed by the microprocessor 13 through the bus 14 and inputs target colors to which the reference color is changed.

Figure 50:
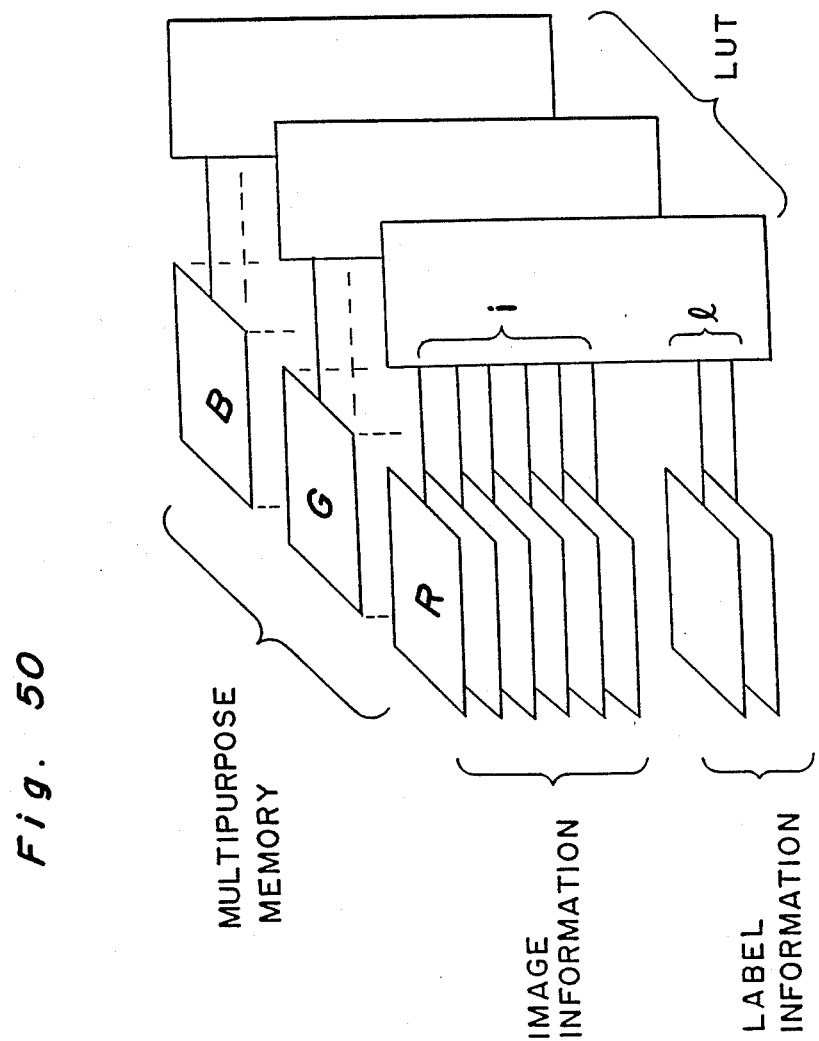
FIG. 50 illustrates the contents of the multi-purpose memory and the look-up table memory of the twelfth embodiment.

The operation of the image processing device will now be described. First, an image is inputted to the multi-purpose memory 105 by means such as a scanner, a TV camera, or the like. At this stage, the multi-purpose memory 105 stores eight-bit information for each color of R, G, and B per one dot. In this embodiment, the most significant six binary digits or bits are assigned to image information and the least significant two bits are assigned to label information which relates to an area. FIG. 50 shows the multi-purpose memory thus set. By representing one component of R, G, and B by K, the information of the K component (K=r, g, or b) to be stored in the multi-purpose memory 105 consists of shade information iK ($0 \leq iK < 2^6$) and label information l ($0 = l < 2^2$) so that the output from the multi-purpose memory 105 becomes iK+l. In carrying out a color change, the look-up table setting device sets the contents of the look-up table memory 16 as follows:

$$fK(x) = fK^{(0)}(x) \text{ (when } x \text{ mode } 2^2 = 0)$$
$$= fK^{(1)}(x) \text{ (when } x \text{ mode } 2^2 = 1)$$
$$= fK^{(2)}(x) \text{ (when } x \text{ mode } 2^2 = 2)$$
$$= fK^{(3)}(x) \text{ (when } x \text{ mode } 2^2 = 3).$$

Where x is the output from the multi-purpose memory 105, namely, the input to the look-up table memory 16, and fK(x) is the output of the K component from the look-up table memory 16. The functions $fK^{(l')}(x)$ ($l'=0, 1, 2, 3$) is a function which determines the color of each of the areas whose label information is 0, 1, 2 or 3. Accordingly, a change of function $fK^{(l')}$ corresponding to each of the labels enables an individual color change for each of the areas.

Figure 51A:
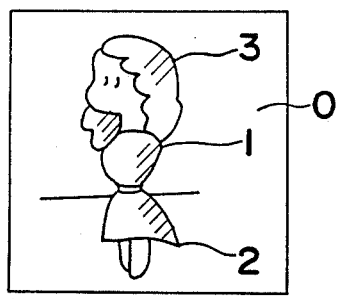
FIGS. 51(a) and 51(b) illustrate labeled full color images.
Figure 51B:
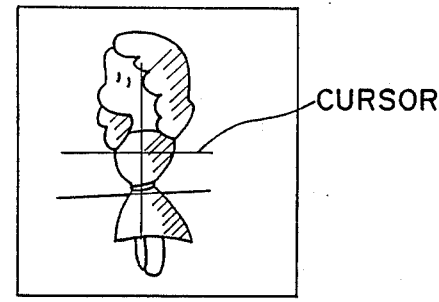

FIG. 51(a) shows an example of a full color image to which four kinds of label information 0, 1, 2 and 3 have been inputted. The color of an area in this image is changed as follows:

(1) The program enters a reference color input mode by mode selection. Under the reference color input mode, a point of a portion whose color is to be changed is designated on the image. Thereafter, intensity information (Ir, Ig, Ib) of the color of the point and label information lo of the point are inputted using the coordinate input device 21. FIG. 51(b) shows how a cursor, which moves on a screen corresponding to the coordinate input device 21, is displayed and the reference color is inputted.

(2) The program enters a target color input mode by the mode selection device. In the target color input mode, a color, which the point designated under the reference color input mode is to be changed, is inputted by a color input device 11. The color is referred to as the target color which is defined as (Dr, Dg, Db). Methods of inputting the target color include a method of calling a palette on the screen to select a color to be changed therefrom, a method of inputting color components by numerical value, a method of displaying a color component on a graph and a method of varying the graph so as to input the changed value of the color component.

(3) The look-up table 16 is changed. Since the label information lo of the area whose color is to be changed has been obtained through the operation described above in the item (1), the function $fK^{(lo)}(x)$ which corresponds to the label information lo is changed using the following equation. In the equation, symbol i designates a quotient obtained by dividing the input x by $2^2$, namely intensity information. [ ] is the Gaussian symbol.

$$fK^{(lo)}(x) = \left[\frac{DK \times i}{IK}\right] \quad (0 \leq i < IK)$$
$$= DK \quad (i = IK)$$
$$= F \times \frac{i - IK - IK}{2^6 - IK} +$$
$$DK \times \frac{2^6 - 1}{2^6 - IK} \quad (IK < i \leq 2^6)$$

Where F is the maximum value of the output from the look-up table memory 16.

Figure 52A:
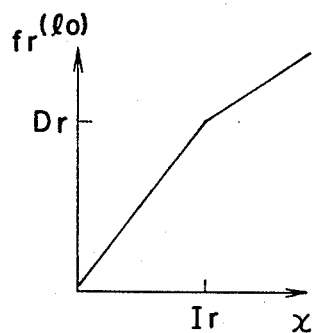
FIGS. 52(a), 52(b), 52(c), 53, 54(a), 54(b), and (c) are graphs of functions of the look-up table color setting device.

FIGS. 52(a), (b), and (c) show the configurations of the functions expressed by the equations above.

By setting the function $fK^{(lo)}(x)$ thus, the area corresponding to the label information lo is changed in color and is displayed as described. First, the coordinate points to which the information of the reference color has been inputted are displayed in the target color. Points having intensity brighter than that of the reference color are displayed in a color brighter than the target color and points having intensity darker than that of the reference color are displayed in a color darker than the target color. As a result, a natural color change can be carried out.

Thus, using the above-described method of this embodiment, the color of a full color image can be changed easily and quickly by inputting coordinate information for the reference color input and color information for the target color input.

Many variations and modifications may be made according to the present invention. For example, as an alternative of this embodiment in which the color information of one point inputted by the coordinate input device 21 is regarded as a reference color, the reference color may be produced by calculating the average of the color information of several dots in the vicinity of the inputted point. This method is efficient when an original image contains noise.

Figure 52B:
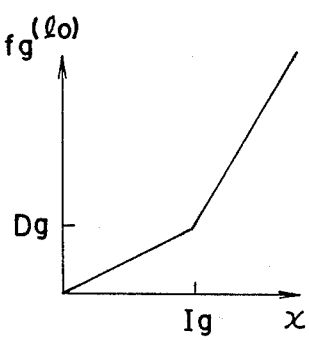
Figure 52C:
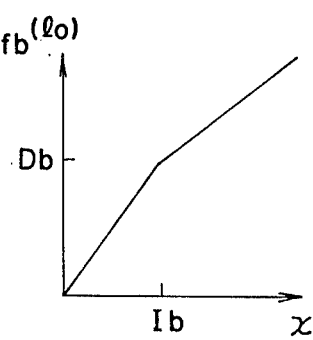

Further, the contents of the look-up table memory are set by interpolating linearly between the target color and the brightest color and between the target color and the least brightest color in the above embodiment as shown in FIGS. 52(a), 52(b), and 52(c). However, as its alternative, such an interpolation can be carried out by using a curve.

Figure 53:
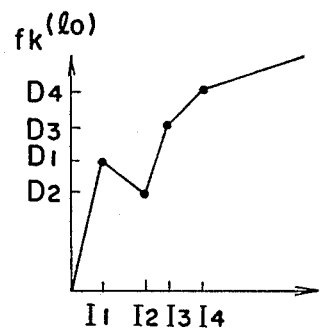

Furthermore, in the above-described example, a reference color and target color pair are inputted. However, a method of inputting a plurality of reference color and target color pairs may be used. In this case, a plurality of points consisting of components of the reference colors and the target colors are inputted as shown in FIG. 53, for example. Therefore, lines or curves which connect the points are calculated so as to set the look-up table. In FIG. 53, symbols I1, I2, I3, and I4 designate the K component of four reference colors. D1 through D4 designate the K component of the target color. The abscissa indicates the input and the ordinate indicates the output $fK^{(lo)}$.

Figure 54A:
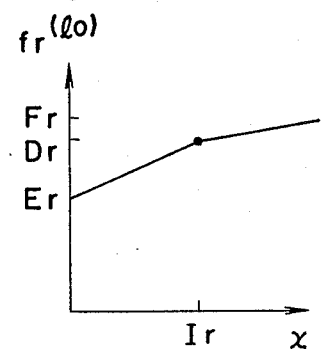
Figure 54B:
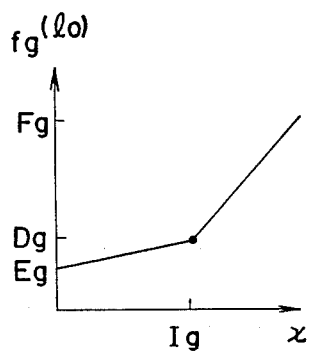
Figure 54C:
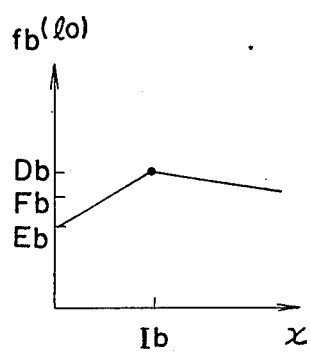

In the example described above, the brightest color component is outputted for the input having the largest value and the least brightest color component is outputted for the input having the smallest value. However, the information of such color components may be set using the color input device 11. To describe more particularly, components of the brightest color and the least brightest color are assumed to be Fr, Fg, and Fb, and Er, Eg, and Eb, respectively. Using these color components, the data to be inputted to the look-up table memory 16 are set as shown in FIGS. 54(a), (b) and (c).

This increases the number of input data but the colors of dark and bright portions can be adjusted.

In the above method, a description has been made for the case in which a color change is carried out with four label information. Even when more label information is inputted or no label information in inputted, a color can be changed using a reference color and a target color.

According to an image processing device having the above-described construction which comprises a coordinate input device, a color input device, and a look-up color setting device, intensity information of a specific area having many colors is automatically calculated on the basis of a target color and a reference color and intensity information that is stored in the look-up memory is rewritten according to the shade of the colors. Accordingly, a change of colors for such a shaded area can be easily and quickly carried out in conformity with the shade.

(Thirteenth Embodiment)

The thirteenth embodiment of the present invention will be described with reference to FIGS. 55 through 58.

FIG. 55 shows a schematic diagram of image processing according to the present embodiment. In FIG. 55, a numeral 20 indicates an image memory which temporarily stores image information. A numeral 202 indicates a look-up table memory. A numeral 203 indicates a D/A converter. A numeral 204 indicates a display. A numeral 205 indicates the gate for providing and reading information to and from the look-up table memory 202. A numeral 207 indicates a microprocessor. The image memory 201 is accessed by the microprocessor 207 through a bus line 206. A numeral 208 designates an outer memory for storing an image by a hard disk, floppy disk and the like. A numeral 209 indicates an interface unit such as a mouse, digitizer and the like. A numeral 210 shows a memory for variables such as a program variable.

A color palette according to the present embodiment will be described.

Figure 57A:
FIG. 57(a) is a drawing showing an image being processed.

The color palette is stored in the outer memory 208 as one image or a plurality of images. The image 220 for one of the color palettes comprises a plurality of blocks divided in a lateral direction as shown in FIG. 56. The dividing method and the number of divided blocks are not limited to those of this embodiment. These blocks register color palettes 220a, 220b, 220c having different brightnesses, saturations, and hues. When an operator uses the color palettes 220a, 220b, and 220c, a color palette corresponding to one block, e.g., 220b of these color palette images, is called to the image memory 201 being operated by the operator, and then, displayed. FIGS. 57(a) and (b) show the displayed images as a result of the above-described operation.

Figure 57B:
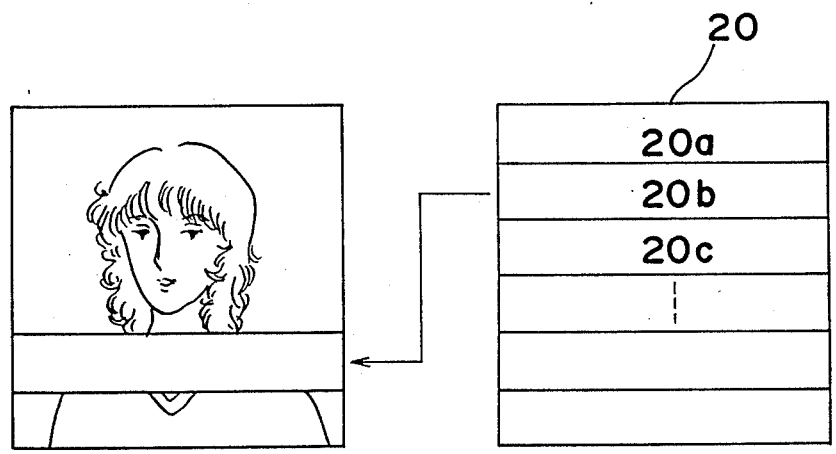
FIG. 57(b) is a drawing shown the image being processed which is called a color palette.
Figure 58:
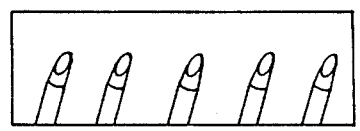
FIG. 58 is a drawing showing one example of color palette produced in the shaped of lip stick.

FIG. 57(a) shows the image which is being operated by the operator. FIG. 57(b) shows the condition in which the color palette 220 has been called to the image memory 201. At this time, the image data, which is in the area where the color palette 220 is displayed, is saved in the variable memory 210 before the image in the color palette 220b is called to the image memory 201. The position where the color palette 220b is displayed is set by the operator as desired. The display direction of the color palette 220b is designated. Of the images in the color palettes that are stored in the outer memory 208, from which blocks of the color palette are to be called, are designated by the operator using the designation device 211. The designation device 211 includes a coordinate input device, a push button and the like. When the image of the color palette 200b is erased, the image data saved in advance is transferred to the image memory 201.

The method of designating a color will be described. A color designation is carried out by a color input device 30. The input device is a cursor, which is displayed on a screen, and the cursor is moved to the color palette where a target color has been displayed, and then, the color information of the point where the cursor has been displayed is obtained from the image memory 201.

When the target color is not present on the color palette image 220, a different color palette image 220 which contains the color palette having the target color is called. Thus, a color designation is carried out in a manner similar to the above manner. The target color can be selected from the processed image and not from a color palette by the above-described method, that is, the color palette image 220 is called the image memory 201 so that the target color may be obtained from each of the color palettes 220a, 220b, and 220c. Thus, under the same color designation mode, information of a color can be inputted from both color palettes and images can be processed images advantageously. A color palette is processed by an operator as follows:

Since a plurality of color palettes according to the present embodiment are combined into one image and a plurality of color palettes are stored in the outer memory 208, it is possible to loan one processed image from the outer memory 208 to the image memory 201. Therefore, using a command key for processing an image by an image processing device of this embodiment, an image can be processed from a color palette by an operator. For example, a color palette having a lip stick shaped symbol shown in FIG. 58 can be processed using the copying function and color changing function of an image processing device of the present embodiment.

In an image processing device according to the present embodiment, one or more color palettes can be stored in an outer memory as images for color palettes, and a color palette can be processed using various image processing functions which an image processing device of the invention has, depending on the use.

Although the present invention has been described in connection with preferred embodiments thereof, many variations and modifications may be made without departing from the scope of spirit of the invention. It is preferred, therefore, that the present invention is limited not by the specific disclosure herein, but only by the appended claims.

What is claimed is:

1. An image processing device comprising: generating means for generating a first plurality of pixels and a second plurality of pixel;
   an image memory for storing intensity information corresponding to said first plurality of pixels which compose an original image;
   a logic image memory for storing label information of said second plurality of pixels corresponding to an area of said original image in said first plurality of pixels whose intensity information is to be changed;
   a look-up table memory, to which output information from said image memory and said logic image memory is inputted, for resetting the intensity information for said area of said original image corresponding to said label information and developing a changed image in response; and
   display means for displaying said changed image.

2. An image processing device as claimed in claim 1, wherein rewriting means for rewriting the intensity information is provided to widen a dynamic range of the intensity information along each color axes other than an axis having the widest dynamic range of the intensity information.

3. An image processing device comprising:
   a multi-purpose memory for storing intensity information corresponding to a first plurality of pixels composing an original image and label information of a second plurality of pixels corresponding to an area in said first plurality of pixels whose intensity information is changed, said multi-purpose memory stores data having predetermined data lengths corresponding to an intensity information amount of the original image;

a look-up table memory, to which output information is transferred from said multi-purpose memory, for changing and outputting the intensity information for the area of said original image corresponding to said label information and developing a changed image in response;

display means for displaying said changed image to the output from said look-up table memory; and providing means for providing the label information to said multi-purpose memory, whereby color changes and colorings of the area corresponding to the label information can be carried out.

4. An image processing device comprising:

a multipurpose memory for storing intensity information of a first plurality of pixels composing an original image and edge information of a second plurality of pixels in said first plurality of pixels from an area which is taken out and extracted after a change of the intensity information therein and corresponds to an edge of the area to be extracted;

a look-up table memory, to which output information is transferred from said multipurpose memory, for changing the intensity information of said second plurality of pixels which corresponds to the area to be taken out in which the intensity information is changed and said second plurality of pixels which corresponds to the edge of the area to be taken out so that said intensity information is changed and is outputted;

display means for displaying a changed image in response to output information from said look-up table memory;

providing means for providing the edge information to said multipurpose memory; and look-up table setting means for setting the contents of said look-up table memory so that the intensity information of said second plurality of pixels on the edge correspond to a color between a color of the area to be taken out and the original image, whereby color changes of the area to be extracted are carried out so that the edge thereof may not be conspicuous.

5. An image processing device as claimed in claim 4, wherein said providing means provides inputted edge information having different values in a direction from the center of the area to be taken out towards the periphery thereof.

6. An image processing device comprising:

an image memory for storing intensity information of a first plurality of pixels composing an original image;

an edge memory for storing edge information of a second plurality of pixels in an area which is to be taken out and of said original image changed in the intensity information thereof and said second plurality of pixels corresponds to an edge of said area;

a look-up table memory, to which output information from said image memory and said edge memory is transferred, for changing the intensity information of said second plurality of pixels corresponding to the area to be taken out whose intensity information is changed and the intensity information of said second plurality of pixels which corresponds to the edge of the area to be taken and changed intensity information is output;

display means for displaying a changed image in response to output information from said look-up table memory;

providing means for providing edge information to said edge memory; and look-up table setting means for setting contents of the look-up table memory in response to said intensity information and said edge information so that the intensity information of said second plurality of pixels on the edge corresponds to a color between a color of the area to be taken out and the original image, whereby color changes of the area to be extracted are carried out so that the edge thereof may not be conspicuous.

7. An image processing device as claimed in claim 6, wherein said providing means provides said edge information to said edge memory, said edge information having different values in a direction from the center of the area towards the periphery thereof.

8. An image processing device comprising:

a multipurpose memory for storing intensity information of a plurality of pixels which compose an original image, and intensity information of an air-brush;

coordinate input means for designating and inputting coordinates of a predetermined pixel on the original image;

color input means for inputting color information corresponding to a color of the air-brush;

air-brush strength input means for inputting strength information which represents the strength of the air-brush;

providing means for providing the intensity information of the air-brush to said multipurpose memory;

a look-up table memory, to which the output information from said multipurpose memory is transferred for changing the intensity information of said plurality of pixels in response to the intensity information, the color information, and the strength information of the air-brush so as to output changed intensity information; and display means for displaying a changed image in response to output information from said look-up table memory.

9. An image processing device as claimed in claim 8, wherein said providing means provides the intensity information of the air-brush having different values in a direction from the center of the original image towards the periphery thereof.

10. An image processing device comprising:

an image memory for storing intensity information of a plurality of pixels which compose an original image;

an air-brush memory for storing intensity information of an air-brush;

coordinate input means for designating and inputting coordinates of a predetermined pixel of the original image;

color input means for inputting color information corresponding to a color of the air-brush;

air-brush strength input means for inputting strength information which represents the strength of the air-brush;

providing means for providing the intensity information from the air-brush to said air-brush memory;

as look-up table memory, to which the output information from said image memory and said air-brush memory is simultaneously transferred, for changing the intensity information of the predetermined pixel in response to the intensity information, the color information, and the strength information of the air-brush so as to output changed intensity information; and display means for displaying a changed image in response to output information from said look-up table memory.

11. An image processing device as claimed in claim 10, wherein said providing means provides the intensity information of the air-brush having different values in a direction from the center of the original image towards the periphery thereof.

12. An image processing device comprising:

a multi-purpose memory, for selecting and storing intensity information and separation line information of a plurality of pixels which compose an original image;

a look-up table memory for converting output data from said multi-purpose memory so as to output converted data;

display means for displaying a changed image in response to the converted data output from said look-up table memory;

means for setting a specified bit of said multi-purpose memory so that the separation line information is stored in said specified bit and setting means for setting the contents of said look-up table memory said means for setting erasing said separation line information to form set contents of said specified bit in said look-up table memory.

13. An image processing device comprising:

an image memory for storing a characteristic level of a plurality of pixels of an original image to be processed;

input means for inputting a desired threshold related to the characteristic level;

a look-up table memory for converting the characteristic level of said plurality of pixels into a signal that determines whether the pixels should be displayed in response to the desired threshold transmitted from said input means; and display means for displaying an image in response to an output from said look-up table memory, whereby the characteristic level of said plurality of pixels of the original image is outputted from said image memory and is provided to said look-up table memory so that the characteristic level is converted into a display in response to said output from said look-up table memory, and a non-display signal is outputted to said display means which sequentially displays a converted plurality of pixels which constitute a changed image.

14. An image processing memory comprising:

a multipurpose memory for storing intensity information of a plurality of pixels which compose an original image and label information which indicates whether a desired area has been extracted;

threshold input means for inputting a desired threshold relative to the intensity information;

coordinate input means for inputting predetermined coordinates of said original image;

a look-up table memory for setting a look-up table which transfers and converts the intensity information from said multipurpose memory in response to the desired threshold inputted from the threshold input means, and converting input information transmitted from said multipurpose memory in response to the look-up table;

display means for displaying a changed image in response to an output from said look-up table memory; and operation processing means for rewriting the label information of said plurality of pixels in the desired area which is to be extracted in response to the desired threshold and is designated by said coordinate input means, whereby information, which displays a characteristic level of said plurality of pixels of the original image, is converted by said look-up table memory and an extraction area determined by the desired threshold inputted from said threshold input means that is displayed in said display means in a specified color and a target area is selected by said coordinate input means from the desired area displayed in the specified color so that the extraction may be carried out.

15. An image processing device comprising:

a multipurpose memory for storing intensity information of a plurality of pixels composing an original image and label information which determines whether an area is taken out;

threshold input means for inputting a desired threshold on the intensity information;

coordinate input means for inputting predetermined coordinates of said original image;

a look-up table memory for setting a look-up table which converts the intensity information transferred from said multipurpose memory in response to a desired threshold inputted from said threshold input means and for converting the information from said look-up table inputted thereto from said multipurpose memory;

display means for displaying a changed image in response to an output from said look-up table memory;

discrimination means for discriminating whether said predetermined coordinates designated by said coordinate input means are included in a specified area specified by the desired threshold inputted from said threshold input means and displayed in a specified color; and rewriting means for rewriting the label information of the specified area of said multipurpose memory when the predetermined coordinates designated by said coordinate input means are included in the specified area and for rewriting the label information of the specified area included in a closed curve area designated by said coordinate input means when the predetermined coordinates designated by said coordinate input means are not included in the specified area, whereby the area to be taken out is displayed in the specified color and a target area is selected from the specified area displayed in the specified color using said coordinate input means and an extracting method is changed depending on whether the predetermined coordinates are included in the specified area displayed in the specified color when the area is taken out.

16. An image processing device as claimed in claim 15, wherein coordinates are simultaneously inputted outside the specified area displayed in the specified color and an extracted area exists in the closed curve area, said rewriting means for rewriting label information cancels an extracted area from an area to be extracted so as to return the extracted area to the state before it is extracted.

17. An image process device comprising:
a multipurpose memory which stores intensity information of a plurality of pixels composing an original image, label information of an area, and line information in response to a situation;
a look-up table memory for converting the information inputted from said multipurpose memory and outputting converted information;
display means for displaying a changed image in response to output information from said look-up table memory;
threshold input means for inputting a predetermined threshold on the intensity information;
coordinate input means for inputting predetermined coordinates of the original image;
memory setting means for setting a specified bit of said multipurpose memory for intensity information, label information, and line information so as to write and erase the label information and the line information; and
look-up table setting means for setting the contents of said look-up table memory in response to the predetermined threshold inputted from said threshold input means, on the intensity information, the label information, and the line information,
whereby output information, which represents a characteristic level of said plurality of pixels of the original image, is transferred from said multipurpose memory and is converted by said look-up table memory to display an area set by the predetermined threshold inputted from said threshold input means in a specific color and when an area displayed in the specific color and areas other than a target area to be extracted are laid end to end, information of a line which separates the target area from the other areas is inputted by said coordinate input means to separate the target area from the other areas and the target area thus separated is selected by said coordinate input means so as to rewrite the label information and extract the target area.

18. An image processing device having a multipurpose memory which stores intensity information of a plurality of pixels composing an image and label information which detects an area according to a situation, a look-up table memory which converts the intensity information inputted from the multipurpose memory and outputs converted intensity information, display means for displaying a changed image in response to an output from the look-up table memory, wherein intensity information of a specified area having specific label information of the look-up table memory is rewritten so as to change the color of the specific area of the image, comprising:

coordinate input means for designating a predetermined pixel in the specific area of an image whose color is changed and inputting a reference color having intensity information of said predetermined pixel and said label information thereof;
color input means for inputting information of a target color to which the reference color designated by said coordinate input means is to be changed; and
look-up table color setting means for rewriting intensity information of said look-up table memory so that the reference color of the predetermined pixel inputted by said coordinate input means may be changed into the target color through an automatic calculation of the intensity information, from said look-up table memory, of the predetermined pixel included in the specific area having the specific label information designated by said coordinate input means in accordance with a degree of shade of a color represented by the intensity information so that the intensity information, which represents a brighter color than that of the reference color, may be changed to intensity information which represents the brighter color than the target color while the intensity information which represents a darker color that of the reference color may be changed to intensity information representing the darker color than the target color.

19. An image processing device as claimed in claim 18, wherein said look-up table color setting means averages the intensity information of said plurality of pixels existing in a periphery of coordinates inputted by said coordinate input means and rewrites the intensity information from said look-up table memory using an averaged value as the reference color.

20. An image processing device as claimed in claim 18, wherein said look-up table color setting means rewrites the intensity information from said look-up table memory in response to the intensity information which is inputted by said color input means and represents a bright color and a dark color responsive to the intensity information, in addition to the intensity information which represents the reference color and the target color.

21. An image processing device comprising:
an image memory which stores image information temporarily;
a microprocessor which processes and changes colors of the image information temporarily stored in said image memory;
an outer memory which stores at least one image processed by said microprocessor as a color pallet image to be used for a color input;
designation means for calling information of a part of the color pallet image of said image memory when color information is inputted; and
color input means for inputting color information of the part of the color pallet image called by said designating means.

* * * * *